US009278286B2

(12) United States Patent
Bennett et al.

(10) Patent No.: US 9,278,286 B2
(45) Date of Patent: Mar. 8, 2016

(54) SIMULATING MUSICAL INSTRUMENTS

(71) Applicant: Harmonix Music Systems, Inc., Cambridge, MA (US)

(72) Inventors: Bryn Bennett, Cambridge, MA (US); Jason D. Booth, Upton, MA (US); Sylvain Dubrofsky, Cambridge, MA (US)

(73) Assignee: Harmonix Music Systems, Inc., Boston, MA (US)

( * ) Notice: Subject to any disclaimer, the term of this patent is extended or adjusted under 35 U.S.C. 154(b) by 0 days.

(21) Appl. No.: 14/524,804

(22) Filed: Oct. 27, 2014

(65) Prior Publication Data

US 2015/0111645 A1     Apr. 23, 2015

Related U.S. Application Data

(63) Continuation of application No. 13/049,742, filed on Mar. 16, 2011, now Pat. No. 8,874,243.

(60) Provisional application No. 61/353,519, filed on Jun. 10, 2010, provisional application No. 61/314,571, filed on Mar. 16, 2010.

(51) Int. Cl.
*G06F 19/00*     (2011.01)
*A63F 13/245*    (2014.01)
(Continued)

(52) U.S. Cl.
CPC .............. *A63F 13/245* (2014.09); *A63F 13/10* (2013.01); *A63F 13/21* (2014.09); *A63F 13/46* (2014.09);
(Continued)

(58) Field of Classification Search
CPC ............ A63F 13/10; A63F 2300/1062; A63F 2300/8047
USPC ............ 700/91, 92, 94; 463/7, 30–34; 84/609
See application file for complete search history.

(56) References Cited

U.S. PATENT DOCUMENTS

D211,666 S    7/1968  MacGillavry
3,430,530 A   3/1969  Grindinger
(Continued)

FOREIGN PATENT DOCUMENTS

AT    468071 T      6/2010
AU    200194329    10/2001
(Continued)

OTHER PUBLICATIONS

Amplitude for Playstation. Retrieved from the Internet: www.target.com/gp/detail.hbnl/601-0682676-9911341?asin=B0000859TM &AFID. Retrieved on Feb. 22, 2005. 1 page.
(Continued)

*Primary Examiner* — Ronald Laneau
(74) *Attorney, Agent, or Firm* — Wilmer Cutler Pickering Hale and Dorr LLP

(57) ABSTRACT

The invention provides scoring a performance of a guitar part in a rhythm-action game. It operates in the context of a video game platform in communication with a display and a controller and involves receiving an input performance from the controller including at least one input chord note, each input chord note including an input string value corresponding to a struck string and an input fret value associated with the input string value. Then, a reference performance is provided, which includes at least two reference chord notes to be input at a target time, each reference chord note including a reference string value and a reference fret value associated with the reference string value. Then, a degree of matching is determined between the input performance and the reference performance, and a score is assigned to the input performance based on the degree of matching.

10 Claims, 22 Drawing Sheets

(51) Int. Cl.
*A63F 13/40* (2014.01)
*A63F 13/21* (2014.01)
*A63F 13/46* (2014.01)
*A63F 13/537* (2014.01)

(52) U.S. Cl.
CPC ....... *A63F 13/537* (2014.09); *A63F 2300/1062* (2013.01); *A63F 2300/1068* (2013.01); *A63F 2300/305* (2013.01); *A63F 2300/6063* (2013.01); *A63F 2300/61* (2013.01); *A63F 2300/638* (2013.01); *A63F 2300/8047* (2013.01)

(56) References Cited

U.S. PATENT DOCUMENTS

| | | |
|---|---|---|
| 3,897,711 A | 8/1975 | Elledge |
| D245,038 S | 7/1977 | Ebata et al. |
| D247,795 S | 4/1978 | Darrell |
| 4,128,037 A | 12/1978 | Montemurro |
| D259,785 S | 7/1981 | Kushida et al. |
| 4,295,406 A | 10/1981 | Smith |
| D262,017 S | 11/1981 | Frakes, Jr. |
| D265,821 S | 8/1982 | Okada et al. |
| D266,664 S | 10/1982 | Hoshino et al. |
| D287,521 S | 12/1986 | Obara |
| 4,644,495 A | 2/1987 | Crane |
| 4,766,541 A | 8/1988 | Bleich et al. |
| 4,783,812 A | 11/1988 | Kaneoka |
| 4,794,838 A | 1/1989 | Corrigau, III |
| 4,843,568 A | 6/1989 | Krueger et al. |
| 4,890,833 A | 1/1990 | Lantz et al. |
| D310,668 S | 9/1990 | Takada |
| 5,074,182 A | 12/1991 | Capps et al. |
| 5,107,743 A | 4/1992 | Decker |
| 5,109,482 A | 4/1992 | Bohrman |
| 5,140,889 A | 8/1992 | Segan et al. |
| 5,194,683 A | 3/1993 | Tsumura et al. |
| 5,208,413 A | 5/1993 | Tsumura et al. |
| 5,250,745 A | 10/1993 | Tsumura |
| 5,262,765 A | 11/1993 | Tsumura et al. |
| 5,287,789 A | 2/1994 | Zimmerman |
| D345,554 S | 3/1994 | Dones |
| 5,362,049 A | 11/1994 | Hofer |
| 5,368,309 A | 11/1994 | Monroe et al. |
| 5,393,926 A | 2/1995 | Johnson |
| 5,395,123 A | 3/1995 | Kondo |
| 5,398,585 A | 3/1995 | Starr |
| 5,399,799 A | 3/1995 | Gabriel |
| 5,434,949 A | 7/1995 | Jeong |
| 5,453,570 A | 9/1995 | Umeda et al. |
| 5,464,946 A | 11/1995 | Lewis |
| 5,482,087 A | 1/1996 | Overbergh et al. |
| 5,488,196 A | 1/1996 | Zimmerman et al. |
| 5,491,297 A | 2/1996 | Johnson et al. |
| 5,510,573 A | 4/1996 | Cho et al. |
| 5,513,129 A | 4/1996 | Bolas et al. |
| 5,524,637 A | 6/1996 | Erickson |
| 5,534,917 A | 7/1996 | MacDougall |
| 5,537,528 A | 7/1996 | Takahashi et al. |
| 5,553,864 A | 9/1996 | Sitrick |
| 5,557,056 A | 9/1996 | Hong et al. |
| 5,557,057 A | 9/1996 | Starr |
| 5,563,358 A | 10/1996 | Zimmerman |
| 5,565,639 A | 10/1996 | Bae |
| 5,567,162 A | 10/1996 | Park |
| 5,568,275 A | 10/1996 | Norton et al. |
| 5,574,238 A | 11/1996 | Mencher |
| 5,613,909 A | 3/1997 | Stelovsky |
| 5,616,078 A | 4/1997 | Oh |
| 5,627,335 A | 5/1997 | Rigopulos et al. |
| 5,631,433 A | 5/1997 | Iida et al. |
| 5,634,849 A | 6/1997 | Abecassis |
| 5,663,517 A | 9/1997 | Oppenheim |
| 5,670,729 A | 9/1997 | Miller et al. |
| 5,681,223 A | 10/1997 | Weinreich |
| 5,693,903 A | 12/1997 | Heidorn et al. |
| D389,216 S | 1/1998 | Isetani et al. |
| 5,704,836 A | 1/1998 | Norton et al. |
| 5,715,179 A | 2/1998 | Park |
| 5,719,344 A | 2/1998 | Pawate |
| 5,723,802 A | 3/1998 | Johnson et al. |
| 5,734,961 A | 3/1998 | Castille |
| 5,739,457 A | 4/1998 | Devecka |
| 5,763,804 A | 6/1998 | Rigopulos et al. |
| 5,768,396 A | 6/1998 | Sone |
| 5,777,251 A | 7/1998 | Hotta et al. |
| 5,782,692 A | 7/1998 | Stelovsky |
| D398,916 S | 9/1998 | Bernardi |
| 5,804,752 A | 9/1998 | Sone et al. |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,830,065 A | 11/1998 | Sitrick |
| 5,833,469 A | 11/1998 | Ito et al. |
| D403,024 S | 12/1998 | Muraki et al. |
| 5,861,881 A | 1/1999 | Freeman et al. |
| 5,874,686 A | 2/1999 | Ghias et al. |
| 5,880,788 A | 3/1999 | Bregler |
| 5,886,275 A | 3/1999 | Kato et al. |
| 5,889,224 A | 3/1999 | Tanaka |
| 5,906,494 A | 5/1999 | Ogawa et al. |
| D411,258 S | 6/1999 | Isetani et al. |
| 5,913,727 A | 6/1999 | Ahdoot |
| 5,915,288 A | 6/1999 | Gabriel |
| 5,915,972 A | 6/1999 | Tada |
| 5,915,975 A | 6/1999 | McGrath |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,983,280 A | 11/1999 | Hunt |
| 5,990,405 A | 11/1999 | Auten et al. |
| 5,999,173 A | 12/1999 | Ubillos |
| 6,001,013 A | 12/1999 | Ota |
| 6,009,457 A | 12/1999 | Moller |
| 6,011,212 A | 1/2000 | Rigopulos et al. |
| 6,016,380 A | 1/2000 | Norton |
| 6,018,121 A | 1/2000 | Devecka |
| 6,032,156 A | 2/2000 | Marcus |
| 6,065,042 A | 5/2000 | Reimer et al. |
| 6,066,792 A | 5/2000 | Sone |
| 6,067,126 A | 5/2000 | Alexander |
| 6,067,566 A | 5/2000 | Moline |
| 6,072,113 A | 6/2000 | Tohgi et al. |
| 6,072,480 A | 6/2000 | Gorbet et al. |
| 6,073,489 A | 6/2000 | French et al. |
| 6,074,215 A | 6/2000 | Tsurumi |
| 6,075,197 A | 6/2000 | Chan |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,121,531 A | 9/2000 | Kato |
| 6,142,870 A | 11/2000 | Wada et al. |
| 6,150,947 A | 11/2000 | Shima |
| 6,162,981 A | 12/2000 | Newcomer et al. |
| 6,166,314 A | 12/2000 | Weinstock et al. |
| 6,177,623 B1 | 1/2001 | Ooseki |
| 6,182,044 B1 | 1/2001 | Fong et al. |
| 6,184,899 B1 | 2/2001 | Akemann |
| 6,191,350 B1 | 2/2001 | Okulov et al. |
| 6,215,411 B1 | 4/2001 | Gothard |
| 6,224,486 B1 | 5/2001 | Walker et al. |
| 6,225,547 B1 | 5/2001 | Toyama et al. |
| 6,227,968 B1 | 5/2001 | Suzuki et al. |
| 6,227,974 B1 | 5/2001 | Eilat et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,268,557 B1 | 7/2001 | Devecka |

(56) References Cited

U.S. PATENT DOCUMENTS

| | | |
|---|---|---|
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,326,536 B1 | 12/2001 | Wang |
| 6,329,620 B1 | 12/2001 | Oishi et al. |
| 6,337,433 B1 | 1/2002 | Nishimoto |
| 6,342,665 B1 | 1/2002 | Okita et al. |
| 6,347,998 B1 | 2/2002 | Yoshitomi et al. |
| 6,350,942 B1 | 2/2002 | Thomson |
| 6,352,432 B1 | 3/2002 | Tsai et al. |
| 6,353,174 B1 | 3/2002 | Schmidt et al. |
| D455,792 S | 4/2002 | Isetani et al. |
| 6,369,313 B2 | 4/2002 | Devecka |
| 6,379,244 B1 | 4/2002 | Sagawa et al. |
| 6,380,474 B2 | 4/2002 | Taruguchi et al. |
| 6,380,950 B1 | 4/2002 | Montgomery et al. |
| 6,384,736 B1 | 5/2002 | Gothard |
| 6,390,923 B1 | 5/2002 | Yoshitomi et al. |
| 6,392,133 B1 | 5/2002 | Georges |
| 6,407,324 B1 | 6/2002 | Hulcher |
| 6,410,835 B2 | 6/2002 | Suzuki et al. |
| 6,417,432 B1 | 7/2002 | Downing |
| 6,425,822 B1 | 7/2002 | Hayashida et al. |
| 6,425,825 B1 | 7/2002 | Sitrick |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| 6,437,227 B1 | 8/2002 | Theimer |
| 6,438,611 B1 | 8/2002 | Hara et al. |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 | 11/2002 | Egozy et al. |
| 6,483,018 B2 | 11/2002 | Mead |
| 6,504,089 B1 | 1/2003 | Negishi et al. |
| 6,504,990 B1 | 1/2003 | Abecassis |
| 6,506,969 B1 | 1/2003 | Baron |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,541,692 B2 | 4/2003 | Miller |
| 6,542,155 B1 | 4/2003 | Mifune et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,555,737 B2 | 4/2003 | Miyaki et al. |
| 6,570,078 B2 | 5/2003 | Ludwig |
| 6,577,330 B1 | 6/2003 | Tsuda et al. |
| 6,582,235 B1 | 6/2003 | Tsai et al. |
| 6,582,309 B2 | 6/2003 | Higurashi et al. |
| 6,589,120 B1 | 7/2003 | Takahashi |
| 6,598,074 B1 | 7/2003 | Moller et al. |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,629,892 B2 | 10/2003 | Oe et al. |
| 6,634,886 B2 | 10/2003 | Oyama et al. |
| 6,636,877 B1 | 10/2003 | Doleac et al. |
| 6,638,160 B2 | 10/2003 | Yoshitomi |
| 6,645,067 B1 | 11/2003 | Okita et al. |
| 6,645,076 B1 | 11/2003 | Sugai |
| 6,645,784 B2 | 11/2003 | Tayebati et al. |
| 6,653,545 B2 | 11/2003 | Redmann et al. |
| 6,659,873 B1 | 12/2003 | Kitano et al. |
| 6,661,496 B2 | 12/2003 | Sherman et al. |
| 6,663,491 B2 | 12/2003 | Watabe et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |
| 6,684,480 B2 | 2/2004 | Conrad |
| 6,685,480 B2 | 2/2004 | Nishimoto et al. |
| 6,695,694 B2 | 2/2004 | Ishikawa et al. |
| 6,712,692 B2 | 3/2004 | Basson et al. |
| 6,725,108 B1 | 4/2004 | Hall |
| 6,727,889 B2 | 4/2004 | Shaw |
| 6,733,382 B2 | 5/2004 | Oe et al. |
| 6,738,052 B1 | 5/2004 | Manke et al. |
| 6,740,802 B1 | 5/2004 | Browne, Jr. |
| 6,740,803 B2 | 5/2004 | Brinkman et al. |
| 6,743,099 B2 | 6/2004 | Yabe et al. |
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,801,930 B1 | 10/2004 | Dionne et al. |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,835,887 B2 | 12/2004 | Devecka |
| 6,838,608 B2 | 1/2005 | Koike |
| 6,843,726 B1 | 1/2005 | Nomi et al. |
| 6,850,252 B1 | 2/2005 | Hoffberg |
| 6,852,034 B2 | 2/2005 | Nagata et al. |
| 6,856,923 B2 | 2/2005 | Jung |
| 6,857,960 B2 | 2/2005 | Okubo et al. |
| D503,407 S | 3/2005 | Kaku |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,898,637 B2 | 5/2005 | Curtin |
| 6,905,413 B1 | 6/2005 | Terao et al. |
| 6,915,488 B2 | 7/2005 | Omori et al. |
| 6,921,332 B2 | 7/2005 | Fukunaga et al. |
| 6,924,425 B2 | 8/2005 | Naples et al. |
| 6,930,235 B2 | 8/2005 | Sandborn et al. |
| 6,930,236 B2 | 8/2005 | Jung |
| 6,936,758 B2 | 8/2005 | Itoh |
| 6,949,023 B1 | 9/2005 | Okubo et al. |
| 6,953,887 B2 | 10/2005 | Nagashima et al. |
| 6,964,610 B2 | 11/2005 | Yamauchi et al. |
| 6,967,275 B2 | 11/2005 | Ozick |
| 6,976,918 B2 | 12/2005 | Hosokawa |
| 6,991,542 B2 | 1/2006 | Asami et al. |
| 6,995,765 B2 | 2/2006 | Boudier |

(56) References Cited

U.S. PATENT DOCUMENTS

| | | |
|---|---|---|
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,010,291 B2 | 3/2006 | Iwanaga |
| D519,569 S | 4/2006 | Kiyono et al. |
| 7,022,905 B1 | 4/2006 | Hinman et al. |
| 7,027,046 B2 | 4/2006 | Zhang |
| 7,027,124 B2 | 4/2006 | Foote et al. |
| 7,030,307 B2 | 4/2006 | Wedel |
| 7,030,311 B2 | 4/2006 | Brinkman et al. |
| 7,037,197 B2 | 5/2006 | Watanabe |
| 7,038,855 B2 | 5/2006 | French et al. |
| 7,044,856 B2 | 5/2006 | Suzuki |
| 7,044,857 B1 | 5/2006 | Klitsner et al. |
| 7,064,672 B2 | 6/2006 | Gothard |
| 7,066,818 B2 | 6/2006 | Ikeda |
| 7,069,296 B2 | 6/2006 | Moller et al. |
| 7,070,500 B1 | 7/2006 | Nomi et al. |
| 7,071,914 B1 | 7/2006 | Marks |
| 7,074,999 B2 | 7/2006 | Sitrick et al. |
| 7,076,052 B2 | 7/2006 | Yoshimura |
| 7,079,026 B2 | 7/2006 | Smith |
| 7,079,114 B1 | 7/2006 | Smith et al. |
| 7,084,855 B2 | 8/2006 | Kaku et al. |
| 7,084,888 B2 | 8/2006 | Takahama et al. |
| 7,098,392 B2 | 8/2006 | Sitrick et al. |
| 7,098,921 B2 | 8/2006 | Nash et al. |
| 7,103,873 B2 | 9/2006 | Tanner et al. |
| 7,119,268 B2 | 10/2006 | Futamase et al. |
| 7,122,751 B1 | 10/2006 | Anderson et al. |
| 7,123,272 B2 | 10/2006 | Moriyama |
| 7,126,607 B2 | 10/2006 | Emerson |
| 7,128,649 B2 | 10/2006 | Nobe et al. |
| 7,129,408 B2 | 10/2006 | Uehara |
| 7,134,876 B2 | 11/2006 | Hou |
| 7,142,807 B2 | 11/2006 | Lee |
| 7,143,353 B2 | 11/2006 | McGee et al. |
| 7,145,070 B2 | 12/2006 | Barry |
| D535,659 S | 1/2007 | Hally et al. |
| 7,164,075 B2 | 1/2007 | Tada |
| 7,164,076 B2 | 1/2007 | McHale et al. |
| 7,169,998 B2 | 1/2007 | Kondo et al. |
| 7,170,510 B2 | 1/2007 | Kawahara et al. |
| 7,174,510 B2 | 2/2007 | Salter |
| 7,189,912 B2 | 3/2007 | Jung |
| 7,192,353 B2 | 3/2007 | Okubo |
| 7,194,676 B2 | 3/2007 | Fayan et al. |
| 7,199,298 B2 | 4/2007 | Funaki |
| 7,199,801 B2 | 4/2007 | Tsunashima et al. |
| 7,201,659 B2 | 4/2007 | Nakayama et al. |
| 7,221,852 B2 | 5/2007 | Iizuka et al. |
| 7,223,913 B2 | 5/2007 | Knapp et al. |
| 7,227,526 B2 | 6/2007 | Hildreth et al. |
| 7,259,357 B2 | 8/2007 | Walker |
| 7,259,971 B1 | 8/2007 | Allen et al. |
| 7,263,668 B1 | 8/2007 | Lentz |
| 7,271,329 B2 | 9/2007 | Franzblau |
| 7,272,780 B2 | 9/2007 | Abbott et al. |
| 7,274,803 B1 | 9/2007 | Sharma et al. |
| 7,304,232 B1 | 12/2007 | Nicholes |
| 7,317,812 B1 | 1/2008 | Krahnstoever et al. |
| 7,320,643 B1 | 1/2008 | Brosius et al. |
| 7,323,631 B2 | 1/2008 | Miyaki et al. |
| 7,324,165 B2 | 1/2008 | Shan et al. |
| 7,336,890 B2 | 2/2008 | Lu et al. |
| 7,346,472 B1 | 3/2008 | Moskowitz et al. |
| 7,352,359 B2 | 4/2008 | Zalewski et al. |
| 7,352,952 B2 | 4/2008 | Herberger et al. |
| 7,359,121 B2 | 4/2008 | French et al. |
| 7,359,617 B2 | 4/2008 | Ma |
| D568,659 S | 5/2008 | Ophardt et al. |
| D568,892 S | 5/2008 | Stabb et al. |
| D569,382 S | 5/2008 | Yow et al. |
| 7,367,887 B2 | 5/2008 | Watabe et al. |
| 7,383,508 B2 | 6/2008 | Toyama et al. |
| 7,391,409 B2 | 6/2008 | Zalewski et al. |
| 7,391,874 B1 | 6/2008 | Semmes, Jr. et al. |
| D572,265 S | 7/2008 | Guimaraes et al. |
| 7,398,002 B2 | 7/2008 | Hsiao et al. |
| 7,408,106 B2 | 8/2008 | Weiner et al. |
| 7,423,213 B2 | 9/2008 | Sitrick |
| 7,430,360 B2 | 9/2008 | Abecassis |
| 7,432,810 B2 | 10/2008 | Menache et al. |
| 7,435,178 B1 | 10/2008 | Tam et al. |
| 7,453,035 B1 | 11/2008 | Evans et al. |
| 7,458,025 B2 | 11/2008 | Crow et al. |
| 7,459,324 B1 | 12/2008 | Ptasinski et al. |
| 7,459,624 B2 | 12/2008 | Schmidt et al. |
| 7,462,772 B2 | 12/2008 | Salter |
| 7,480,446 B2 | 1/2009 | Bhadkamkar et al. |
| 7,480,873 B2 | 1/2009 | Kawahara |
| 7,488,886 B2 | 2/2009 | Kemp |
| D590,407 S | 4/2009 | Watanabe et al. |
| 7,521,619 B2 | 4/2009 | Salter |
| 7,528,315 B2 | 5/2009 | Goodwin |
| 7,536,654 B2 | 5/2009 | Anthony et al. |
| 7,546,130 B2 | 6/2009 | Vance |
| 7,559,834 B1 | 7/2009 | York |
| 7,559,841 B2 | 7/2009 | Hashimoto |
| 7,579,543 B2 | 8/2009 | Haruyama et al. |
| D599,812 S | 9/2009 | Hirsch |
| D599,819 S | 9/2009 | Lew |
| 7,582,015 B2 | 9/2009 | Onoda et al. |
| 7,589,727 B2 | 9/2009 | Haeker |
| 7,593,618 B2 | 9/2009 | Xu et al. |
| 7,599,554 B2 | 10/2009 | Agnihotri et al. |
| 7,605,322 B2 | 10/2009 | Nakamura |
| 7,612,278 B2 | 11/2009 | Sitrick et al. |
| 7,625,284 B2 | 12/2009 | Kay et al. |
| 7,628,699 B2 | 12/2009 | Onoda et al. |
| 7,640,069 B1 | 12/2009 | Johnston |
| D607,892 S | 1/2010 | Murchie et al. |
| 7,649,134 B2 | 1/2010 | Kashioka |
| D609,715 S | 2/2010 | Chaudhri |
| 7,660,510 B2 | 2/2010 | Kawahara et al. |
| 7,660,700 B2 | 2/2010 | Moskowitz et al. |
| 7,690,017 B2 | 3/2010 | Stecyk et al. |
| 7,692,630 B2 | 4/2010 | Natsume et al. |
| 7,714,849 B2 | 5/2010 | Pryor |
| 7,716,572 B2 | 5/2010 | Beauregard et al. |
| 7,722,450 B2 | 5/2010 | Onoda et al. |
| 7,747,348 B2 | 6/2010 | Shim et al. |
| D619,598 S | 7/2010 | Maitlen et al. |
| D619,609 S | 7/2010 | Meziere |
| 7,754,961 B1 | 7/2010 | Yang et al. |
| 7,758,427 B2 | 7/2010 | Egozy |
| 7,760,908 B2 | 7/2010 | Curtner et al. |
| 7,772,480 B2 | 8/2010 | Brennan |
| 7,774,706 B2 | 8/2010 | Sakai |
| 7,789,741 B1 | 9/2010 | Fields et al. |
| 7,791,808 B2 | 9/2010 | French et al. |
| 7,797,641 B2 | 9/2010 | Karukka et al. |
| D624,932 S | 10/2010 | Chaudhri |
| 7,806,759 B2 | 10/2010 | McHale et al. |
| 7,814,436 B2 | 10/2010 | Schrag et al. |
| 7,823,070 B2 | 10/2010 | Nelson et al. |
| 7,829,777 B2 | 11/2010 | Kyuma et al. |
| 7,838,755 B2 | 11/2010 | Taub et al. |
| 7,840,288 B2 | 11/2010 | Graepel et al. |
| 7,840,907 B2 | 11/2010 | Kikuchi et al. |
| D628,582 S | 12/2010 | Kurozumi et al. |
| 7,853,896 B2 | 12/2010 | Ok et al. |
| 7,853,897 B2 | 12/2010 | Ogawa et al. |
| 7,865,834 B1 | 1/2011 | van Os et al. |
| 7,877,690 B2 | 1/2011 | Margulis |
| 7,881,702 B2 | 2/2011 | Heyworth et al. |
| 7,890,867 B1 | 2/2011 | Margulis |
| 7,893,337 B2 | 2/2011 | Lenz |
| 7,895,617 B2 | 2/2011 | Pedlow, Jr. |
| 7,899,389 B2 | 3/2011 | Mangum |
| 7,904,814 B2 | 3/2011 | Errico et al. |
| 7,917,644 B2 | 3/2011 | Vedantham et al. |
| 7,920,931 B2 | 4/2011 | Van de Sluis et al. |

(56) References Cited

U.S. PATENT DOCUMENTS

| | | |
|---|---|---|
| 7,923,620 B2 | 4/2011 | Foster |
| 7,928,307 B2 | 4/2011 | Hetherington et al. |
| 7,935,880 B2 | 5/2011 | Stoddard et al. |
| 7,949,494 B2 | 5/2011 | Moskowitz et al. |
| 7,973,230 B2 | 7/2011 | Mahowald |
| 7,980,997 B2 | 7/2011 | Thukral et al. |
| 7,982,114 B2 | 7/2011 | Applewhite et al. |
| 8,003,872 B2 | 8/2011 | Lopiccolo et al. |
| 8,010,088 B2 | 8/2011 | Cheng |
| 8,026,435 B2 | 9/2011 | Stoddard et al. |
| 8,057,290 B2 | 11/2011 | Vance et al. |
| D650,802 S | 12/2011 | Jang et al. |
| 8,076,564 B2 | 12/2011 | Applewhite |
| 8,076,574 B2 | 12/2011 | Irmer et al. |
| 8,079,901 B2 | 12/2011 | Brosius et al. |
| 8,079,907 B2 | 12/2011 | Egozy |
| 8,080,722 B2 | 12/2011 | Applewhite et al. |
| D651,608 S | 1/2012 | Allen et al. |
| D651,609 S | 1/2012 | Pearson et al. |
| 8,176,439 B2 | 5/2012 | Kamen et al. |
| 8,198,526 B2 | 6/2012 | Izen et al. |
| 8,202,161 B2 | 6/2012 | Leake et al. |
| 8,205,172 B2 | 6/2012 | Wong et al. |
| 8,209,606 B2 | 6/2012 | Ording |
| 8,214,175 B2 | 7/2012 | Moskowitz et al. |
| 8,225,227 B2 | 7/2012 | Headrick et al. |
| 8,230,360 B2 | 7/2012 | Ma et al. |
| D664,975 S | 8/2012 | Arnold |
| D673,177 S | 12/2012 | McKiernan |
| D673,582 S | 1/2013 | Carriuolo et al. |
| D673,583 S | 1/2013 | McKiernan |
| D680,552 S | 4/2013 | McKiernan |
| D689,902 S | 9/2013 | Carriuolo et al. |
| 2001/0004861 A1 | 6/2001 | Suzuki et al. |
| 2001/0007824 A1 | 7/2001 | Fukuda |
| 2001/0007829 A1 | 7/2001 | Suzuki |
| 2001/0008844 A1 | 7/2001 | Yamauchi et al. |
| 2001/0008846 A1 | 7/2001 | Yamauchi et al. |
| 2001/0012795 A1 | 8/2001 | Asami et al. |
| 2001/0014440 A1 | 8/2001 | Oyama et al. |
| 2001/0014620 A1 | 8/2001 | Nobe et al. |
| 2001/0014621 A1 | 8/2001 | Okubo et al. |
| 2001/0016510 A1 | 8/2001 | Ishikawa et al. |
| 2001/0023202 A1 | 9/2001 | Okubo |
| 2001/0024972 A1 | 9/2001 | Kitao |
| 2001/0030652 A1 | 10/2001 | Kitao |
| 2001/0031653 A1 | 10/2001 | Oe et al. |
| 2001/0033287 A1 | 10/2001 | Naegle et al. |
| 2001/0035868 A1 | 11/2001 | Uehara et al. |
| 2001/0036861 A1 | 11/2001 | Uehara et al. |
| 2001/0037181 A1 | 11/2001 | Matsuura et al. |
| 2001/0039207 A1 | 11/2001 | Horigami et al. |
| 2001/0041615 A1 | 11/2001 | Kondo |
| 2002/0002411 A1 | 1/2002 | Higurashi et al. |
| 2002/0002900 A1 | 1/2002 | Cho |
| 2002/0004420 A1 | 1/2002 | Suga et al. |
| 2002/0005109 A1 | 1/2002 | Miller |
| 2002/0006819 A1 | 1/2002 | Kubo et al. |
| 2002/0006823 A1 | 1/2002 | Horio |
| 2002/0013166 A1 | 1/2002 | Yoshitomi |
| 2002/0016203 A1 | 2/2002 | Nagata et al. |
| 2002/0019258 A1 | 2/2002 | Kim et al. |
| 2002/0022520 A1 | 2/2002 | Oe et al. |
| 2002/0022522 A1 | 2/2002 | Yamada |
| 2002/0025841 A1 | 2/2002 | Nobe et al. |
| 2002/0025842 A1 | 2/2002 | Nobe et al. |
| 2002/0025853 A1 | 2/2002 | Kojima et al. |
| 2002/0027899 A1 | 3/2002 | Ikeda |
| 2002/0032054 A1 | 3/2002 | Hosoya |
| 2002/0041385 A1 | 4/2002 | Onodera |
| 2002/0052236 A1 | 5/2002 | Kohira et al. |
| 2002/0054127 A1 | 5/2002 | Omori et al. |
| 2002/0055383 A1 | 5/2002 | Onda et al. |
| 2002/0055386 A1 | 5/2002 | Yotsugi et al. |
| 2002/0061776 A1 | 5/2002 | Wada et al. |
| 2002/0065121 A1 | 5/2002 | Fukunaga et al. |
| 2002/0085833 A1 | 7/2002 | Miyauchi |
| 2002/0091455 A1 | 7/2002 | Williams |
| 2002/0091847 A1 | 7/2002 | Curtin |
| 2002/0094865 A1 | 7/2002 | Araki et al. |
| 2002/0094866 A1 | 7/2002 | Takeda et al. |
| 2002/0105229 A1 | 8/2002 | Tanaka et al. |
| 2002/0119811 A1 | 8/2002 | Yabe et al. |
| 2002/0128736 A1 | 9/2002 | Yoshida et al. |
| 2002/0142818 A1 | 10/2002 | Nakatsuka et al. |
| 2002/0142824 A1 | 10/2002 | Kazaoka et al. |
| 2002/0142827 A1 | 10/2002 | Aida et al. |
| 2002/0142834 A1 | 10/2002 | Sobue |
| 2002/0151337 A1 | 10/2002 | Yamashita et al. |
| 2002/0160824 A1 | 10/2002 | Goto et al. |
| 2002/0169014 A1 | 11/2002 | Egozy et al. |
| 2002/0187835 A1 | 12/2002 | Nakayama et al. |
| 2002/0198045 A1 | 12/2002 | Okubo |
| 2003/0000364 A1 | 1/2003 | Deverich |
| 2003/0003431 A1 | 1/2003 | Maeda |
| 2003/0003991 A1 | 1/2003 | Kuraishi |
| 2003/0003992 A1 | 1/2003 | Furuya |
| 2003/0011620 A1 | 1/2003 | Moriyama |
| 2003/0014262 A1 | 1/2003 | Kim |
| 2003/0017872 A1 | 1/2003 | Oishi et al. |
| 2003/0028598 A1 | 2/2003 | Moller et al. |
| 2003/0032478 A1 | 2/2003 | Takahama et al. |
| 2003/0045334 A1 | 3/2003 | Hosokawa |
| 2003/0069071 A1 | 4/2003 | Britt et al. |
| 2003/0070159 A1 | 4/2003 | Webb |
| 2003/0078086 A1 | 4/2003 | Matsuyama et al. |
| 2003/0078102 A1 | 4/2003 | Okita et al. |
| 2003/0099461 A1 | 5/2003 | Johnson |
| 2003/0104868 A1 | 6/2003 | Okita et al. |
| 2003/0109298 A1 | 6/2003 | Oishi et al. |
| 2003/0151628 A1 | 8/2003 | Salter |
| 2003/0164084 A1 | 9/2003 | Redmann et al. |
| 2003/0195041 A1 | 10/2003 | McCauley |
| 2003/0199317 A1 | 10/2003 | McCauley |
| 2003/0214498 A1 | 11/2003 | Gothard |
| 2003/0218626 A1 | 11/2003 | Greene |
| 2003/0232644 A1 | 12/2003 | Takahashi et al. |
| 2003/0232645 A1 | 12/2003 | Suda et al. |
| 2004/0012540 A1 | 1/2004 | Treibitz et al. |
| 2004/0021684 A1 | 2/2004 | Millner |
| 2004/0054725 A1 | 3/2004 | Moller et al. |
| 2004/0063479 A1 | 4/2004 | Kimura |
| 2004/0063480 A1 | 4/2004 | Wang |
| 2004/0072620 A1 | 4/2004 | Nagata et al. |
| 2004/0077405 A1 | 4/2004 | Watanabe |
| 2004/0082380 A1 | 4/2004 | George et al. |
| 2004/0082386 A1 | 4/2004 | George et al. |
| 2004/0089139 A1 | 5/2004 | Georges et al. |
| 2004/0092303 A1 | 5/2004 | George et al. |
| 2004/0092304 A1 | 5/2004 | George et al. |
| 2004/0092305 A1 | 5/2004 | George et al. |
| 2004/0092306 A1 | 5/2004 | George et al. |
| 2004/0092307 A1 | 5/2004 | George et al. |
| 2004/0092313 A1 | 5/2004 | Saito et al. |
| 2004/0092314 A1 | 5/2004 | George et al. |
| 2004/0093354 A1 | 5/2004 | Xu et al. |
| 2004/0098582 A1 | 5/2004 | Mori |
| 2004/0109000 A1 | 6/2004 | Chosokabe |
| 2004/0113360 A1 | 6/2004 | George et al. |
| 2004/0116069 A1 | 6/2004 | Fadavi-Ardekani et al. |
| 2004/0116184 A1 | 6/2004 | George et al. |
| 2004/0116185 A1 | 6/2004 | George et al. |
| 2004/0123726 A1 | 7/2004 | Kato et al. |
| 2004/0127282 A1 | 7/2004 | Naobayashi |
| 2004/0127291 A1 | 7/2004 | George et al. |
| 2004/0132518 A1 | 7/2004 | Uehara et al. |
| 2004/0132531 A1 | 7/2004 | George et al. |
| 2004/0137984 A1 | 7/2004 | Salter |
| 2004/0152514 A1 | 8/2004 | Kasai et al. |
| 2004/0154460 A1 | 8/2004 | Virolainen et al. |
| 2004/0181592 A1 | 9/2004 | Samra et al. |
| 2004/0186720 A1 | 9/2004 | Kemmochi |
| 2004/0204211 A1 | 10/2004 | Suzuki |
| 2004/0204238 A1 | 10/2004 | Aoki |

(56) References Cited

U.S. PATENT DOCUMENTS

| | | |
|---|---|---|
| 2004/0205204 A1 | 10/2004 | Chafe |
| 2004/0207774 A1 | 10/2004 | Gothard |
| 2004/0209673 A1 | 10/2004 | Shiraishi |
| 2004/0229685 A1 | 11/2004 | Smith et al. |
| 2004/0236543 A1 | 11/2004 | Stephens |
| 2004/0239678 A1 | 12/2004 | Tsunashima et al. |
| 2004/0243482 A1 | 12/2004 | Laut |
| 2004/0254016 A1 | 12/2004 | Shimazaki |
| 2004/0259631 A1 | 12/2004 | Katz et al. |
| 2004/0259632 A1 | 12/2004 | Crittenden et al. |
| 2004/0259644 A1 | 12/2004 | McCauley |
| 2005/0027381 A1 | 2/2005 | George et al. |
| 2005/0027383 A1 | 2/2005 | Nagata et al. |
| 2005/0045025 A1 | 3/2005 | Wells et al. |
| 2005/0049047 A1 | 3/2005 | Kitao |
| 2005/0059480 A1 | 3/2005 | Soukup et al. |
| 2005/0060231 A1 | 3/2005 | Soukup et al. |
| 2005/0070349 A1 | 3/2005 | Kimura |
| 2005/0070359 A1 | 3/2005 | Rodriquez et al. |
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0101364 A1 | 5/2005 | Onoda et al. |
| 2005/0106546 A1 | 5/2005 | Strom |
| 2005/0115383 A1 | 6/2005 | Chang |
| 2005/0120865 A1 | 6/2005 | Tada |
| 2005/0120868 A1 | 6/2005 | Hinman et al. |
| 2005/0143174 A1 | 6/2005 | Goldman et al. |
| 2005/0164779 A1 | 7/2005 | Okuniewicz |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0229769 A1 | 10/2005 | Resnikoff |
| 2005/0235809 A1 | 10/2005 | Kageyama |
| 2005/0250565 A1 | 11/2005 | Nojiri et al. |
| 2005/0252362 A1 | 11/2005 | McHale et al. |
| 2005/0255914 A1 | 11/2005 | McHale et al. |
| 2005/0255923 A1 | 11/2005 | Aoki |
| 2005/0273319 A1 | 12/2005 | Dittmar et al. |
| 2006/0003839 A1 | 1/2006 | Lawrence et al. |
| 2006/0009282 A1 | 1/2006 | George et al. |
| 2006/0009979 A1 | 1/2006 | McHale et al. |
| 2006/0026304 A1 | 2/2006 | Price |
| 2006/0030382 A1 | 2/2006 | Okamura et al. |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0058101 A1 | 3/2006 | Rigopulos |
| 2006/0063573 A1 | 3/2006 | Ishikawa et al. |
| 2006/0068911 A1 | 3/2006 | Pirich et al. |
| 2006/0107819 A1 | 5/2006 | Salter |
| 2006/0107822 A1 | 5/2006 | Bowen |
| 2006/0135253 A1 | 6/2006 | George et al. |
| 2006/0152622 A1 | 7/2006 | Tan et al. |
| 2006/0154710 A1 | 7/2006 | Serafat |
| 2006/0166744 A1 | 7/2006 | Igarashi et al. |
| 2006/0175758 A1 | 8/2006 | Riolo |
| 2006/0180008 A1 | 8/2006 | Negoescu et al. |
| 2006/0189879 A1 | 8/2006 | Miyajima et al. |
| 2006/0191401 A1 | 8/2006 | Ueshima et al. |
| 2006/0204214 A1 | 9/2006 | Shah et al. |
| 2006/0218239 A1 | 9/2006 | Umezawa et al. |
| 2006/0218288 A1 | 9/2006 | Umezawa et al. |
| 2006/0247046 A1 | 11/2006 | Choi et al. |
| 2006/0252503 A1 | 11/2006 | Salter |
| 2006/0258450 A1 | 11/2006 | Ishihata et al. |
| 2006/0266200 A1 | 11/2006 | Goodwin |
| 2006/0287106 A1 | 12/2006 | Jensen |
| 2006/0288842 A1 | 12/2006 | Sitrick et al. |
| 2006/0290810 A1 | 12/2006 | Mallinson |
| 2007/0015571 A1 | 1/2007 | Walker et al. |
| 2007/0026943 A1 | 2/2007 | Yoshimura |
| 2007/0059670 A1 | 3/2007 | Yates |
| 2007/0060312 A1 | 3/2007 | Dempsey et al. |
| 2007/0081562 A1 | 4/2007 | Ma |
| 2007/0088812 A1 | 4/2007 | Clark |
| 2007/0111802 A1 | 5/2007 | Ishihara et al. |
| 2007/0119292 A1 | 5/2007 | Nakamura |
| 2007/0140510 A1 | 6/2007 | Redmann |
| 2007/0155494 A1 | 7/2007 | Wells et al. |
| 2007/0162497 A1 | 7/2007 | Pauws |
| 2007/0163427 A1 | 7/2007 | Rigopulos et al. |
| 2007/0163428 A1 | 7/2007 | Salter |
| 2007/0168415 A1 | 7/2007 | Matahira et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0226293 A1 | 9/2007 | Sakurada et al. |
| 2007/0232374 A1 | 10/2007 | Lopiccolo et al. |
| 2007/0234284 A1 | 10/2007 | Tanner et al. |
| 2007/0234881 A1 | 10/2007 | Takehisa |
| 2007/0234885 A1 | 10/2007 | Schmidt et al. |
| 2007/0243915 A1 | 10/2007 | Egozy et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0260984 A1 | 11/2007 | Marks et al. |
| 2007/0265095 A1 | 11/2007 | Jonishi |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0009346 A1 | 1/2008 | Jessop et al. |
| 2008/0026355 A1 | 1/2008 | Petef |
| 2008/0053295 A1 | 3/2008 | Goto et al. |
| 2008/0076497 A1 | 3/2008 | Kiskis et al. |
| 2008/0096654 A1 | 4/2008 | Mondesir et al. |
| 2008/0101762 A1 | 5/2008 | Kellock et al. |
| 2008/0102958 A1 | 5/2008 | Kitamura et al. |
| 2008/0113698 A1* | 5/2008 | Egozy ............................. 463/7 |
| 2008/0113797 A1 | 5/2008 | Egozy |
| 2008/0115657 A1 | 5/2008 | Wakiyama |
| 2008/0125229 A1 | 5/2008 | Jonishi |
| 2008/0146342 A1 | 6/2008 | Harvey et al. |
| 2008/0155421 A1 | 6/2008 | Ubillos et al. |
| 2008/0184870 A1 | 8/2008 | Toivola |
| 2008/0192736 A1 | 8/2008 | Jabri et al. |
| 2008/0200224 A1 | 8/2008 | Parks |
| 2008/0202321 A1 | 8/2008 | Goto et al. |
| 2008/0220864 A1 | 9/2008 | Brosius et al. |
| 2008/0222685 A1 | 9/2008 | McCarthy et al. |
| 2008/0268943 A1 | 10/2008 | Jacob |
| 2008/0273755 A1 | 11/2008 | Hildreth |
| 2008/0276175 A1 | 11/2008 | Kim et al. |
| 2008/0280680 A1 | 11/2008 | Dutilly et al. |
| 2008/0288866 A1 | 11/2008 | Spencer et al. |
| 2008/0289477 A1 | 11/2008 | Salter |
| 2008/0311969 A1 | 12/2008 | Kay et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0038467 A1 | 2/2009 | Brennan |
| 2009/0069096 A1 | 3/2009 | Nishimoto |
| 2009/0073117 A1 | 3/2009 | Tsurumi et al. |
| 2009/0075711 A1 | 3/2009 | Brosius et al. |
| 2009/0082078 A1 | 3/2009 | Schmidt et al. |
| 2009/0083281 A1 | 3/2009 | Sarig et al. |
| 2009/0088249 A1 | 4/2009 | Kay et al. |
| 2009/0098918 A1 | 4/2009 | Teasdale et al. |
| 2009/0100992 A1 | 4/2009 | Elion |
| 2009/0104956 A1 | 4/2009 | Kay et al. |
| 2009/0122146 A1 | 5/2009 | Zalewski et al. |
| 2009/0135135 A1 | 5/2009 | Tsurumi |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |

(56) References Cited

U.S. PATENT DOCUMENTS

| | | |
|---|---|---|
| 2009/0191932 A1 | 7/2009 | Chiu et al. |
| 2009/0215533 A1 | 8/2009 | Zalewski et al. |
| 2009/0222392 A1 | 9/2009 | Martin et al. |
| 2009/0228544 A1 | 9/2009 | Demers et al. |
| 2009/0231425 A1 | 9/2009 | Zalewski |
| 2009/0233714 A1 | 9/2009 | Toro |
| 2009/0241758 A1 | 10/2009 | Neubacker |
| 2009/0258686 A1 | 10/2009 | McCauley et al. |
| 2009/0258700 A1 | 10/2009 | Bright et al. |
| 2009/0258703 A1 | 10/2009 | Brunstetter |
| 2009/0260508 A1 | 10/2009 | Elion |
| 2009/0265668 A1 | 10/2009 | Esser et al. |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0317783 A1 | 12/2009 | Noguchi |
| 2009/0318228 A1 | 12/2009 | Hughes |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035688 A1 | 2/2010 | Picunko |
| 2010/0041477 A1 | 2/2010 | Kay et al. |
| 2010/0062405 A1 | 3/2010 | Zboray et al. |
| 2010/0064238 A1 | 3/2010 | Ludwig |
| 2010/0080528 A1 | 4/2010 | Yen et al. |
| 2010/0087240 A1 | 4/2010 | Egozy et al. |
| 2010/0100848 A1 | 4/2010 | Ananian et al. |
| 2010/0113117 A1 | 5/2010 | Ku et al. |
| 2010/0120470 A1 | 5/2010 | Kim et al. |
| 2010/0137049 A1 | 6/2010 | Epstein |
| 2010/0144436 A1 | 6/2010 | Marks et al. |
| 2010/0151948 A1 | 6/2010 | Vance et al. |
| 2010/0160038 A1 | 6/2010 | Youm et al. |
| 2010/0161432 A1 | 6/2010 | Kumanov et al. |
| 2010/0186579 A1 | 7/2010 | Schnitman |
| 2010/0192106 A1 | 7/2010 | Watanabe et al. |
| 2010/0209003 A1 | 8/2010 | Toebes et al. |
| 2010/0216598 A1 | 8/2010 | Nicolas et al. |
| 2010/0228740 A1 | 9/2010 | Cannistraro et al. |
| 2010/0245241 A1 | 9/2010 | Kim et al. |
| 2010/0247081 A1 | 9/2010 | Victoria Pons et al. |
| 2010/0255398 A1 | 10/2010 | Jacobson et al. |
| 2010/0255827 A1 | 10/2010 | Jordan et al. |
| 2010/0261146 A1 | 10/2010 | Kim |
| 2010/0265398 A1 | 10/2010 | Johnson et al. |
| 2010/0283723 A1 | 11/2010 | Konishi |
| 2010/0299405 A1 | 11/2010 | Socher et al. |
| 2010/0300264 A1 | 12/2010 | Foster |
| 2010/0300265 A1 | 12/2010 | Foster et al. |
| 2010/0300266 A1 | 12/2010 | Stoddard et al. |
| 2010/0300267 A1 | 12/2010 | Stoddard et al. |
| 2010/0300268 A1 | 12/2010 | Applewhite et al. |
| 2010/0300269 A1 | 12/2010 | Applewhite |
| 2010/0300270 A1 | 12/2010 | Applewhite et al. |
| 2010/0300272 A1 | 12/2010 | Scherf |
| 2010/0304810 A1* | 12/2010 | Stoddard ............ 463/7 |
| 2010/0304811 A1* | 12/2010 | Schmidt et al. ........ 463/7 |
| 2010/0304812 A1 | 12/2010 | Stoddard et al. |
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2011/0010667 A1 | 1/2011 | Sakai et al. |
| 2011/0021273 A1 | 1/2011 | Buckley et al. |
| 2011/0028214 A1 | 2/2011 | Bright et al. |
| 2011/0039659 A1 | 2/2011 | Kim et al. |
| 2011/0047471 A1 | 2/2011 | Lord et al. |
| 2011/0066940 A1 | 3/2011 | Asghari Kamrani et al. |
| 2011/0098106 A1 | 4/2011 | He et al. |
| 2011/0098109 A1 | 4/2011 | Leake et al. |
| 2011/0118621 A1 | 5/2011 | Chu |
| 2011/0140931 A1 | 6/2011 | Geurts et al. |
| 2011/0151975 A1 | 6/2011 | Mori |
| 2011/0159938 A1 | 6/2011 | Umeda |
| 2011/0185309 A1 | 7/2011 | Challinor et al. |
| 2011/0195779 A1 | 8/2011 | Lau |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1* | 10/2011 | Cook et al. .......... 704/207 |
| 2011/0256929 A1 | 10/2011 | Dubrofsky et al. |
| 2011/0257771 A1 | 10/2011 | Bennett et al. |
| 2011/0283236 A1 | 11/2011 | Beaumier et al. |
| 2011/0306396 A1 | 12/2011 | Flury et al. |
| 2011/0306397 A1* | 12/2011 | Fleming et al. ........ 463/7 |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0013493 A1 | 1/2012 | Kato |
| 2012/0021833 A1 | 1/2012 | Boch et al. |
| 2012/0052947 A1 | 3/2012 | Yun |
| 2012/0063617 A1 | 3/2012 | Ramos |
| 2012/0069131 A1 | 3/2012 | Abelow |
| 2012/0094730 A1 | 4/2012 | Egozy |
| 2012/0108305 A1 | 5/2012 | Akiyama et al. |
| 2012/0108334 A1 | 5/2012 | Tarama et al. |
| 2012/0143358 A1 | 6/2012 | Adams et al. |

FOREIGN PATENT DOCUMENTS

| | | |
|---|---|---|
| AU | 741239 B2 | 11/2001 |
| AU | 2003285918 A1 | 5/2004 |
| AU | 2010229693 A1 | 11/2011 |
| CA | 2587415 A1 | 5/2005 |
| CA | 2609587 A1 | 12/2005 |
| CA | 2720723 A1 | 11/2009 |
| CA | 2757238 A1 | 9/2010 |
| CA | 2760210 A1 | 12/2010 |
| DE | 19716937 A1 | 3/1998 |
| DE | 69804915 T2 | 9/2002 |
| DE | 69726507 T2 | 11/2004 |
| DE | 69832379 T2 | 8/2006 |
| DE | 69739885 | 7/2010 |
| EP | 0903169 A2 | 3/1999 |
| EP | 919267 A2 | 6/1999 |
| EP | 972550 A2 | 1/2000 |
| EP | 974382 A1 | 1/2000 |
| EP | 974954 A1 | 1/2000 |
| EP | 978301 A1 | 2/2000 |
| EP | 982055 A1 | 3/2000 |
| EP | 992928 A2 | 4/2000 |
| EP | 992929 A2 | 4/2000 |
| EP | 993847 A1 | 4/2000 |
| EP | 0997870 A1 | 5/2000 |
| EP | 1003130 A2 | 5/2000 |
| EP | 1022672 A1 | 7/2000 |
| EP | 1029565 A2 | 8/2000 |
| EP | 1029566 A2 | 8/2000 |
| EP | 1029570 A2 | 8/2000 |
| EP | 1029571 A2 | 8/2000 |
| EP | 1031363 A2 | 8/2000 |
| EP | 1031904 A2 | 8/2000 |
| EP | 1033157 A2 | 9/2000 |
| EP | 1033158 A2 | 9/2000 |
| EP | 1043745 A1 | 10/2000 |
| EP | 1043746 A1 | 10/2000 |
| EP | 1048330 A2 | 11/2000 |
| EP | 1061501 A1 | 12/2000 |
| EP | 1064974 A2 | 1/2001 |
| EP | 1064975 A2 | 1/2001 |
| EP | 1066866 A2 | 1/2001 |
| EP | 1079368 A1 | 2/2001 |
| EP | 1 081 680 A1 | 3/2001 |
| EP | 1081679 A1 | 3/2001 |
| EP | 1082981 A2 | 3/2001 |
| EP | 1082982 A2 | 3/2001 |
| EP | 1082983 A2 | 3/2001 |
| EP | 1088573 A2 | 4/2001 |
| EP | 1 096 468 A2 | 5/2001 |
| EP | 1114659 A2 | 7/2001 |
| EP | 1122703 A2 | 8/2001 |
| EP | 1125607 A2 | 8/2001 |
| EP | 1125613 A2 | 8/2001 |
| EP | 1127599 A2 | 8/2001 |
| EP | 1130569 A2 | 9/2001 |

(56) References Cited

FOREIGN PATENT DOCUMENTS

| | | |
|---|---|---|
| EP | 1132889 A2 | 9/2001 |
| EP | 1134723 A2 | 9/2001 |
| EP | 1136107 A2 | 9/2001 |
| EP | 1138357 A1 | 10/2001 |
| EP | 1139293 A2 | 10/2001 |
| EP | 1145744 A2 | 10/2001 |
| EP | 1145745 A2 | 10/2001 |
| EP | 1145748 A2 | 10/2001 |
| EP | 1145749 A2 | 10/2001 |
| EP | 1150276 A2 | 10/2001 |
| EP | 1151770 A2 | 11/2001 |
| EP | 1151773 A2 | 11/2001 |
| EP | 1157723 A2 | 11/2001 |
| EP | 1159992 A2 | 12/2001 |
| EP | 1160762 A2 | 12/2001 |
| EP | 1161974 A2 | 12/2001 |
| EP | 1 174 856 A2 | 1/2002 |
| EP | 1170041 A2 | 1/2002 |
| EP | 1178427 A1 | 2/2002 |
| EP | 1184061 A1 | 3/2002 |
| EP | 1187427 A2 | 3/2002 |
| EP | 1192976 A2 | 4/2002 |
| EP | 1195721 A2 | 4/2002 |
| EP | 1197947 A2 | 4/2002 |
| EP | 1199702 A2 | 4/2002 |
| EP | 1199703 A2 | 4/2002 |
| EP | 1 201 277 A2 | 5/2002 |
| EP | 1206950 A2 | 5/2002 |
| EP | 1208885 A1 | 5/2002 |
| EP | 1214959 A2 | 6/2002 |
| EP | 1220539 A2 | 7/2002 |
| EP | 1228794 A2 | 8/2002 |
| EP | 1245255 A2 | 10/2002 |
| EP | 1249260 A2 | 10/2002 |
| EP | 1258274 A2 | 11/2002 |
| EP | 1264622 A2 | 12/2002 |
| EP | 1270049 A2 | 1/2003 |
| EP | 1270050 A2 | 1/2003 |
| EP | 1271294 A2 | 1/2003 |
| EP | 1279425 A2 | 1/2003 |
| EP | 1287864 A2 | 3/2003 |
| EP | 1306112 A1 | 5/2003 |
| EP | 1413340 A1 | 4/2004 |
| EP | 000181482-0005 | 9/2004 |
| EP | 1503365 A1 | 2/2005 |
| EP | 1533010 A1 | 5/2005 |
| EP | 1542132 A1 | 6/2005 |
| EP | 1552864 A1 | 7/2005 |
| EP | 1552865 A1 | 7/2005 |
| EP | 1569171 A1 | 8/2005 |
| EP | 1604711 A1 | 12/2005 |
| EP | 1609513 A1 | 12/2005 |
| EP | 1630746 A1 | 3/2006 |
| EP | 1666109 A1 | 6/2006 |
| EP | 1696385 A2 | 8/2006 |
| EP | 1699017 A2 | 9/2006 |
| EP | 1731204 A1 | 12/2006 |
| EP | 1743680 A1 | 1/2007 |
| EP | 1 758 387 A1 | 2/2007 |
| EP | 1 825 896 A1 | 8/2007 |
| EP | 000859418-0008 | 2/2008 |
| EP | 000890447-0040 | 4/2008 |
| EP | 000890447-0046 | 4/2008 |
| EP | 2000190 A2 | 12/2008 |
| EP | 2001569 A2 | 12/2008 |
| EP | 2027577 A1 | 2/2009 |
| EP | 2206539 A1 | 7/2010 |
| EP | 2206540 A1 | 7/2010 |
| EP | 2301253 A1 | 3/2011 |
| EP | 2411101 A2 | 2/2012 |
| EP | 2494432 A2 | 9/2012 |
| FI | 200705530 | 1/2009 |
| FI | 20096276 | 12/2009 |
| GB | 2118809 A | 11/1983 |
| GB | 2425730 A | 11/2006 |
| GB | 2465918 A | 6/2010 |
| GB | 2471871 A | 1/2011 |
| HK | 1018021 A1 | 10/2002 |
| HK | 1023734 A1 | 2/2006 |
| IT | IN01685CN201 | 1/2012 |
| JP | 7185131 A | 7/1995 |
| JP | 3014386 B1 | 8/1995 |
| JP | 2552427 Y2 | 11/1996 |
| JP | 11053563 A | 2/1999 |
| JP | 11128534 A | 5/1999 |
| JP | 11128535 A | 5/1999 |
| JP | 11151380 A | 6/1999 |
| JP | 11156054 A | 6/1999 |
| JP | 2922509 | 7/1999 |
| JP | 11219443 A | 8/1999 |
| JP | 2951948 B1 | 9/1999 |
| JP | 2982147 B1 | 11/1999 |
| JP | 11313979 A | 11/1999 |
| JP | 3003851 U | 1/2000 |
| JP | 2000014931 | 1/2000 |
| JP | 3066528 U | 2/2000 |
| JP | 2000037490 | 2/2000 |
| JP | 3017986 B1 | 3/2000 |
| JP | 3031676 B1 | 4/2000 |
| JP | 2000107447 A | 4/2000 |
| JP | 2000107458 | 4/2000 |
| JP | 2000112485 A | 4/2000 |
| JP | 2000116938 A | 4/2000 |
| JP | 3053090 B1 | 6/2000 |
| JP | 2000157723 | 6/2000 |
| JP | 2000218046 | 8/2000 |
| JP | 3088409 B2 | 9/2000 |
| JP | 2000237454 A | 9/2000 |
| JP | 2000237455 A | 9/2000 |
| JP | 2000245957 | 9/2000 |
| JP | 2000245964 A | 9/2000 |
| JP | 2000245967 | 9/2000 |
| JP | 2000250534 | 9/2000 |
| JP | 2000288254 | 10/2000 |
| JP | 2000293292 A | 10/2000 |
| JP | 2000293294 A | 10/2000 |
| JP | 2000300838 A | 10/2000 |
| JP | 2000300851 A | 10/2000 |
| JP | 2000308759 A | 11/2000 |
| JP | 2000317144 A | 11/2000 |
| JP | 2000325665 A | 11/2000 |
| JP | 2000350861 A | 12/2000 |
| JP | 2001000610 A | 1/2001 |
| JP | 2001009149 A | 1/2001 |
| JP | 2001009152 A | 1/2001 |
| JP | 2001009157 A | 1/2001 |
| JP | 2001046739 A | 2/2001 |
| JP | 2001062144 A | 3/2001 |
| JP | 2001070637 A | 3/2001 |
| JP | 2001070640 A | 3/2001 |
| JP | 2001070652 A | 3/2001 |
| JP | 2001075579 A | 3/2001 |
| JP | 2001096059 A | 4/2001 |
| JP | 2001096061 A | 4/2001 |
| JP | 2001129244 A | 5/2001 |
| JP | 2001145777 A | 5/2001 |
| JP | 2001145778 A | 5/2001 |
| JP | 3179769 B2 | 6/2001 |
| JP | 2001162049 A | 6/2001 |
| JP | 2001170352 A | 6/2001 |
| JP | 2001175254 A | 6/2001 |
| JP | 3187758 B2 | 7/2001 |
| JP | 2001190834 A | 7/2001 |
| JP | 2001190835 A | 7/2001 |
| JP | 2001190844 A | 7/2001 |
| JP | 2001198351 A | 7/2001 |
| JP | 2001198352 A | 7/2001 |
| JP | 2001198354 A | 7/2001 |
| JP | 3202733 B2 | 8/2001 |
| JP | 2001212369 A | 8/2001 |
| JP | 2001218980 A | 8/2001 |
| JP | 2001222280 A | 8/2001 |
| JP | 2001224850 A | 8/2001 |
| JP | 2001231904 A | 8/2001 |

(56) References Cited

FOREIGN PATENT DOCUMENTS

| | | |
|---|---|---|
| JP | 2001232059 A | 8/2001 |
| JP | 2001232062 A | 8/2001 |
| JP | 3204652 B2 | 9/2001 |
| JP | 2001252467 A | 9/2001 |
| JP | 2001252470 A | 9/2001 |
| JP | 2001259224 A | 9/2001 |
| JP | 2001269482 A | 10/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001299975 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 A | 12/2001 |
| JP | 3245139 B2 | 1/2002 |
| JP | 2002000936 A | 1/2002 |
| JP | 2002018123 A | 1/2002 |
| JP | 2002018134 A | 1/2002 |
| JP | 2002028368 A | 1/2002 |
| JP | 3258647 B2 | 2/2002 |
| JP | 3261110 B2 | 2/2002 |
| JP | 2002045567 A | 2/2002 |
| JP | 2002056340 A | 2/2002 |
| JP | 2002066127 A | 3/2002 |
| JP | 2002066128 A | 3/2002 |
| JP | 2002084292 A | 3/2002 |
| JP | 3270928 B2 | 4/2002 |
| JP | 2002116752 A | 4/2002 |
| JP | 2002140727 A | 5/2002 |
| JP | 2002143567 A | 5/2002 |
| JP | 2002153673 A | 5/2002 |
| JP | 3306021 B2 | 7/2002 |
| JP | 2002204426 A | 7/2002 |
| JP | 3310257 B2 | 8/2002 |
| JP | 3317686 B2 | 8/2002 |
| JP | 3317956 B2 | 8/2002 |
| JP | 2002224435 A | 8/2002 |
| JP | 2002239223 A | 8/2002 |
| JP | 3320700 B2 | 9/2002 |
| JP | 3321111 B2 | 9/2002 |
| JP | 2002263229 A | 9/2002 |
| JP | 3333773 B2 | 10/2002 |
| JP | 3338005 B2 | 10/2002 |
| JP | 2002282417 A | 10/2002 |
| JP | 2002282418 A | 10/2002 |
| JP | 2002292123 A | 10/2002 |
| JP | 2002292139 A | 10/2002 |
| JP | 2002301263 A | 10/2002 |
| JP | 3345591 B2 | 11/2002 |
| JP | 3345719 B2 | 11/2002 |
| JP | 2002325975 A | 11/2002 |
| JP | 3351780 B2 | 12/2002 |
| JP | 2002360937 A | 12/2002 |
| JP | 3361084 B2 | 1/2003 |
| JP | 3370313 B2 | 1/2003 |
| JP | 3371132 B2 | 1/2003 |
| JP | 2003000951 A | 1/2003 |
| JP | 2003010541 A | 1/2003 |
| JP | 2003010542 A | 1/2003 |
| JP | 2003019346 A | 1/2003 |
| JP | 2003030686 A | 1/2003 |
| JP | 2003058317 A | 2/2003 |
| JP | 3392833 B2 | 3/2003 |
| JP | 2003117233 A | 4/2003 |
| JP | 2003126548 A | 5/2003 |
| JP | 3417555 B2 | 6/2003 |
| JP | 3417918 B2 | 6/2003 |
| JP | 3420221 B2 | 6/2003 |
| JP | 2003175279 A | 6/2003 |
| JP | 3425548 B2 | 7/2003 |
| JP | 3425552 B2 | 7/2003 |
| JP | 3433918 B2 | 8/2003 |
| JP | 3439187 B2 | 8/2003 |
| JP | 2003236244 A | 8/2003 |
| JP | 3442730 B2 | 9/2003 |
| JP | 3448043 B2 | 9/2003 |
| JP | 2003256552 A | 9/2003 |
| JP | 3458090 B2 | 10/2003 |
| JP | 3470119 B2 | 11/2003 |
| JP | 2003334387 A | 11/2003 |
| JP | 3491759 B1 | 1/2004 |
| JP | 2004016315 A | 1/2004 |
| JP | 2004016388 A | 1/2004 |
| JP | 3496874 B2 | 2/2004 |
| JP | 3500379 B1 | 2/2004 |
| JP | 3500383 B1 | 2/2004 |
| JP | 2004033266 A | 2/2004 |
| JP | 2004097610 A | 4/2004 |
| JP | 2004105309 A | 4/2004 |
| JP | 2004121397 A | 4/2004 |
| JP | 3526302 B1 | 5/2004 |
| JP | 2004141261 A | 5/2004 |
| JP | 3534345 B1 | 6/2004 |
| JP | 2004164519 A | 6/2004 |
| JP | 2004166994 A | 6/2004 |
| JP | 3545755 B2 | 7/2004 |
| JP | 3545983 B2 | 7/2004 |
| JP | 3546206 B2 | 7/2004 |
| JP | 3547374 B2 | 7/2004 |
| JP | 2004192069 A | 7/2004 |
| JP | 2004201937 A | 7/2004 |
| JP | 3561456 B2 | 9/2004 |
| JP | 3566195 B2 | 9/2004 |
| JP | 3573288 B2 | 10/2004 |
| JP | 3576994 B2 | 10/2004 |
| JP | 3582716 B2 | 10/2004 |
| JP | 2004283249 A | 10/2004 |
| JP | 2004298469 A | 10/2004 |
| JP | 2004321245 A | 11/2004 |
| JP | 3597465 B2 | 12/2004 |
| JP | 2004337256 A | 12/2004 |
| JP | 3611807 B2 | 1/2005 |
| JP | 2005046445 A | 2/2005 |
| JP | 2005049913 A | 2/2005 |
| JP | 3626711 B2 | 3/2005 |
| JP | 3634273 B2 | 3/2005 |
| JP | 2005095440 A | 4/2005 |
| JP | 3656118 B2 | 6/2005 |
| JP | 3686906 B2 | 8/2005 |
| JP | 3699660 B2 | 9/2005 |
| JP | 2005261586 A | 9/2005 |
| JP | 3702269 B2 | 10/2005 |
| JP | 2005287830 A | 10/2005 |
| JP | 2005301578 A | 10/2005 |
| JP | 3715513 B2 | 11/2005 |
| JP | 2005319025 A | 11/2005 |
| JP | 3727275 B2 | 12/2005 |
| JP | 2006020758 A | 1/2006 |
| JP | 3753425 B2 | 3/2006 |
| JP | 2006075264 A | 3/2006 |
| JP | 2006116046 A | 5/2006 |
| JP | 2006116047 A | 5/2006 |
| JP | 2006192157 A | 7/2006 |
| JP | 3804939 B2 | 8/2006 |
| JP | 3816931 B2 | 8/2006 |
| JP | 3822887 B2 | 9/2006 |
| JP | 3831695 B2 | 10/2006 |
| JP | 3869175 B2 | 1/2007 |
| JP | 2007029589 A | 2/2007 |
| JP | 3890445 B2 | 3/2007 |
| JP | 2007504901 A | 3/2007 |
| JP | 2008018287 A | 1/2008 |
| JP | 2008168143 A | 7/2008 |
| JP | 2009531153 A | 9/2009 |
| JP | 2010509000 A | 3/2010 |
| KR | 20010027533 A | 4/2001 |
| KR | 20050047024 A | 5/2005 |
| RU | 2010146213 A | 5/2012 |
| SG | 173496 A1 | 9/2011 |
| TW | 340049 | 3/2009 |

(56) References Cited

FOREIGN PATENT DOCUMENTS

| TW | 200951764 A | 12/2009 |
|---|---|---|
| TW | 201006526 A | 2/2010 |
| TW | 322023 | 3/2010 |
| TW | 201116318 A | 5/2011 |
| WO | WO-9717598 A1 | 5/1997 |
| WO | WO-9938588 A1 | 8/1999 |
| WO | WO-0163592 A2 | 8/2001 |
| WO | WO-0230535 A1 | 4/2002 |
| WO | WO-2004002590 A1 | 1/2004 |
| WO | WO-2004002594 A1 | 1/2004 |
| WO | WO-2004024256 A1 | 3/2004 |
| WO | WO-2004024263 A1 | 3/2004 |
| WO | WO-2004027631 A1 | 4/2004 |
| WO | WO-2004030779 A1 | 4/2004 |
| WO | WO-2004039055 A2 | 5/2004 |
| WO | WO-2004052483 A1 | 6/2004 |
| WO | WO-2004053800 A1 | 6/2004 |
| WO | WO-2004082786 A1 | 9/2004 |
| WO | WO-2004087272 A1 | 10/2004 |
| WO | WO-2004101093 A1 | 11/2004 |
| WO | WO-2004107270 A1 | 12/2004 |
| WO | WO-2005027062 A1 | 3/2005 |
| WO | WO-2005027063 A1 | 3/2005 |
| WO | WO-2005030354 A1 | 4/2005 |
| WO | WO-2005039212 A1 | 4/2005 |
| WO | WO-2005099842 A1 | 10/2005 |
| WO | WO-2005107902 A1 | 11/2005 |
| WO | WO-2005113096 | 12/2005 |
| WO | WO-2005113096 A1 | 12/2005 |
| WO | WO-2005114648 A1 | 12/2005 |
| WO | WO-2006006274 A1 | 1/2006 |
| WO | WO-2006075494 A1 | 7/2006 |
| WO | WO-2007055522 A1 | 5/2007 |
| WO | WO-2007070738 A2 | 6/2007 |
| WO | WO-2007078639 A1 | 7/2007 |
| WO | WO-2007111247 A1 | 10/2007 |
| WO | WO-2007115299 A2 | 10/2007 |
| WO | WO-2007130582 A2 | 11/2007 |
| WO | WO-2008001088 A2 | 1/2008 |
| WO | WO-2008145952 A1 | 12/2008 |
| WO | WO-2009021124 A2 | 2/2009 |
| WO | WO-2010018485 A1 | 2/2010 |
| WO | WO-2010036989 A1 | 4/2010 |
| WO | WO-2011067469 A1 | 6/2011 |
| WO | WO-2011155958 A1 | 12/2011 |

OTHER PUBLICATIONS

Amplitude Review by Ryan Davis. Retrieved from the Internet: www.gamespot.com/ps2/puzzle/ampli~de /printable_6023980.html. Retrieved on Jun. 11, 2012. 4 pages.
Amplitude. Retrieved from the Internet: www.gamesquestdirect.com/71171972582.htrnl. Retrieved on Jun. 8, 2012. 2 pages.
Amplitude: Sony's Rocking Rhythm Game Outdoes Itself on All Fronts by Douglass C. Perry. Retrieved from the Internet: http://ps2.ign.com/articles/390/390620pl.thml. Retrieved on Jun. 8, 2012. 6 pages.
Association of British Scrabble Players. "Rolling System" ABSP, http://www.absp.org.uk/results/ratings_details.html. Retrieved May 25, 2011 (4 pages).
Beat Planet Music (Import) Review by Christian Nutt. Retrieved from the Internet: www.gamespot.com/ps/ action/beatplanetmusiclprintable_2546762.html. Retrieved on Jun. 11, 2012. 3 pages.
Beatmania IIDX 9 Style. Retrieved from the Internet: www.play-asia.com/paOS-13-71-8-iu.html. Retrieved on Feb. 22, 2005. 2 pages.
Beatmania PlayStation Review from www.GamePro.com/sony/psx/games/reviews/89.shtml. Retrieved on Feb. 22, 2005. 1 page.
Beatmania Review. Retrieved from the Internet: www.gamesarefun.com/gamesdb/review. h?reviewid=294. Retrieved on Jun. 11, 2012. 1 page.
Beatmanla IIDX 7 Style. Retrieved from the Internet: www.lik-sang.com/Info.php?category=27&products id=4061. Retrieved on Feb. 22, 2005. 1 page.

Beatnik Patent Sale Offering, Nov. 2008 (81 pp).
Bishop, Sam; Frequency: If you decide to pick up this game, you better give up ont he idea of getting a full night of sleep. via www.ign.com [online], Nov. 26, 2001 [retrieved on Mar. 1, 2006]. Retrieved from the Internet <URL: http://ps2.ign.com/articles/166/166450p1.html>. Retrieved on Jun. 8, 2012. 8 pages.
Boombox Icons, http://findicons.com/search/boombox, viewed on Jul. 31, 2012 copyright 2010 (1 page).
Bust a Groove Review by Jeff Gerstmann. Retrieved from the Internet: www.gamespolcom/ps/puzzlelbusta groove/printable_2546923.html. Retrieved on Jun. 11, 2012. 9 pages.
Bust a Groove. Retrieved from the Internet: www.buyritegames.com/product_information.asp?rc=frgl&number=PS-BUSTA2. Retrieved on Feb. 22, 2005. 1 page.
Bust a Groove. Retrieved from the Internet: www.estarland.com/index.asp?page=Playstation&cat=F&oroduct=6257&q. Retrieved on Jun. 11, 2012. 2 pages.
Bust a Groove: 989 Studios Best Game of the Year is a Funky Dance Sim thars Got the Fever by Doug Peny. Retrieved from the Internet http://psx.com/articles/152/152308pl.html. Retrieved on Jun. 8, 2012. 5 pages.
BVH File Specification, Character Studio, http:/lweb.archive.org/web/20060321075406/http:/lcharacterstudio. neUbvh file specification.htm, Mar. 21, 2006 (16 pages).
Dance Dance Revolution Review by Andy Chien. Retrieved from the Internet www.gamin-age.com/reviews /archive/old reviews/psx/ddr. Retrieved on Feb. 22, 2005. 3 pages.
Dance Dance Revolution Review by Ryan Davis. Retrieved from the Internet www.gamespot.com/ps/puzzJe/dancedancerevolutionfprintable_2699724.html. Retrieved on Jun. 11, 2012. 9 pages.
Dance Dance Revolution, Konami via wvvw.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.
Dance Dance Revolution. Retrieved from the Internet: www.ebgames.com/ebxlproduct/224 789.asp. Retrieved on Feb. 22, 2005. 2 pages.
Dancing with the Stars Game Manual (1 page). Date not available.
Dave H, et al. StepMania Tutorial. Nov. 3, 2004. <http://web.archive.org/web/200411031145/www.stepmania.com/stepmania/wiki.php?pagename=Tutorial>. Retrieved on Jun. 19, 2012. 7 pages.
Def Jam Vendetta Review by Alex Navarro. Retrieved from the Internet www.gamespot.com/ps2/actionf actionfdefjamvendetta/prlntable_6024297 .html. Retrieved on Jun. 11, 2012. 10 pages.
Def Jam Vendetta. Retrieved from the Internet www.ebgames.com/ebx/product/232378.asp. Retrieved on Feb. 22, 2005. 2 pages.
Def Jam Vendetta: Rapper's Delight or Fight-Night Fright? Smash Sumthin' and Find Out by Jon Robinson. Mar. 31, 2003. Retrieved from the Internet http://ps2.ign.com/articles/391/391713pl.html. Retrieved on Jun. 8, 2012. 6 pages.
Digital Play: Reloaded. Opening Reception. Museum of the Moving Image. Mar. 19, 2005. <http://web.archive.Org/web/20050319060247/ http://www.movingimage.us/site/screenings/contenV2005/digital_play_reloaded.ht ml>. 1 page.
Donkey Konga Review by Ryan Davis. Retrieved from the Internet: www.gamespot.com/gamecube/puzzle/ donkeykonga/printable_6108977.html. Retrieved on Jun. 11, 2012. 11 pages.
Donkey Konga. Retrieved from the Internet: www.ebgames.com/ebx/product/244024.asp. Retrieved on Jun. 11, 2012. 2 pages.
Donkey Konga: Could a Game Featuring Donkey Kong and Mini-Bongos ever Fail? Our Ful Review by Juan Castro. Retrieved from the Internet: cube.ign.com/articles/550/550723pl.html. Retrieved on Jun. 8, 2012. 6 pages.
DrumMana w/ Drum Set. Retrieved from the Internet www.estarland.com/index.asp?page=Playstation2&cat=RD&product=181268 &q. Retrieved on Jun. 11, 2012. 2 pages.
DrumMania (Import) Review by Jeff Gerstmann. Retrieved from the Internet: www.gamespot.com/ps2/actionf drummania/prinlable_2546356.html. Retrieved on Jun. 11, 2012. 9 pages.
DrumMania OST. Retrieved from the Internet www.lik-sang.corn/info/php?category=264&products id=4793. Retrieved on Feb. 22, 2005. 2 pages.

(56) References Cited

OTHER PUBLICATIONS

DrumMania Review by Wynfwad. Retrieved from the Internet www.gamefaqs.com/console/ps2/review/ R56573.html. Retrieved on Jun. 11, 2012. 2 pages.
ESRB Game Ratings: Game Rating & Descriptor Guide' via www.esrb.org[online], Retrieved from the Internet: <URL: http:/www.esrb.org/esrbratings_guide.asp#symbols>. Retrieved on Jun. 14, 2012. 3 pages.
Eye Toy Groove with Camera (Playstation 2). Retrieved from the Internet www.jr.com/JRProductPage.process?ProductCode=PS2+97400&JRSource=google. Retrieved on Feb. 22, 2005. 1 page.
Eye Toy Groove with Eye Toy Camera PS2. Retrieved from the Internet: www.walmart.com/catalog/product.gsp?dest=9999999997&product id-2607013&s. Retrieved on Feb. 22, 2005. 1 page.
Eye Toy: Groove—The Little Camera That Could comes Back with a Few New Tricks by Ed Lewis. Retrieved from the Internet: http:/ps2.ign.corn/artjcles/507/507854pl.html. Retrieved on Jun. 8, 2012. 8 pages.
Eye Toy: Groove Review by Ryan Davis. Retrieved from the Internet: www.gamespot.com/ps2/puzzle/ eyetoygroove/printable_6094754.html. Retrieved on Jun. 11, 2012. 10 pages.
Frequency—Pre-Played. Retrieved from the Internet www.ebgames.com/ebx/product/203370.asp. Retrieved on Feb. 22, 2005. 2 pages.
Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producLgsp7dests9999999997&product id=1635738&s. Retrieved on Feb. 22, 2005. 2 pages.
Frequency Review by Ryan Davis. Retrieved from the Internet:www.gamespot.com/ps2/puzzle/frequency/ printable 2827476.html. Retrieved on Jun. 19, 2012. 9 pages.
Get on Da Mic Overview by Matt Gonzales. Retrieved from the Internet www.gamechronides.com/reviews/ ps2/getondamic/body.htm. Retrieved on Jun. 11, 2012. 3 pages.
Get on Da Mic Review by Jeff Gerstmann. Retrieved from the Internet www.gamespot.comrri/ps2/puzzle/getondamic/printable 6110242.html. Retrieved on Jun. 11, 2012. 10 pages.
Get on Da Mic. Retrieved from the Internet: www.ebgames.com/ebx/product/245102.asp. Retrieved on Jun. 11, 2012. 2 pages.
Gitaroo Man. Retrieved from the Internet www.estartand.com/index.asp?page=Piaystation2&cat=PZ&product=676&Q . . . Retrieved on Jun. 14, 2012. 2 pages.
Gitaroo-Man Review by David Smith. Retrieved from the Internet http://p2.ign.com/articles/135/135184p1.html; retrived Jun. 11, 2012. 4 pages.
Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.
Gitaroo-Man. Retrieved from the Internet www.buyritegames.com/productjnformation.asp?re=frgl&number=PS2-GITARO. Retrieved on Feb. 22, 2005. 1 page.
Guitar Freaks (Import) Review by Sam Kennedy. Retrieved from the Internet: www.gamespot.com/pslaction/ guitarfreaks/printable_2545966.html. Retrieved on Jun. 11, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress.com/product_detail.cfm.?UPC=SCPS45422. Retrieved on Feb. 22, 2005. 1 page.
Guitar Freaks with Guitar. Retrieved from the Internet: www.buyritegames.com/product_informatlon.asp?rc=frgl&number=PSJ-GUilWG. Retrieved on Feb. 22, 2005. 1 page.
Guitar Hero (video game)—Wikipedia, the free encyclopedia—(Publisher—RedOctane) Release Date Nov. 2005. 25 pages.

Guitar Hero—Wikipedia, the free encyclopedia—Nov. 2005. http://en.wikipedia.org/w/index.php?title=guitaryhero&oldid=137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009. 5 pages.
International Search Report issued for PCT/US2010/054300, dated May 31, 2011 (5 pages).
International Search Report, PCT/US2006/062287, Mailed on May 10, 2007. 2 pages.
Ipodgames.com Tips. Dec. 4, 2004. <http://web.archive.org/web/20041204032612Awww.ipodgames.com/tips.html > 1 page.
Karaoke Revolution Review by Jeff Gerstmann. Retrieved from the Internet www.gamespot.com/ps2/puzzle/ karaokerevolution/printable ... 6081709.html. Retrieved on Jun. 14, 2012. 10 pages.
Karaoke Revolution. Retrieved from the Internet: www.ebgames.com/ebxlproduct/24806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 8, 2012. 7 pages.
Konami Corporation, The computer game "Dance Dance Revolution Max", released in the US by Konami corporation on Oct. 29, 2002, as evidenced by the game manual.
Kuwayama, Y. Trademarks & Symbols, vol. 2: Symbolical Designs, Van Nostrand Reinhold Company, (Nov. 4, 1980). 4 pages.
Lohman, "Rockstar vs. Guitar Hero," (The Rebel Yell). Nov. 13, 2008, accessed on Mar. 19, 2009. 5 pages.
Mad Maestro!—Pre-Played. Retrieved from the Internet: www.ebgames.com/ebx/product/217604.asp. Retrieved on Feb. 22, 2005. 2 pages.
Mad Maestro! by Ryan Davis. Retrieved from the Internet: www.gamespot.com/ps2/puzzle.madmaestro/ printable_2856821.html. Retrieved on Jun. 19, 2012. 9 pages.
Mad Maestro: The First Orchestra-conducting Sim on US Soil—Is It All It Could Have Been? by David Smith. Retrieved from the Internet http://ps2.ign.com/articles/3551355561 p1.html. Retrieved on Jun. 8, 2012. 6 pages.
Microsoft Office Online Clip Art, http://office.microsoft.com/en-us/clipart/results.aspx?Scope=MC,MM,MP,MS&PoleAssetID=MCJ04316180000&Querty=Icons&CTT=6&Origin=EC01017435m (Feb. 21, 2007) (1 page).
Microsoft PowerPoint Handbook, (1 page) (1992).
Mojib Ribbon Playtest by Anoop Gantayat. Retrieved from the Internet: htto://os2.ion.com/articles/442/442204p1.html. Retrieved on Jun. 8, 2012. 4 pages.
Mojib Ribbon—Review. Retrieved from the Internet: www.ntsc-uk.com/review.php?platform=ps2&game=MoiibRibbon. Retrieved on Jun. 14, 2012. 2 pages.
Mojib Ribbon. Retrieved from the Internet: www.lik-sang.comIInfo.php?category=27&productsid=3805&PHPSESSID=b9eQca. Retrieved on Feb. 22, 2005. 1 page.
Mojib Ribbon. Retrieved from the Internet: www.ncsxshop.com/cgi-bin/shop/SCPS. 11033.html. Retrieved on Jun. 14, 2012. 2 pages.
Ncsx.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks_gold.htm (4 pages).
Non-Final Office Action as issued by the United States Patent and Trademark Office for U.S. Appl. No. 12/474,899, dated Jan. 19, 2011, 7 pages.
PaRappa the Rapper 2. Retrieved from the Internet: www.amazon.eom/exedobidos/tg/deteil/-/B00005UNWD/ 104-4695527-8827110. Retrieved on Feb. 22, 2005. 2 pages.
PaRappa the Rapper Review by Jer Horwitz. Retrieved from the Internet: www.gamespot.com/pslpuzzlel parappatherapper/printable_2548866.html. Retrieved on Jun. 14, 2012. 9 pages.
Parappa the Rapper. Retrieved from the Internet: wvvw.estarland.com/index.asp?page=Playstation&cat=F&product=6871&q. Retrieved on Jun. 11, 2012. 2 pages.

(56) References Cited

OTHER PUBLICATIONS

Parappa the Rapper: PaRapper the Rapper Is finally here, but does it live up to the hype? by Adam Douglas. Retrieved from the Internet http://psx.ign.com/articlesl150/150490p1.html. Retrieved on Jun. 8, 2012. 2 pages.
PopCap Games Site Review via www.download-free-games.com, retrieved on Mar. 3, 2006]. Retrieved from the Internet <URL:http7Avww.download-free-games.com/reviews/popcap_games.htm>. 2 pages.
Ramsey, A. Guitar Freaks and Drum Mania Masterpiece Gold FAQ v. 1.04, Apr. 2, 2007, downloaded from http://www.gamefaqs.com/console/ps2/file/937670/47326. 3 pages.
RedOctane. "Guitar Hero 2 Manual" Activision Publishing, Inc. (2006) (13 pages).
Rez PlayStation^. Retrieved from the internet: http://global.yesasia.com/en/PrdDept.aspx/ pjd-1002847668. Retrieved on Jun. 14, 2012. 1 page.
Rez Review by Jeff Gerstmann. Retrieved from the Internet:www.qamespot.com/ps2/action/rez/printable 2838815.html. Retrieved on Jun. 11, 2012. 9 pages.
Rez. Retrieved from the Internet: www.estarland.com/playstation2.product.5426.html. Retrieved on Jun. 14, 2012. 2 pages.
Rez: You May Not Understand This Review. We May Not Either. But you should certainly play this game by.David Smith. Retrieved from the Internet: http://m.ign.com/articles/2002/01/09/rez. Retrieved on Jun. 11, 2012. 3 pages.
SingStar Party (SingStar2) Bundle. Retrieved from the Internet: www.gameswarehouse.com. Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeId=10001&langId. Retrieved on Feb. 22, 2005. 1 page.
SingStar Review (PS2) by James Hamer-Mortonl. Retrieved from the Internet http://ps2.twomtown.net/en uk/articles/ art.print.php?id=5279. Retrieved on Jun. 11, 2012. 5 pages.
SingStar Review by Luke Van Leuveren. Retrieved from the Internet http://palgn.com.aii/article.php7id-1282. Retrieved on Jun. 11, 2012. 5 pages.
Space Channel 5 Special Edition Review by Brad Shoemaker. Retrieved from the Internet: www.gamespot.corn/ps2/puzzle/spacecriannel5pait2/printeble_6085137.h Retrieved on Jun. 11, 2012. 10 pages.
Space Channel 5. Retrieved from the Internet: www.lik-sang.com/info.php?products_is=2050&likref=fro_gle4. Retrieved on Feb. 22, 2005. 1 page.
Space Channel 5: Description. Retrieved from the Internet: www.buyritegames.com/product_information.asp?rc=frgl &number=DC-SPACEC5. Retrieved on Feb. 22, 2005. 1 page.
Space Channel 5: Special Edition by Jason Thompson. Retrieved from the Internet www.popmattere.corn/ mulumerJia/reviews/s/space-channel-5.shtml. Retrieved on Jun. 8, 2012. 2 pages.
Taiko Drum Master Game Manual (Release Date: Oct. 24, 2004 (18 pages).
Taiko Drum Master Review by Justin Calvert. Retrieved from the Internet: www.gamespot.com/ps2 puzzie/taikodrummaster/printable_6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet htlpy/games.channel.aol.com/review.adp? qameID-7569. Retrieved on Feb. 22, 2005. 3 pages.
Thalmann, "L'animation par ordinateur" http://web.archive.org/web/20060421045510/http://vrlab.epfl.ch/{thalmann/CG/infogr.4.pdf>, Apr. 21, 2006 (52 pages).
U.S. Appl. No. 29/393,964, filed Jun. 10, 2011 (2 pages).
Video Eyetoy Groove for PS2; <http://www.youtube.com/watch?v=c80aaOU fuE> (A(2ri12004).
Video Gamescom '1 0—Billie Jean Demo <http:/iwww.aarnetraiiHrs.corn/video/gc-•1 Q.. Michael-Jackson/703294>: 1:58-1 :13) (Aug. 20, 201 D).
Video Gamescom '10—Working Day and Night Demo <http://www.gametrailers.com/video/gc-1 0-michael-jackson/703295> (Aug. 20, 2010).
Video Grease Dance—505 Games: release—Oct. 2011 li_http://www.youtube.com/watch?v=PaGBHSB2urg).
Video Hannah Montana: Spotlight World Tour (Released Nov. 6, 2007 for Wii); <http://www.voutube.com/watch?v=WtyuU2NaL3Q>.
Virginia Tech Multimedia Music Dictionary: "P: Phrase" Virginia Tech University, http://www.music.vt.edu/musicdictionary/textp/Phrase.html. Retrieved May 25, 2011 (7 pages).
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps /puzzle/vibribbon/printabte 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Video MJ the Experience Kinect: announce—Oct. 2010: (http://www.youtube.com/watch?v=xLbiPicu0MM).
Video "Dance Online—Dance lessons gameplay" <http://www.youtube.com/watch?v=B4phOjfVNLk>. Last accessed on Nov. 8, 2012.
Video Alvin and the Chipmunks Chipwrecked—Majesco Sales: release—Nov. 2011 (http://www.youtube.com/watch?v=xKeW3CUt14A&feature=related).
Video Just Dance—Ubisoft Paris; <http://www.youtube.com/watch?v=t7f22xQCEpY>; (Nov. 17, 2009).
Video Just Dance 2—Ubisoft; <http://www.youtube.com/watch?v=kpaW9sM_M2Q> (Oct. 12, 2010).
Video Just Dance 2: Oct. 2010 (http://youtube/2ChliUgqLtw).
Video Just Dance: Nov. 2009 (http://youtube/rgBo-JnwYBw).
Video Kidz Bop Dance Party! The Video Game (Released Sep. 14, 2010 on Wii) <http://www.youtube.com/watch?v=I8VD9EvFdeM>.
Video Let's Cheer—Take 2 Interactive: release—Nov. 2011; announce—Jun. 2011 (http://www.youtube.com/watch?v=uv1IMBIw2Dw&feature=related).
Video Michael Jackson: The Experience—Ubisoft, Ubisoft Paris, Ubisoft Montpelier; <http://www.youtube.com/watch?v=AS3-SuYhSBk>. Date not available.
Video MJ—Paris Week game demo—Oct. 29, 2010 http://www.dailymotion.com/video/xfg4oe_pgw-10-michael-jackson-experience-kinect_videogames?start=13#from=embed <http://www.dailymotion.com/video/xfg4oe_pgw-10-michael-jackson-experience-kinect_videogames?start=13>.
Video MJ the Experience Wii: Nov. 2010 (http://www.youtube.com/watch?v=8ZA59JY8Y_w).
Video MJ:TE Kinect from Aug. 19, 2010 at <http://www.youtube.com/watch?v=6AjGmSnN6gQ>; Michael Jackson the Experience Video Game—Kinect for Xbox 360—Gamescom 2010 HD.
Video MJ:TE on Wii (Nov. 2010); <http://www.youtube.com/watch?v=gmIMNGWxgvo>.
Video N.Y. Comic Con '10—Billie Jean Gameplay Demo: <http://www.gametrailers.com/video/nycc-10-michael-jackson/706056> (Oct. 13, 2010).
Video Tokyo Game Show '10—'Every Step' Trailer: http://www.gametrailers.com/video/tgs-10-michael-jackson/704548 (Sep. 15, 2010).
Video Victorious: Time to Shine—D3 publishers: Dec. 22, 2011 (http://www.youtube.com/watch?v=ud69OK02KGg &feature=fvst).
Video We Cheer 2 (Released Nov. 3, 2009 for Wii) <http://www.youtube.com/watch?v=-4oalxqnbll>.
Video MJ the Experience Kinect: release Apr. 2011, http//www.youtube.com/watch?v=N 7oyxH I P48A.
Video 'Ghosts' Gameplay Trailer: <http://www.gametrailers.com/video/ghosts-gameplay-michaeljackson/ 706825>_(Oct. 27, 2010).

(56) References Cited

OTHER PUBLICATIONS

Video <http://www.bing.com/videos/search?q=dance+instruction+game&mid=E69356CFA1B6719FF5C8E69356CFA1B6719FF5C8&view=detaii&FORM=VIRE5> (uploaded Jul. 27, 2010).

Video Britney's Dance Beat (Released May 8, 2002 for PS2); <http://www.youtube.com/watch?v=-KR1dRGNXw>.

Video Dance Dance Revolution: Hottest Party 3 (Released Sep. 27, 2009 for Wii) <http://www.youtube.com/watch?v=zk20hEzGmUY>.

Video Dance on Broadway—Ubisoft, Longtail Studios; <http://www.youtube.comiwatch?v='eYaPdT4z-M>: (Jun. 6, 201Q}_.

Video Dance on Broadway: Jun. 2010 (<http://youtu.be/Wi9Y5HHcytY>).

Video Dance Summit 2001: Bust a Groove (Released Nov. 2, 2000 for PS2); <http://www.youtube.com/watch?v=E8NjTGHYQcM>.

Video Dancing With the Stars—Activision, Zoe Mode; <http://www.youtube.com/watch?v=C7zBVfEJO~:gp (Oct. 2007).

Video Dancing with the Stars: Oct. 2007 (http://www.youtube.com/watch?v=8UChG2v5DI).

Video Dancing with the Stars: We Dance—Activision, Zoe Mode; <http://www.youtube.com/watch?v=31GOb-CT8vs> (Oct. 2008).

Video DDR Hottest Party; <http://www.youtube.com/watch?v=zk20hEzGmUY> (Sep. 2007).

Video Don't Stop' Gameplay Trailer: <http://www.gametrailers.com/video/dont-stop-michaeljackson/707336> (Nov. 10, 2010).

Video Dream Dance & Cheer (Released Sep. 13, 2009 for Wii) <http://www.voutube.com/watch?v=oi9vQiT1x5Q>.

Video E3 2010 Live Demo <http://www.gametrailers.com/video/e3-2010-michael-jackson/101449>; (Jun. 14, 2010).

* cited by examiner

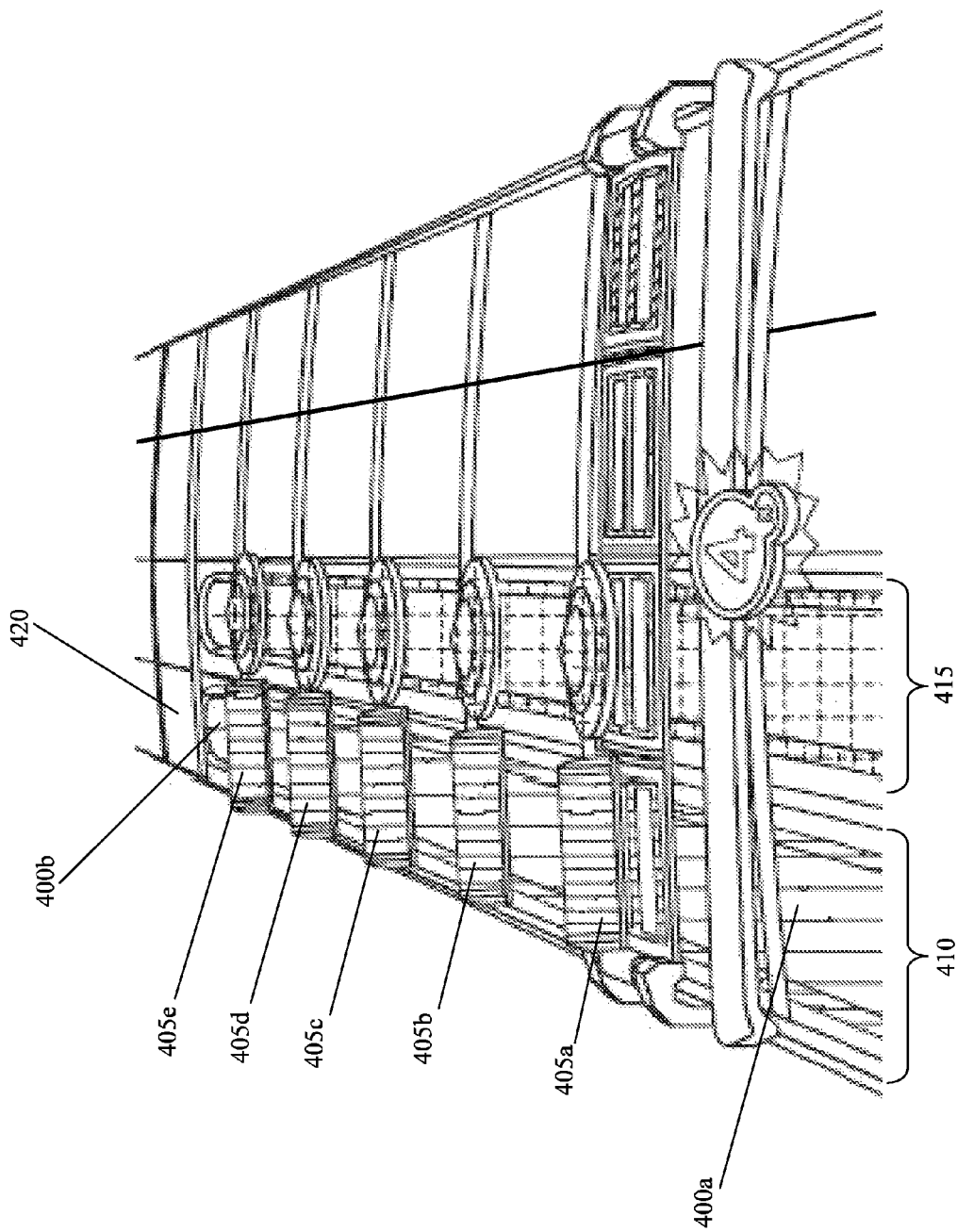

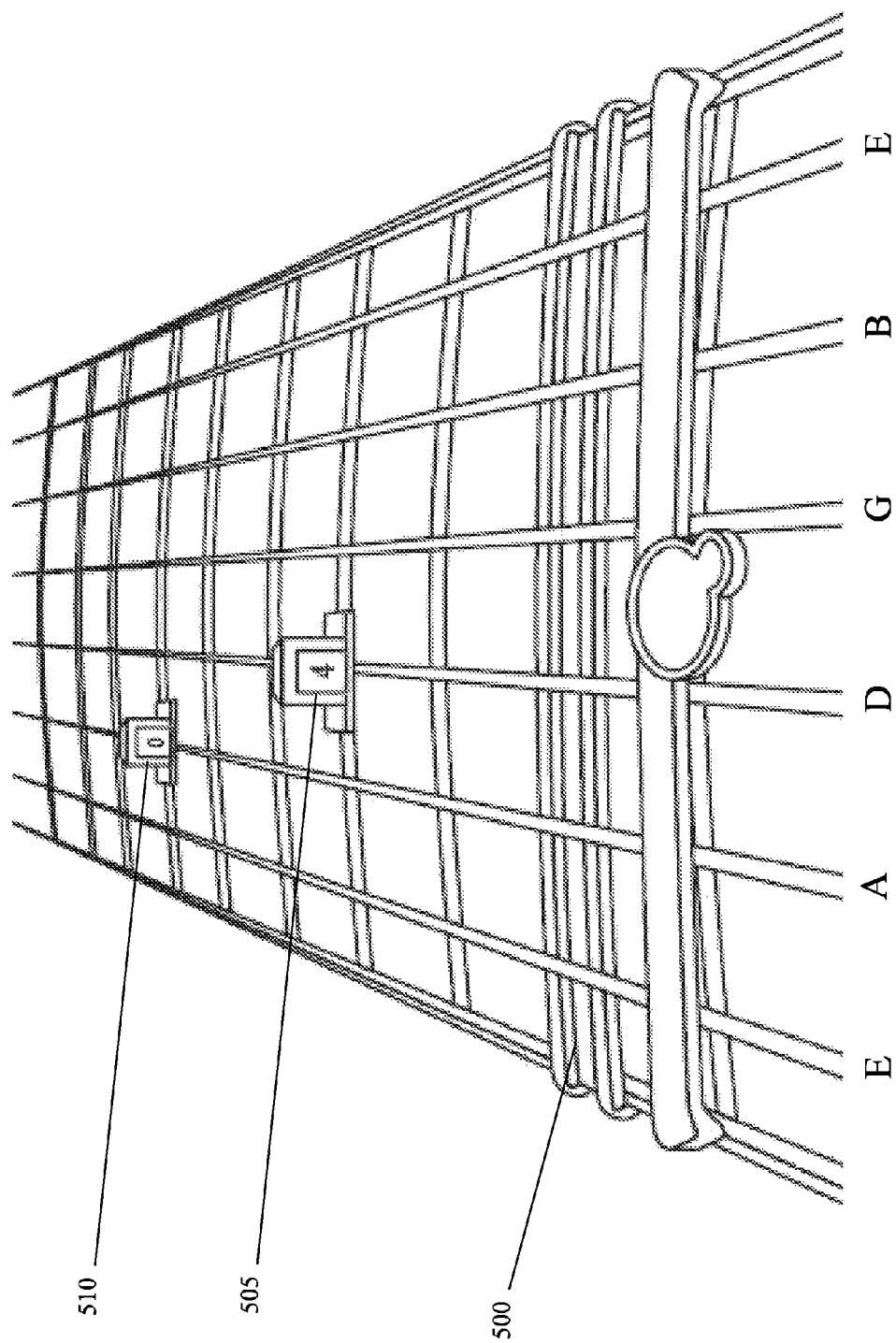

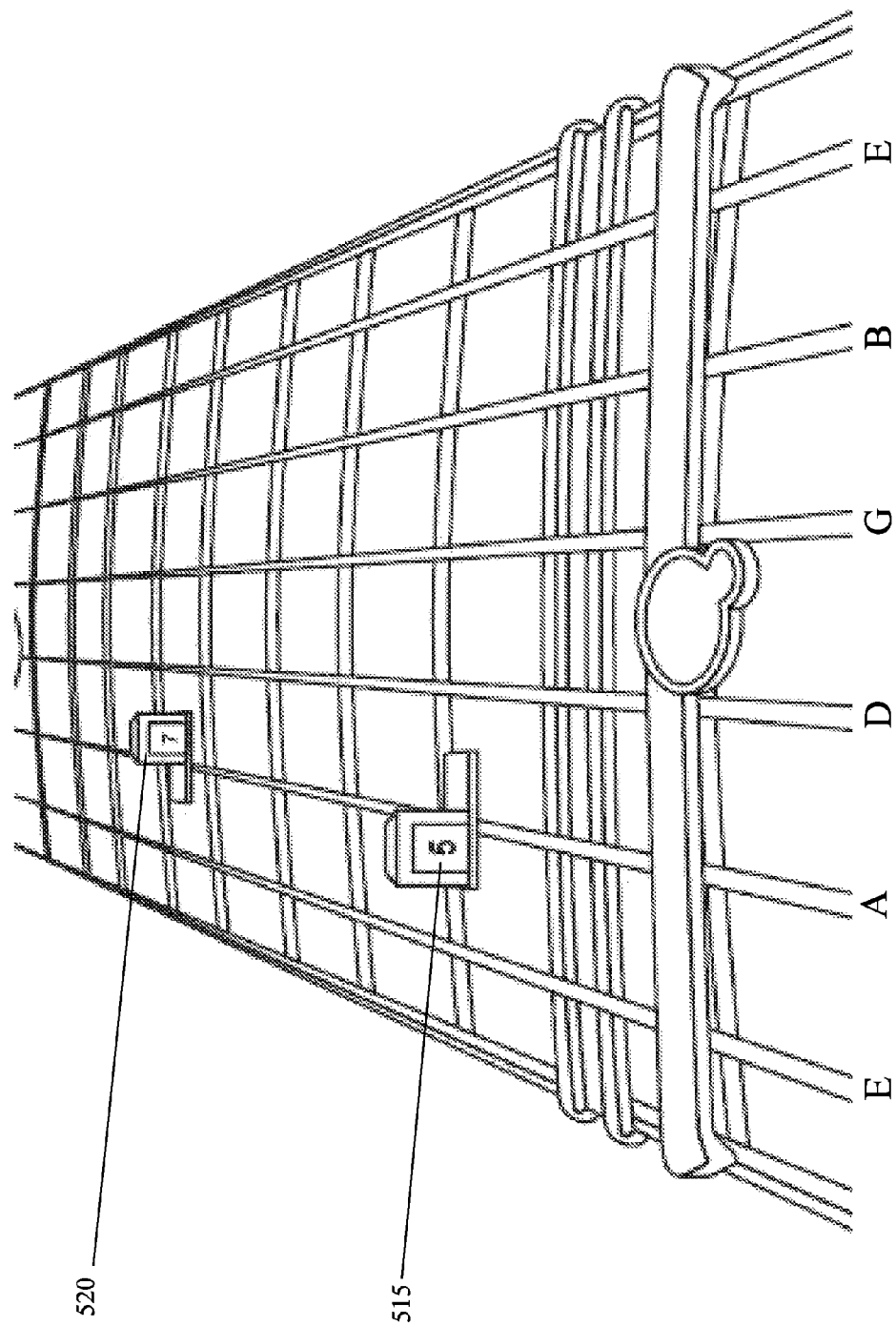

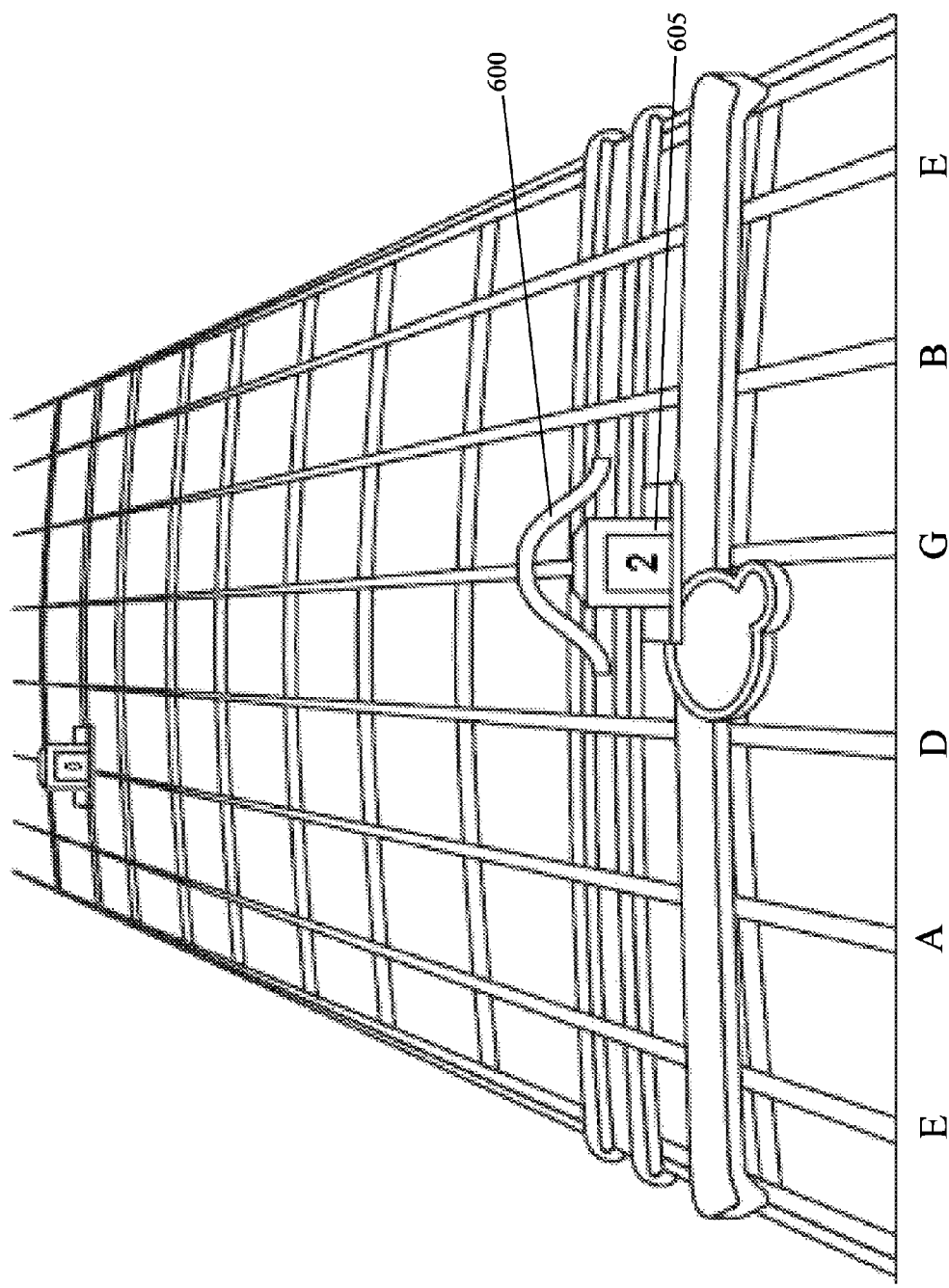

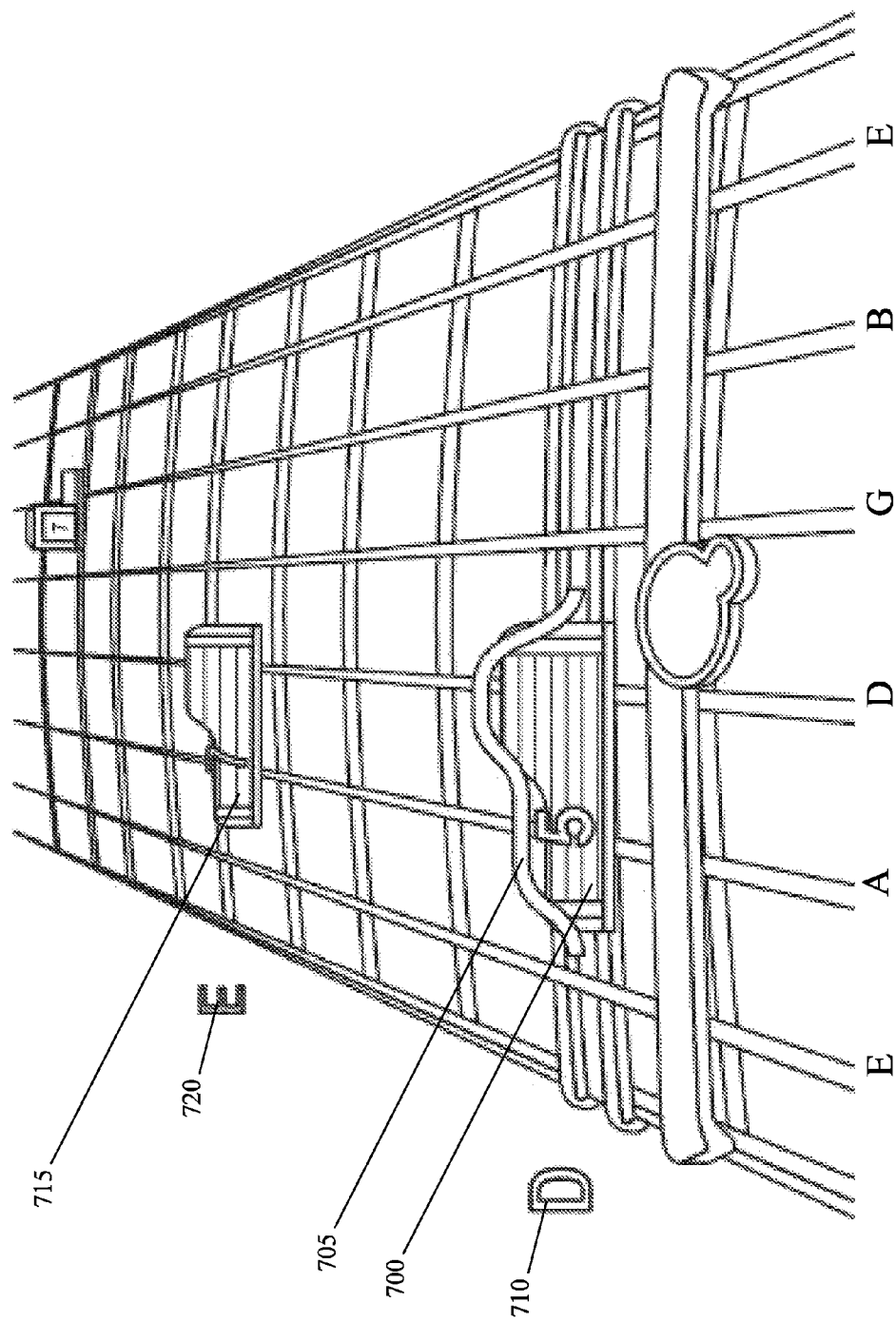

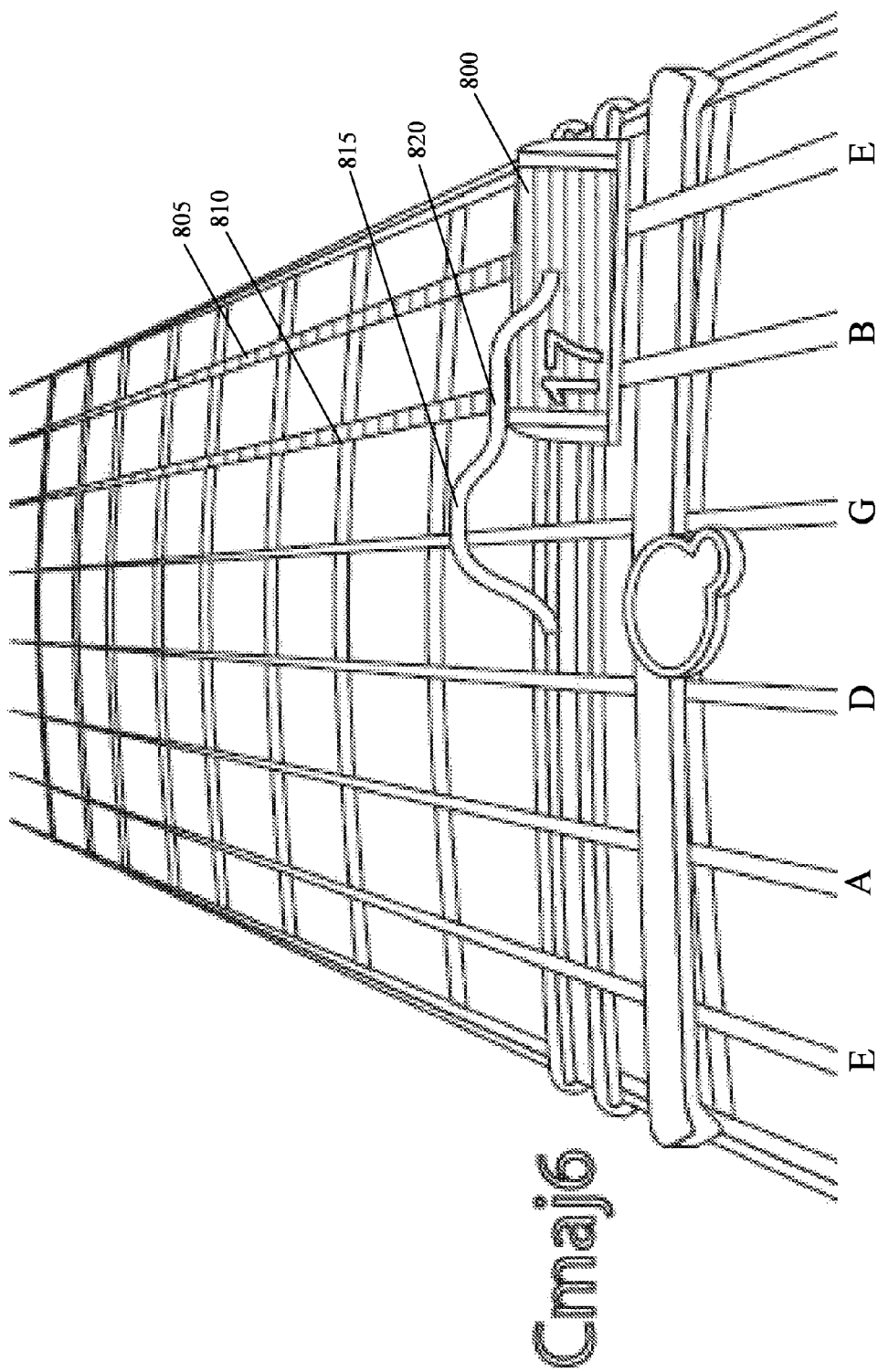

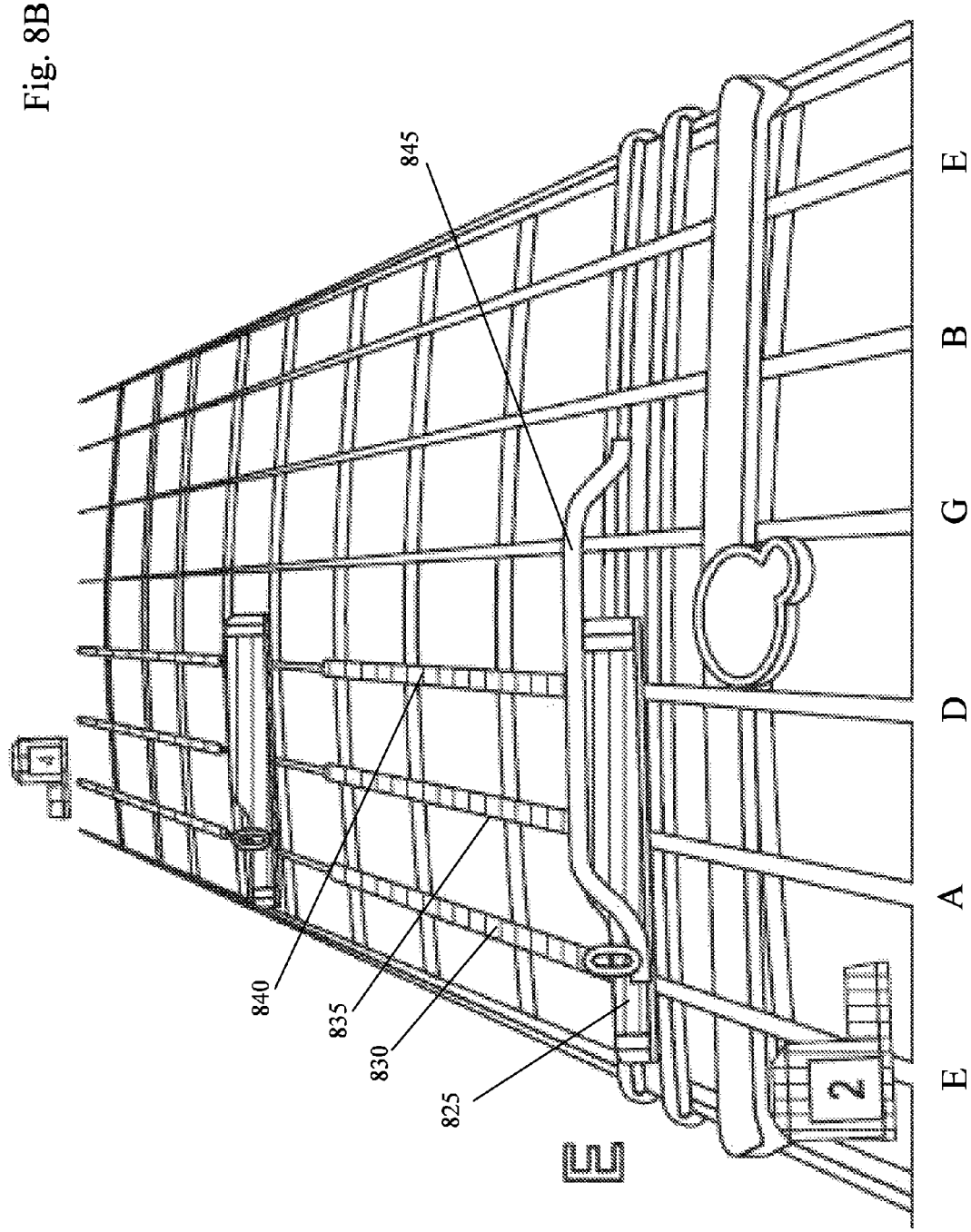

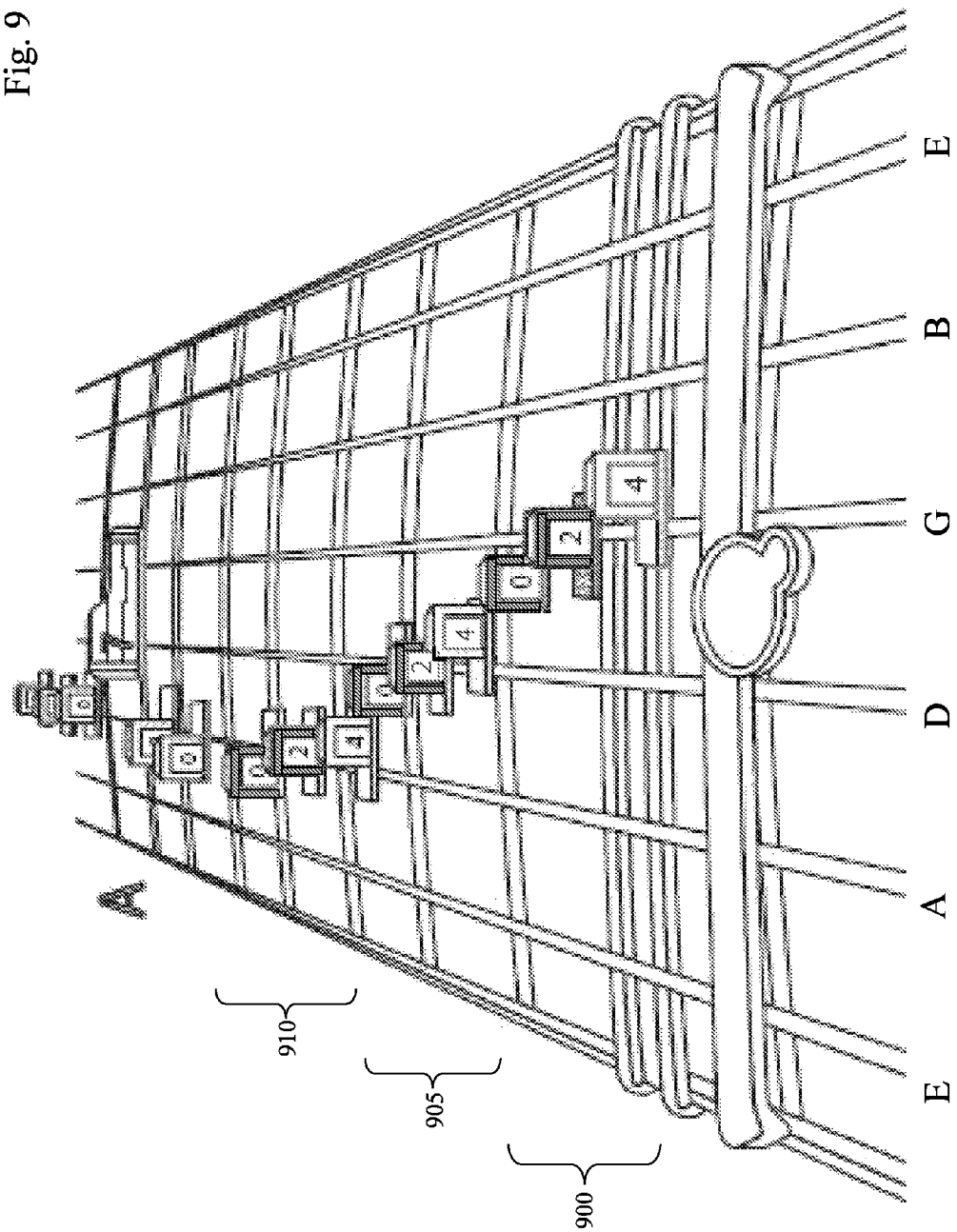

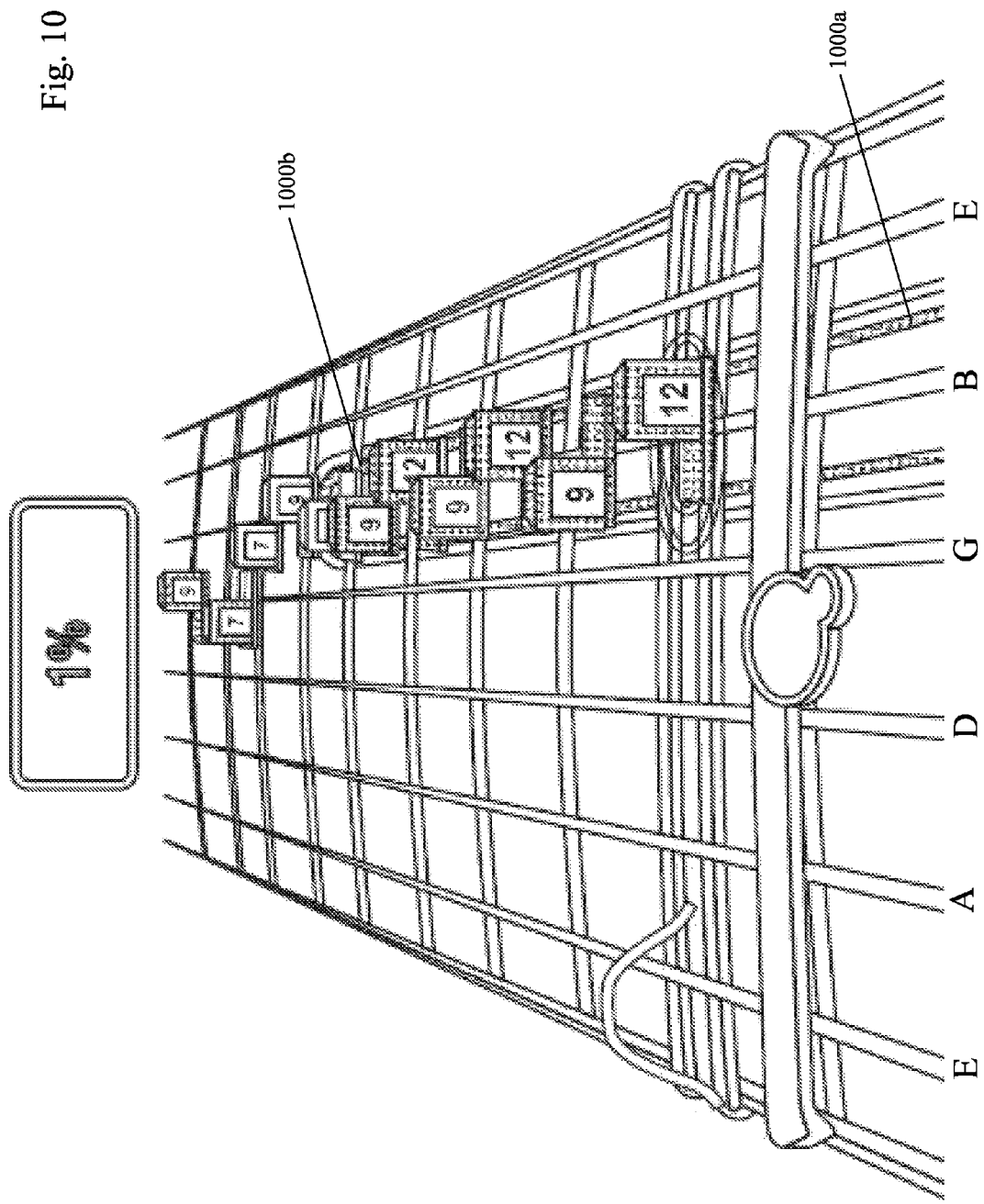

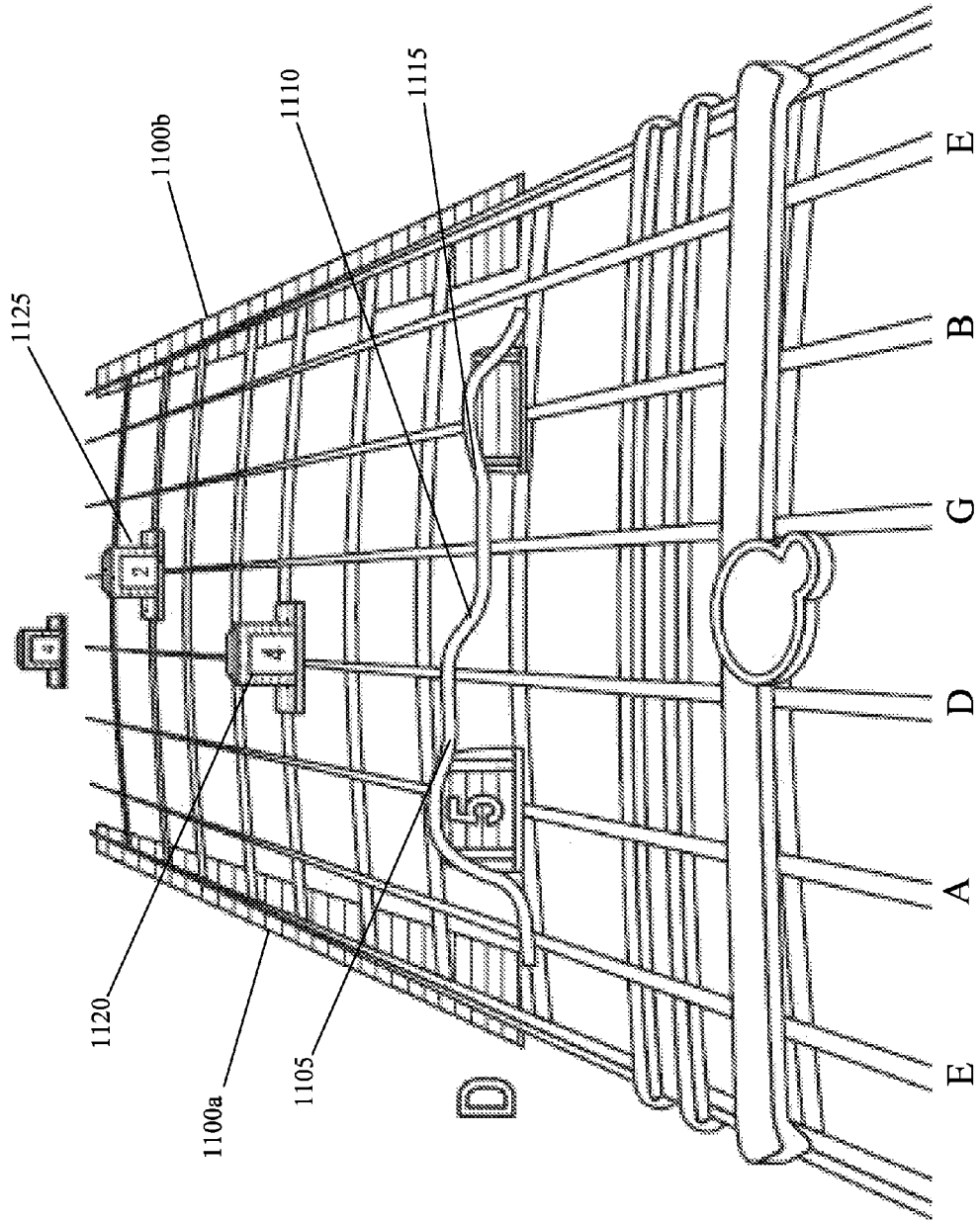

C

SIMULATING MUSICAL INSTRUMENTS

CROSS REFERENCE TO RELATED APPLICATIONS

This application is a Continuation of U.S. application Ser. No. 13/049,742 filed on Mar. 16, 2011, the disclosure of which is herein incorporated by reference in its entirety. U.S. application Ser. No. 13/049,742 claims benefit of U.S. Provisional Application 61/353,519 filed Jun. 10, 2010, the disclosure of which is herein incorporated by reference in its entirety. U.S. application Ser. No. 13/049,742 claims benefit of U.S. Provisional Application 61/314,571 filed on Mar. 16, 2010, the disclosure of which is herein incorporated by reference in its entirety.

FIELD OF THE INVENTION

The present invention relates to video games, and, more specifically, rhythm-action games which simulate the experience of playing simulated musical instruments.

BACKGROUND

Music making is often a collaborative effort among many musicians who interact with each other. One form of musical interaction may be provided by a video game genre known as "rhythm-action," which involves a player performing phrases from an assigned, prerecorded musical composition using a video game's input device to simulate a musical performance. If the player performs a sufficient percentage of the notes or cues displayed for the assigned part, the singer may score well for that part and win the game. If the player fails to perform a sufficient percentage, the singer may score poorly and lose the game. Two or more players may compete against each other, such as by each one attempting to play back different, parallel musical phrases from the same song simultaneously, by playing alternating musical phrases from a song, or by playing similar phrases simultaneously. The player who plays the highest percentage of notes correctly may achieve the highest score and win.

Two or more players may also play with each other cooperatively. In this mode, players may work together to play a song, such as by playing different parts of a song, either on similar or dissimilar instruments. One example of a rhythm-action game with different instruments is the ROCK BAND® series of games, developed by Harmonix Music Systems, Inc. and published by Electronic Arts, Inc. and MTV Games. ROCK BAND® simulates a band experience by allowing players to play a rhythm-action game using various simulated instruments, e.g., a simulated guitar, a simulated bass guitar, a simulated drum set, or by singing into a microphone.

With respect to simulating a drum experience, the ROCK BAND® series of games uses a drum peripheral comprising four pads, each associated with a color and lane in the game. From left to right, the colors are red, yellow, blue, and green. The pads also correspond to buttons on the game controller. For example, for an Xbox 360 drum peripheral, the pads, from left to the right correspond to the B button, up on the control pad, down on the control pad, and A button. For the PlayStation, these are the CIRCLE button, up on the control pad, down on the control pad, and X button.

The ROCK BAND 2® drum peripheral also allows the player to connect optional cymbal peripherals to the drum peripheral. Like the pads of the drum peripheral, the cymbals also correspond to specific colors and lanes in the game and buttons on the controller. For example, a yellow cymbal corresponds to the yellow pad, and, when presented with a cue or "gem" to provide input corresponding to a "yellow" input, players can strike the yellow pad or the yellow cymbal, or for multiple yellow gems, the player can strike just the pad, just the cymbal, or combinations of both. While the cymbals add a modicum of realism to the drumming experience, one of the inventions described herein provides an experience that is closer to simulating a real drumming experience.

ROCK BAND® also allows users to provide input using guitar controllers that simulate a guitar. The "fake plastic guitars" however, do not train players how to play a real guitar. One of the inventions described herein provides instructions to a player such that skills can be carried over from the game to playing an actual "real guitar."

SUMMARY OF THE INVENTION

The invention herein is a game that allows a player to more realistically simulate the experience of playing an actual instrument, such as the drums, a guitar, or a keyboard. One of the inventions herein, implemented in various ways such as computerized methods executed by a game platform, executable instructions tangibly embodied in a computer readable storage medium, systems with an apparatus configured to perform particular functions, apparatuses with means for performing the functions, and other forms of technology, provides players of a rhythm-action game a playing experience that more closely resembles that of simulating a drumming experience. For example, in one embodiment, there is a method of providing a realistic drum experience in a video game. The method is executed on a video game platform in communication with a display and a drum controller, where the drum controller has at least one cymbal and at least one drum pad. The method includes determining, by the processor, if a cue or gem to be displayed on the display in a particular sub-lane associated with a particular indicia should be a cue indicating a cymbal input or a cue indicating a pad input. The method also includes displaying, on the display, in the particular sub-lane, the cue indicating the cymbal input or pad input as determined in before. Then the game platform receives input from the player via the drum controller; and scores the input with a first score if the input was a cymbal input associated with the particular indicia and scores the input with a second score if the input was an input other than a cymbal input associated with the particular indicia. In some implementations, the indicia is a color. In some implementations the second score is equal to the first score if the input is a pad associated with the particular indicia. The second score can also be less than the first score if the input is a pad associated with the particular indicia. Although a method is described, the same can be embodied as a computer program product or a system or apparatus.

Another invention described herein provides the player with a realistic guitar experience. The invention can be implemented as computerized methods executed by a game platform, executable instructions tangibly embodied in a computer readable storage medium, systems with an apparatus configured to perform particular functions, apparatuses with means for performing the functions, and other forms of technology.

Another invention described herein is a method and system of scoring partial chord hits for both a guitar simulation and for a simulated keyboard.

The inventions described herein, implemented in various ways such as computerized methods executed by a game platform, executable instructions tangibly embodied in a computer readable storage medium, systems with an apparatus configured to perform particular functions, apparatuses with means for performing the functions, and other forms of technology, provides players of a rhythm-action game a playing experience that more closely resembles that of a playing an instrument. This is achieved through several aspects of the invention.

In one aspect, the invention includes methods, systems with an apparatus configured to perform particular functions, computer program products, and apparatuses that provide means for displaying a game cue for a guitar part. These involve determining that an expected input data read into a memory (e.g., RAM) comprises a fret value for each of at least two simulated strings of a simulated guitar and then determining a base fret value from the fret values for each of the at least two simulated strings. Continuing this aspect, a shape value is determined for each simulated string of the at least two simulated strings, with the shape value based on the difference between the fret value for that simulated string and the base fret value. Then gem portions are displayed corresponding to each fret value, with the magnitude of each gem portion based on the shape value determined for each simulated string. Several variations of this aspect are possible. In some implementations, if the shape value is negative, no gem portion is displayed. Alternatively, if the shape value is negative, a gem portion is displayed at a minimal magnitude. In some implementations, a game cue is drawn that includes, or is derived from, or represents, the gem portions displayed only if the expected input data further involves determining that (by way of indication in a data file) that the expected input is a chord. In some implementations, the gem portions displayed for a particular expected input time are themselves, individually or together, game cues.

In another aspect, there are also methods, systems with an apparatus configured to perform particular functions, computer program products, and apparatuses that provide means for displaying a player's input when the player is using an instrument simulating a guitar. Aspect includes simulating the strings of a guitar using separate fret inputs for each of a plurality of actual or simulated strings, with the fret inputs each including a fret value determined based on input provided by the player to the fretboard of the simulated guitar. The aspect involves receiving fret input data from the simulated guitar, determining that the received fret input data comprises a fret value for each of at least one simulated string of a simulated guitar, and determining a base fret value from the fret values for each of the at least one simulated strings. Then, a shape value is determined for each simulated string of the at least one strings, with the shape value being based on the difference between the fret value for that simulated string and the base fret value. Then, fretting shape portions corresponding to each fret value are displayed, with the magnitude of each fretting shape portion being based on the shape value determined for each simulated string.

This aspect enjoys the benefits of several variations. In some embodiments, the fret value of each of the at least one simulated string is displayed on or near the fretting shape portion for that simulated string for all of the at least one simulated strings. In other embodiments, one or more of the fret values of one of the at least one simulated strings is displayed on the corresponding simulated string. In some embodiments, only one of the fret values of one of the at least one simulated strings is displayed on the corresponding simulated string. In some embodiments, the magnitude of each fretting shape portion is limited to a predetermined magnitude.

In some variations of this aspect, a success condition is assigned to a player when the fretting shape portions together match the shape of a game cue. Additionally or alternatively, a success condition is assigned to a player when the fretting shape portions together match the shape of a game cue other than a portion of the game cue that represents an open string. In one version of this implementation, the success condition is assigned only if the fretting shape portions match the shape of the game cue at a specific time. Or, in another version, the success condition is still assigned even if only some of the fretting shape portions match the shape of the game cue at a specific time. In another version, the success condition is still assigned even if only a percentage of the fretting shape portions match a percentage of the shape of the game cue at a specific time.

Both of these aspects enjoy the following benefits. In some embodiments, the fret value of each of the at least one simulated string is displayed on or near the gem portion or the fretting shape portion for that simulated string for all of the at least one simulated strings. In other embodiments, one or more (in some cases, only one) of the fret values of one of the at least one simulated strings is displayed on or near the corresponding simulated string. In some embodiments, the magnitude of each gem portion or fretting shape portion is limited to a predetermined magnitude. In some embodiments, the shape value is limited to a predetermined maximal value.

These aspects can further include determining, for the at least two simulated strings, the simulated string closest to a string that corresponds to a low E string on a standard tuned guitar that has a fret value and then displaying the fret value on or near the gem portion or the fretting shape portion for that simulated string. Or, alternatively, for the at least two simulated strings, the simulated string closest to a string that corresponds to a low E string on a standard tuned guitar that has a fret value not associated with an open string is determined and then the fret value is displayed on or near the gem portion or the fretting shape portion for that simulated string. In other embodiments, for the at least two simulated strings, the simulated string closest to a string that corresponds to a high E string on a standard tuned guitar that has a fret value is determined and the fret value is displayed on or near the gem portion or the fretting shape portion for that simulated string. Alternatively, for the at least two simulated strings, the simulated string closest to a string that corresponds to a high E string on a standard tuned guitar that has a fret value not associated with an open string is determined and the fret value is displayed on or near the gem portion or the fretting shape portion for that simulated string. In still other embodiments, the simulated string with a fret value not associated with an open string representing a position closest to a headstock of a guitar is determined and the fret value of that simulated string is displayed on or near the gem portion or the fretting shape portion for that simulated string.

In still other embodiments, it is determined that two of the at least two simulated strings have the same fret value; and the fret value of the simulated string closest to a string that corresponds to a low E string on a standard tuned guitar is displayed on or near the gem portion or the fretting shape portion for that simulated string and fret values are not displayed for any of the other at least two simulated strings. In one variation, the at least two simulated strings with the same fret value have a fret value not associated with an open string and represent a position closest to a headstock of a guitar.

In still another embodiment two of the at least two simulated strings are determined to have the same fret value and the fret value of the simulated string closest to a string that corresponds to a high E string on a standard tuned guitar is displayed on or near the gem portion or the fretting shape portion for that simulated string, and fret values are not displayed for any of the other at least two simulated strings. In one implementation of this, the at least two simulated strings with the same fret value have a fret value not associated with an open string and represent a position closest to a headstock of a guitar.

In any of these embodiments, simulated strings with a zero fret value are not considered in determining which fret value is the base fret value.

In another aspect, there are also methods, systems with an apparatus configured to perform particular functions, computer program products, and apparatuses that provide means for displaying a game cue. These involve reading an expected input data and determining a plurality of game cues that include at least two different fret values within a predetermined time interval for a particular simulated string of a simulated guitar. Then, a lowest fret value for the plurality of game cues is determined and an offset value is determined for each fret value of the expected input data, with the offset value being based on the difference between the each fret value and the lowest fret value. Finally, a gem portion is displayed corresponding to each expected input data, the position of each gem portion being based on a reference point and the determined offset value.

In some embodiments of this aspect, the reference point is the center of the display of the simulated string. In some of these embodiments, the lowest fret value is offset to the left from the center of the display of the simulated string, while in other embodiments, the lowest fret value is offset to the right from the center of the display of the simulated string. In any embodiment of this aspect, the amount of offset from the reference point of the simulated string can be limited to a predetermined number of possible offsets. In some of these implementations, if there are more game cues in the plurality of game cues than the predetermined number of possible offsets, a subset of the plurality is displayed at differing offsets and then the remaining game cues are displayed at one particular offset.

In another aspect, there are also methods, systems with an apparatus configured to perform particular functions, computer program products, and apparatuses that provide means for displaying, in a lane, a section of repeatable inputs in a sub-lane of the lane. The aspect begins by loading cue data from a data file, the cue data including duration data and a plurality of cues to be displayed in the sub-lane. Then, the plurality of cues and a section indicator are displayed in the sub-lane, with the section indicator based on the duration data and indicating that the plurality of cues are repeatable inputs. Then, a timer is started, the timer being independent of a timing window of any cue of the plurality of cues. Then, it is determined if an input is received for the sub-lane before the timer reaches a timing threshold. If it is determined that the input is received for the sub-lane before the timer reaches the timing threshold, the timer is restarted and the plurality of cues is maintained as repeatable inputs. If it is determined that the input is not received for the sub-lane before the timer reaches the timing threshold, the section indicator is modified to indicate that the plurality of cues are not repeatable inputs.

In one variation, the plurality of cues initially indicate that the plurality of cues are repeatable inputs and if it is determined that the input is not received for the sub-lane before the timer reaches the timing threshold, the plurality of cues are modified to indicate the plurality of cues are not repeatable inputs. In some embodiments, if the input is not received for the sub-lane before the timer reaches the timing threshold, it is determined if a threshold number of inputs is received for the sub-lane during the timing windows of the threshold number of cues in the plurality of cues, and if the threshold number of inputs is received for the sub-lane during the timing windows of the threshold number of cues of the plurality of cues, the timer is restarted and the section indicator is modified to indicate the plurality of cues are repeatable inputs again. In one version of this, the threshold number of inputs is one (and therefore successfully playing the input causes the plurality of cues to be repeatable). And in some implementations, the section indicator is displayed in at least a portion of a plurality of sub-lanes.

However, if the input is not received for the sub-lane before the timer reaches the timing threshold, in some embodiments, a successful input counter to zero, the timer is restarted, and it is determined if an input is received for the sub-lane before the timer reaches the timing threshold. If the input is received for the sub-lane before the timer reaches the timing threshold, the successful input counter is incremented and if the successful input counter equals a threshold number of successful inputs, the section indicator is modified to indicate the plurality of cues are repeatable inputs. If the successful input counter is less than the threshold number of inputs, the previous steps of restarting the timer and determining if the input for that sub-lane is received before the timer reached the threshold are repeated. If the input is not received for the sub-lane before the timer reaches the timing threshold, then the successful input counter is set to zero and the steps of restarting the timer and determining if the input for that sub-lane is received before the timer reached the threshold are repeated. In one implementation, the threshold number of successful inputs is two.

For implementations involving a guitar part, determining if the input is received further comprises determining if the input is a specific first fret value. In some of these versions, if the input is received for the sub-lane before the timer reaches a timing threshold, it is determined if a second input is received for the sub-lane before the timer reaches the timing threshold. It is also determined if the second input is a second specific fret value. If it is determined that the second input is the second specific fret value, then the plurality of cues are maintained as repeatable inputs. But if it is determined that the second input is not the second specific fret value, the section indicator is modified to indicate the plurality of cues are not repeatable inputs. Then, the plurality of cues are maintained as repeatable inputs only if the first and second received inputs are received in a predetermined pattern.

In another aspect, there are also methods, systems with an apparatus configured to perform particular functions, computer program products, and apparatuses that provide means for displaying, in a lane, a section of repeatable inputs in at least two sub-lanes of the lane. The aspect involves loading cue data from a data file, with the cue data comprising a duration data and a first plurality of cues to be displayed in a first sub-lane and a second plurality of cues to be displayed in a second sub-lane. Then, presented on a display, are the first plurality of cues, a first section indicator, the second plurality of cues, and a second section indicator, the first and second section indicators based on the duration data and each indicating that the respective first and second plurality of cues are repeatable inputs. A first and second timer are started for the respective first and second sub-lanes, with the first and second timers being independent of a timing window of any cue of the respective first or second plurality of cues. Then, it is determined if a first input is received for the first sub-lane before the first timer for the first sub-lane reaches a first timing threshold and it is determined if a second input is received for the second sub-lane before the second timer for the second sub-lane reaches a second timing threshold. Then, if it is determined that first or second input is received for the respective first or second sub-lanes before the respective first or second timer reaches the respective first or second timing threshold, the respective first or second timers are restarted and the first or second plurality of cues is maintained as repeatable inputs. But, if it is determined that first or second input is not received for the respective first or second sub-lanes before the respective first or second timers reach their respective first or second timing thresholds, the respective first or second section indicators are modified to indicate the respective first or second plurality of cues are not repeatable inputs.

In one embodiment of this aspect, if it is determined that first or second input is not received for the respective first or second sub-lanes before the respective first or second timer reaches the respective first or second timing threshold, both the first and second section indicators are modified to indicate the respective first and second plurality of cues are not repeatable inputs.

In another aspect, there are also methods, systems with an apparatus configured to perform particular functions, computer program products, and apparatuses that provide means for displaying, in a lane, a section of repeatable inputs in a sub-lane of the lane. The aspect involves loading cue data from a data file, with the cue data including a duration data and a plurality of cues to be displayed in the sub-lane. Then the plurality of cues is displayed in the sub-lane, the plurality of cues indicating that they are repeatable inputs. A timer is then started, with the timer being independent of a timing window of any cue of the plurality of cues. Then, it is determined if an input is received for the sub-lane before the timer reaches a timing threshold. If it is determined that the input is received for the sub-lane before the timer reaches the timing threshold, the timer is restarted and the plurality of cues is maintained as repeatable inputs. But if it is determined that the input is not received for the sub-lane before the timer reaches the timing threshold, the plurality of cues is modified to indicate that the plurality of cues are not repeatable inputs.

In one implementation, if the input is not received before the timer reaches the timing threshold, it is determined if a threshold number of inputs is received for the sub-lane during the timing window of one of the plurality of cues. If the threshold number of inputs is received for the sub-lane during the timing windows of the threshold number of cues of the plurality of cues, the timer is restarted and the plurality of cues are modified to indicate the plurality of cues are repeatable inputs again. In some versions, the threshold number of inputs is one.

In one implementation, if the input is not received for the sub-lane before the timer reaches the timing threshold, a successful input counter is set to zero, the timer is restarted, and it is determined if an input is received for the sub-lane before the timer reaches the timing threshold. If the input is received for the sub-lane before the timer reaches the timing threshold, the successful input counter is incremented, and if the successful input counter equals a threshold number of successful inputs, the plurality of cues is modified to indicate the plurality of cues are repeatable inputs, but if the successful input counter is less than the threshold number of inputs, the previous steps of repeating steps restarting the timer and determining if an input is received before the threshold are repeated. If, however, the input is not received for the sub-lane before the timer reaches the timing threshold, the successful input counter is reset and the steps of restarting the timer and determining if an input is received before the threshold are repeated. In one implementation of this, the threshold number of successful inputs is two.

In one implementation of this aspect, determining if the input is received involves determining if the input is a specific first fret value. In a particular version of that implementation, if it is determined that the input is received for the sub-lane before the timer reaches a timing threshold, then it is determined if a second input is received for the sub-lane before the timer reaches the timing threshold. Then it is determined if the second input is a second specific fret value. If it is determined that the second input is the second specific fret value, the plurality of cues are maintained as repeatable inputs. But, if it is determined that the second input is not the second specific fret value, the plurality of cues are modified to indicate that the plurality of cues are not repeatable inputs. In one embodiment of this version, the plurality of cues are maintained as repeatable inputs only if the first and second received inputs are received in a predetermined pattern.

In another aspect, there are also methods, systems with an apparatus configured to perform particular functions, computer program products, and apparatuses that provide means for scoring a section of repeatable inputs displayed in a sub-lane of a lane. This aspect involves displaying a plurality of cues of a sub-lane that will be scored as repeatable inputs. A timer is started, with the timer being independent of a timing window of any cue of the plurality of cues. Then it is determined if an input is received for the sub-lane before the timer reaches a timing threshold, and if the input is received for the sub-lane before the timer reaches the timing threshold, the timer is restarted and a score is assigned to a player.

In some embodiments of this aspect, if the input for the sub-lane is not received before the timer reaches the timing threshold, a score is assigned based on determining if the input is within the timing window associated with any one cue of the plurality of cues in the sub-lane. If the input is not received for the sub-lane before the timer reaches the timing threshold, it is determined if a threshold number of inputs is received for the sub-lane during the timing windows of the threshold number of cues in the plurality of cues, and if the threshold number of inputs is received for the sub-lane during the timing windows of the threshold number of cues of the plurality of cues, the steps of starting the timer, determining if an input is received before the timer reaches the timing threshold, and assigning a score to the player are repeated. In one version, the threshold number of inputs is one.

In one implementation, if the input is not received for the sub-lane before the timer reaches the timing threshold, a successful input counter is set to zero, the timer is restarted, and it is determined if an input is received for the sub-lane before the timer reaches the timing threshold. If the input is received for the sub-lane before the timer reaches the timing threshold, the successful input counter is incremented. If the successful input counter equals a threshold number of successful inputs, the steps of starting the timer, determining if an input is received before the timer reaches the timing threshold, and assigning a score to the player are repeated. If, however, the successful input counter is less than the threshold number of inputs, the steps of determining if an input is received for the sub-lane before the timer reaches the timing threshold and, if so, incrementing the counter are repeated. But, if the input is not received for the sub-lane before the timer reaches the timing threshold, the successful input counter is set to zero, the timer is restarted, and the determination of if the input for that sub-lane is received in time is repeated. In some versions of this, the threshold number of successful inputs is two.

In another implementation of this aspect, a second plurality of cues of a second sub-lane that will be scored as repeatable inputs are displayed. A second timer is started, with the second timer being independent of a timing window of any cue of the second plurality of cues. Then, it is determined if a second input for the second sub-lane is received before the second timer reaches a second timing threshold, and if so, the second timer is restarted and a second score is assigned to the player. In some embodiments, the timing threshold and the second timing threshold are equal, or alternatively, the second timing threshold is based on the timing threshold. In some embodiments of this implementation, the score and second score are assigned to the player only if the received inputs alternate between that of the first plurality and the second plurality. Alternatively, the score and second score are assigned to the player only if the inputs are received in a predetermined pattern.

In one implementation, determining if the input is received further involves determining if the input is a specific first fret value. Then it is determined if the input is received for the sub-lane before the timer reaches a timing threshold. It is also determined if a second input is received for the sub-lane before the timer reaches the timing threshold. If the second input is determined to be a second specific fret value, and if the second input is a second specific fret value, a second score is assigned to the player. But, in some instances, the score and second score are assigned to the player only if the received input and second input are received in a predetermined pattern.

In any of these aspects directed to displaying repeatable inputs, section indicators can indicate that the plurality of cues is a section of repeatable inputs by one or more of: glowing, flashing, highlighting, changing one or more of a position, a color property, a lighting property, a texture property, a size, a shape property, or a marking on the section indicator, connecting the plurality of cues, or any combination of these.

In any of these aspects, the section indicator can indicate that the plurality of cues are not repeatable by one or more of the following: removing the section indicator, dimming the section indicator, changing one or more of a position, a color property, a lighting property, a texture property, a size, a shape property, or a marking on the section indicator, or disconnecting cues if the plurality of cues are connected.

In any of these aspects, the length of time of the timing threshold can be a function of the number of sub-lanes that include repeatable inputs.

In some instances, the section indicator is displayed bounding the plurality of cues, and of the plurality of cues can be displayed (or their display can be modified) such that they fade out of view. In some of those cases, if a subsequent input is not received before the timer reaches the timing threshold, the display of the plurality of cues can be modified such that the plurality of cues reappear.

In another aspect, there are also methods, systems with an apparatus configured to perform particular functions, computer program products, and apparatuses that provide means for providing a realistic drum experience in a video game. These operate in the context of a video game platform in communication with a display and a drum controller, with the drum controller including at least one cymbal and at least one drum pad. The aspect begins by determining if a cue to be displayed on the display in a particular sub-lane should be a cue indicating a cymbal input or a cue indicating a pad input. Then, the cue is displayed in the particular sub-lane, indicating the cymbal input or pad input (dependent on the previous determination). Then, input is received from the player via the drum controller; and the input is given a first score if the input was a cymbal input associated with the particular sub-lane and the input is given a second score if the input was an input other than a cymbal input associated with the particular sub-lane. In some implementations, each sub-lane is associated with a color.

In some implementations, if a cue indicates a cymbal should be hit, it does not matter if the player hits the pad or the cymbal. In other words, the second score is equal to the first score even if the cue indicates a cymbal input associated with the particular sub-lane but the received input is a pad input associated with the particular sub-lane. Alternatively, the player can be punished for providing the wrong input, e.g., the second score can be less than the first score if the cue indicates a cymbal input associated with the particular sub-lane and the received input is a pad input associated with the particular sub-lane. Alternatively still, the second score can be zero if the cue indicates a cymbal input associated with the particular sub-lane and the received input is a pad input associated with the particular sub-lane.

Correspondingly, the same can be applied if the cue indicates a pad input is appropriate but the received input is a cymbal input. In other words, the first score is equal to the second score if the cue indicates a pad input associated with the particular sub-lane and the received input is a cymbal input associated with the particular sub-lane. Alternatively, the first score can be less than the second score if the cue indicates a pad input associated with the particular sub-lane and the received input is a cymbal input associated with the particular sub-lane. And alternatively still, the first score can be zero if the cue indicates a pad input associated with the particular sub-lane and the received input is a cymbal input associated with the particular sub-lane.

Other variations are possible for other gameplay elements, e.g., streak, bonus, etc, if the player provides the wrong input, e.g., a count of the player's consecutive successful inputs is reset if the cue indicates a cymbal input associated with the particular sub-lane and the received input is a pad input associated with the particular sub-lane. Or a count of the player's consecutive successful inputs is not reset if the cue indicates a cymbal input associated with the particular sub-lane and the received input is a pad input associated with the particular sub-lane. Alternatively, a count of the player's consecutive successful inputs is reset if the cue indicates a pad input associated with the particular sub-lane and the received input is a cymbal input associated with the particular sub-lane. Or, a count of the player's consecutive successful inputs is not reset if the cue indicates a pad input associated with the particular sub-lane and the received input is a cymbal input associated with the particular sub-lane.

The player can also be incentivized to the strike the cymbals when they are indicated. For example, the first score is a bonus score if the received input is a cymbal input and the cue indicates a cymbal input and the second score is a bonus score if the received input is a pad input and the cue indicates a pad input. Or, the first score is a bonus score if the received input is a cymbal input and the cue indicates a pad input and the second score is a bonus score if the received input is a pad input and the cue indicates a cymbal input.

In some implementations, regardless of score, the whether the input is successful can be based on if the cymbal or pad is hit. For example, in one embodiment, it is determined that the input is a successful input if the received input is a cymbal input and the cue indicates a pad input or if the received input is a pad input and the cue indicates a cymbal input. Alternatively, the input is determined to be a successful input only if the received input is a cymbal input and the cue indicates a cymbal input or if the received input is a pad input and the cue indicates a pad input.

In one version of this aspect, the version involves determining that a cymbal for the particular sub-lane is plugged into the drum controller and data in an input file indicates a cue is a cymbal. In one example of this version, the data in the input file indicates a cue is a cymbal by being a NOTE_ON event for a particular MIDI note.

In another aspect, there are also methods, systems with an apparatus configured to perform particular functions, computer program products, and apparatuses that provide means for scoring a performance of a guitar part in a rhythm-action game. These operate in the context of a video game platform in communication with a display and a controller. They involve receiving an input performance from the controller including at least one input chord note, each input chord note including an input string value corresponding to a struck string and an input fret value associated with the input string value. Then, a reference performance is provided, which includes at least two reference chord notes to be input at a target time, each reference chord note including a reference string value and a reference fret value associated with the reference string value. Then, a degree of matching is determined between the input performance and the reference performance, and a score is assigned to the input performance based on the degree of matching.

In some implementations of this aspect, determining the degree of matching between the input performance and the reference performance involves determining that an input chord note of the at least one input chord notes is a correct input if the input chord note matches a reference chord note of the at least two reference chord notes within a range of the target time. In these implementations, the input chord note matches a reference chord note if the input string value is equal to the reference string value and the input fret value is equal to the reference fret value. In some of these cases, determining the degree of matching further involves determining a count of correct inputs in the input performance. Then, a ratio of correct inputs is determined based on the count of correct inputs and a count of the at least two reference chord notes. Then, the score that is assigned is based on the ratio of correct inputs being above or equal to a threshold value, e.g., a value of 0.5. Alternatively, the score can be assigned based on a table lookup, such as a table lookup based on the count of correct inputs, or based on a count of the at least two reference chord notes.

Alternatively, a count of incorrect inputs in the input performance can be determined by subtracting the count of correct inputs from a count of the at least one input chord notes. Then, a ratio of incorrect inputs can be determined based on the count of incorrect inputs and a count of the at least two reference chord notes. In these scenarios, the score is assigned based on the ratio of incorrect inputs being below or equal to a threshold value, e.g., a value of 0.5. As above, the score can be assigned based on a table lookup, such as a table lookup based on the count of incorrect inputs, or based on a count of the at least two reference chord notes.

In some embodiments of this aspect, an input fret value of zero represents an open strum. Similarly, a reference fret value of zero can also represent an open strum.

In any embodiment of this aspect, a streak counter can be reset based on the degree of matching, e.g., if the input performance sufficiently matches the expected performance, the streak is not reset. Or, if it does not match the reference performance exactly, the streak is reset. Additionally, a musical output corresponding to the guitar part can be altered based on the degree of matching. Or a crowd meter can be adjusted based on the degree of matching.

Other aspects and advantages of the inventions will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the inventions herein, as well as the inventions themselves, will be more fully understood from the following description of various embodiments, when read together with the accompanying drawings, in which:

FIG. 4A depicts a screenshot showing a roll section;

FIG. 5A depicts a screenshot of an interface presented to the player attempting to play a guitar simulation;

FIG. 5B depicts gems that are shifted based on their position relative to each other;

FIG. 6 depicts a wave-like chord shape reflecting the fingering on the guitar neck that the player is using;

FIG. 7 shows more advanced chord gems;

FIGS. 8A and B show examples of sustains;

FIG. 9 shows a repeated pattern of pull-offs that are repeated on various strings;

FIG. 10 depicts a screenshot showing a trill on the guitar simulation;

FIG. 11 depicts a screen shot showing arpeggiated chord;

DETAILED DESCRIPTION

Architecture

Figure 1A:
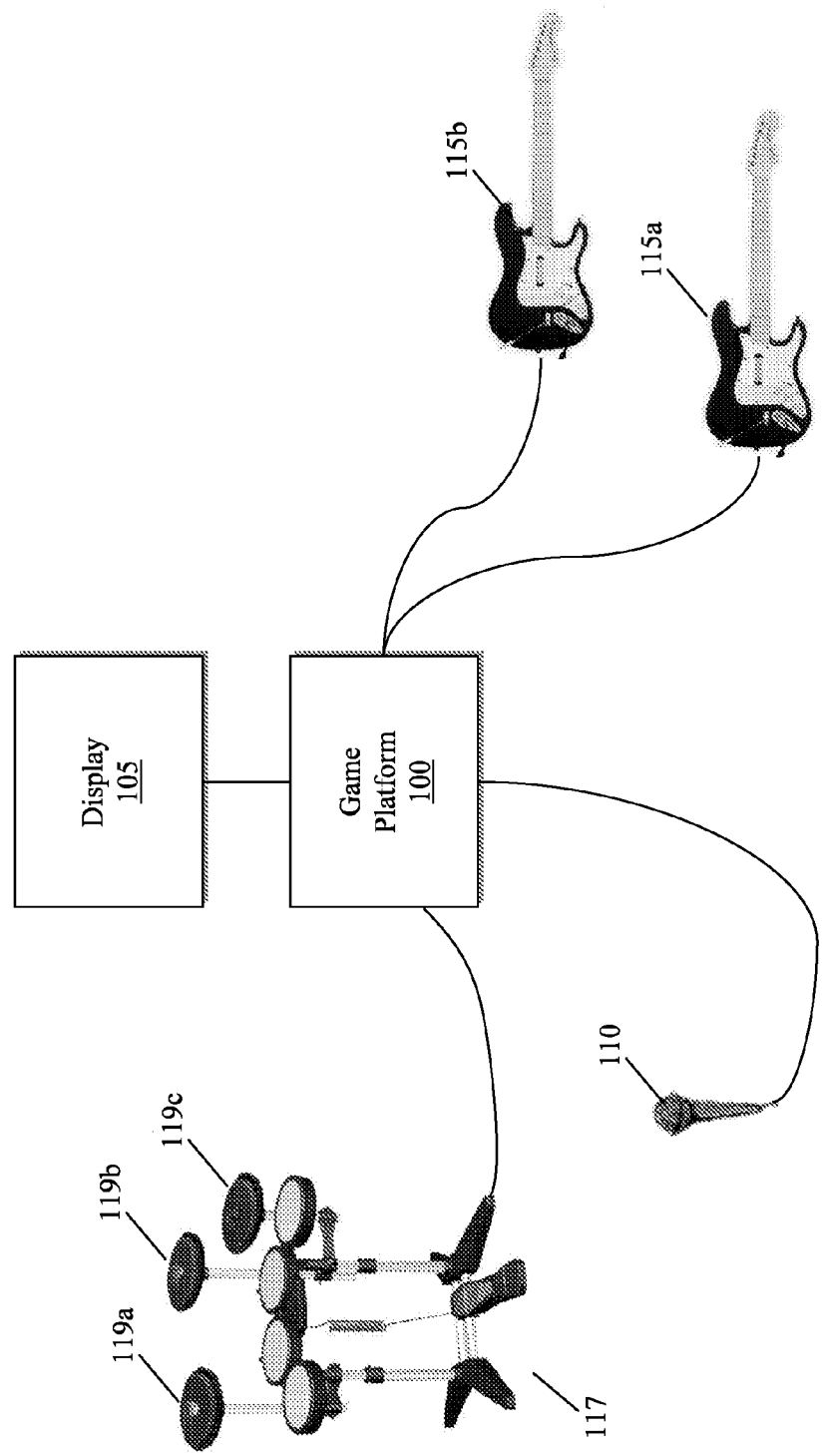
FIG. 1A is a diagram depicting a game platform and various components in signal and/or electrical communication with the game platform.

FIG. 1A is a diagram depicting a game platform 100 for running game software and various components in signal communication with the game platform. Each player may use a game platform 100 in order to participate in the game. In one embodiment, the game platform 100 is a dedicated game console, such as: PLAYSTATION® 2, PLAYSTATION® 3, or PSP® manufactured by Sony Corporation; WII™, NINTENDO DS®, NINTENDO DSi™, or NINTENDO DS LITE™ manufactured by Nintendo Corp.; or XBOX® or XBOX 360® manufactured by Microsoft Corp. In other embodiments, the game platform 100 comprises a personal computer, personal digital assistant, or cellular telephone. Throughout the specification and claims, where reference is made to "the game platform 100" performing a function, "game platform 100" may, for some implementations, be read as "game platform 100 with game software executing on it."

References to the game platform 100 and omission of reference to the game software does not imply absence of the game software. Game software alone may also embody the invention, e.g., a computer program product, tangibly embodied in a computer-readable storage medium, while in some embodiments the invention is implemented purely in hardware such as a computer processor configured to perform specific functions. In other embodiments the invention is embodied by a combination of hardware and software.

The game platform 100 is typically in electrical and/or signal communication with a display 105. This may be a television, an LCD monitor, projector, or the like. The game platform is also typically in electrical or signal communication with one or more controllers or input devices. In FIG. 1A, the game platform 100 is in signal communication with a one or more microphones 110, a first simulated guitar controller 115a, a second simulated guitar controller 115b (guitar controllers, collectively, 115), and one or more drum peripherals 117. In the example shown in FIG. 1A, the drum peripheral 117 has the optional cymbals 119a, 119b, and 119c attached. Other inputs can be other simulated instruments such as keyboards (not shown), standard controllers for the respective game platforms, and/or keyboards and/or mice (also not shown). Microphones, controllers, etc. may be connected via a physical wire, e.g., via a USB connection, or may be connected wirelessly, e.g., via Bluetooth, FM, a proprietary wireless protocol used by the Microsoft Xbox 360 game console, or other wireless signaling protocols.

Figure 1B:
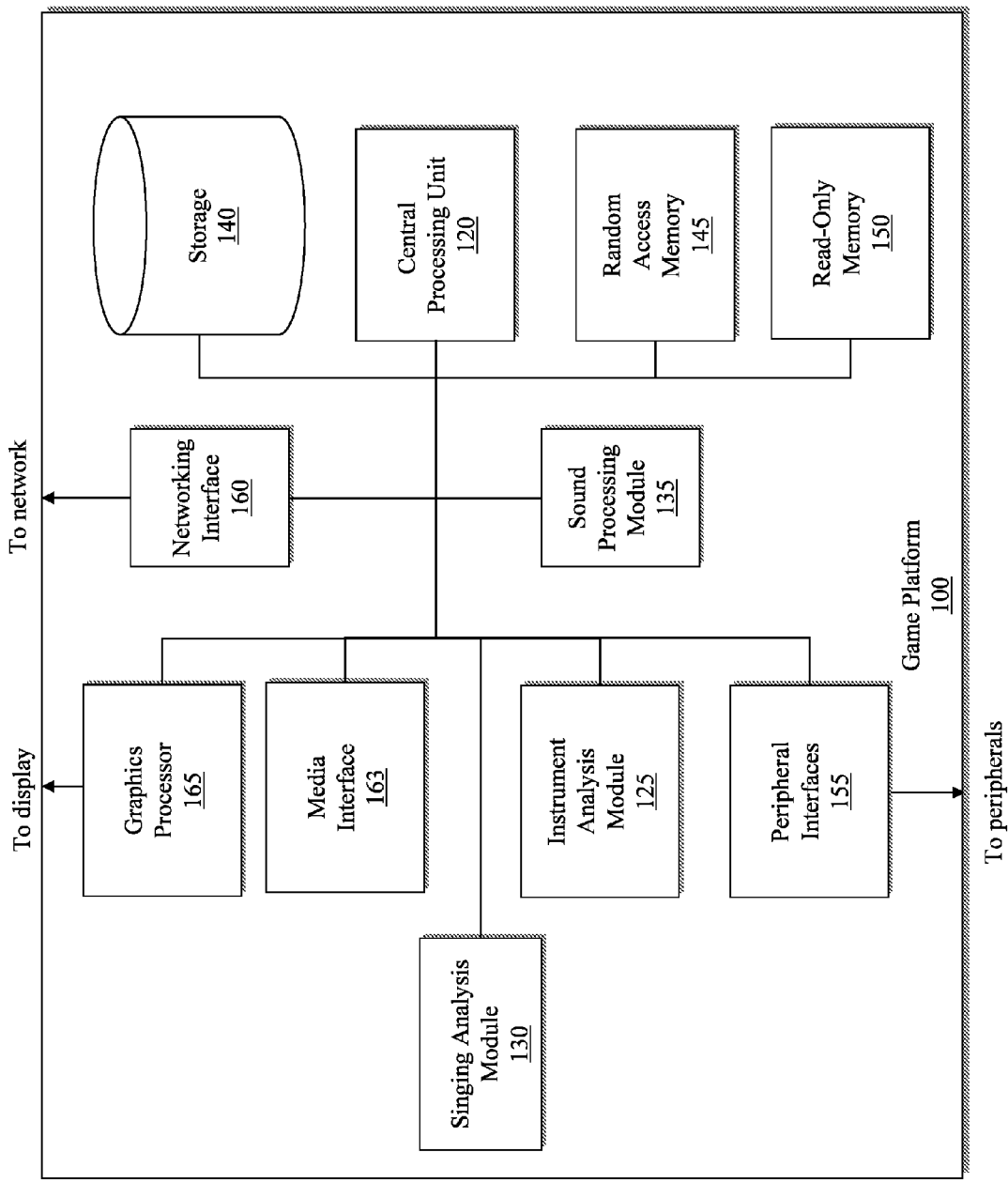
FIG. 1B is a diagram depicting various components and modules of a game platform.

Though reference is made to the game platform 100 generally, the game platform, in some embodiments such as that depicted in FIG. 1B, contains hardware and/or software that perform general or specific tasks, such as a central processing unit 120, an instrument analysis module 125, a singing analysis module 130, a sound processing module 135 that provides sound output, e.g., to a speaker, a storage device 140, Random Access Memory 145, Read Only Memory 150, peripheral interfaces 155, networking interface 160, media interfaces 163 (e.g., a CD-ROM, DVD, or Blu-Ray drive or SD, Compact Flash, or other memory format interfaces), graphic processors 165 and others. Each module may also contain sub-modules. For example the singing analysis module 130 may contain a data extractor module, a digital signal processor module, a comparison module, and a performance evaluation module (not shown). Alternatively, in software implementations of the modules, modules or combinations of modules may reside within the RAM 145 or ROM 150 (and/or be loaded into these from media via the media interface 163 or from storage 160) for execution by the central processing unit 120.

In some embodiments, execution of game software limits the game platform 100 to a particular purpose, e.g., playing the particular game. In these scenarios, the game platform 100 combined with the software, in effect, becomes a particular machine while the software is executing. In some embodiments, though other tasks may be performed while the software is running, execution of the software still limits the game platform 100 and may negatively impact performance of the other tasks. While the game software is executing, the game platform directs output related to the execution of the game software to the display 105, thereby controlling the operation of the display. The game platform 100 also can receive inputs provided by one or more players, perform operations and calculations on those inputs, and direct the display to depict a representation of the inputs received and other data such as results from the operations and calculations, thereby transforming the input received from the players into a visual representation of the input and/or the visual representation of an effect caused by the player.

In some embodiments, the processor 120 reads song data from a MIDI-like file. MIDI tracks in the file dictate information for specific instruments or game objects, such as cameras or scene information. The MIDI "notes" in the tracks are indicators for song data, gem placement information, avatar action cues, camera cuts, cues for events on stage, and other game events. Although the MIDI file uses MIDI note numbers, these MIDI notes do not typically correspond to actual note or pitch information.

Figure 2:
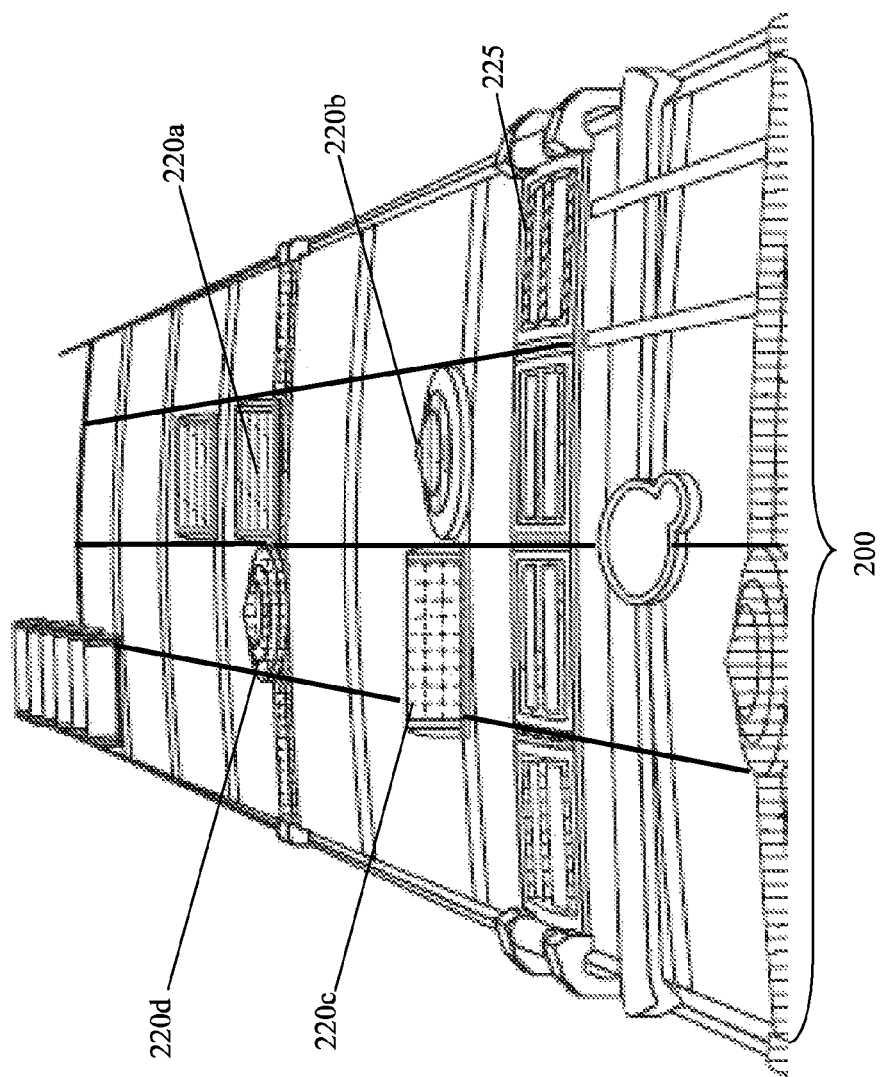
FIG. 2 is an exemplary screenshot showing cymbal gems and pad gems.

As an example, a drum part could be stored in a MIDI track entitled "PART DRUMS" with certain "notes" in the PART DRUMS track mapping to gem placement. Continuing the example, note 61 corresponds to the placement of a gem in the left-most sub-lane on easy difficulty, note 62 to a gem in the second-left-most-sub-lane on easy difficulty, etc., such that 60 -64 represents all gem placement data for the easy difficulty (with 60 representing the kick drum gem). The use of the term "sub-lane" merely indicates a logical separation of gems and is not limited by any display implementation or orientation. A similar sequence of notes is used for the other difficulties. Notes 73-76 correspond to the placement of gems from the left-most sub-lane to the right-most sub-lane on medium difficulty (with 72 being kick drum), notes 84-88 are used for all gems on hard difficulty, and notes 96-100 are used for all gems on expert difficulty. In this scenario, when the processor 120 determines the player is playing drums on medium difficulty, as the processor processes the song data file, it renders a gem in the left most sub-lane for every NOTE_ON event for note 73. FIG. 2 provides an example of data read by the processor 120 and rendered on the display 105.

Game Interface

FIG. 2 is an exemplary screenshot of a drumming interface. In FIG. 2, a lane 200 is used to display gems 220a, 220b, 220c, and 220d (collectively 220) in various sub-lanes. The gems 220 appear to flow toward a target marker 225, also called a Now Bar. The Now Bar 225 represents what the player should be inputting at a particular moment, i.e., now. In the embodiments shown, the gems 220 appear to flow from the "back" of the screen towards a player as if in a three-dimensional space, on a spatial path that does not lie within the image plane. In some embodiments, however, the gems 220 flow from right to left, while in other embodiments, they flow left to right. Gems may also flow from the bottom of the screen towards the top and from the top to the bottom.

The gems 220 are usually distributed in the lane 200 in a manner having some relationship to the expected input mechanism. For example, gems in the right-most sub-lane are associated with the right-most drum pad or cymbal. As mentioned above, typically there is a correspondence in color as well, e.g., a green gem appears in the right-most sub-lane and a green pad on a drum peripheral is the right-most pad. Even during lefty flip mode, where the player can play left-handed, there is still a correspondence between the sub-lanes on the screen and the pads of the drum. Although these are the typical embodiments, there are some embodiments where the player has rearranged pad on the drum such that there is no correspondence between drum pad arrangement and sub-lane. The player may do this for comfort, or additional challenge, or a host of other reasons.

As the gems 220 move through the lane within their respective sub-lanes, the player is expected to hit or strike the appropriate drum pad or cymbal when the gem 220 intersects with the Now Bar 225. If the player strikes the drum pad or cymbal at the correct time, an audio track of the drum part of the song stays unmuted. If the player does not strike a drum at the right time, or he strikes the wrong drum pad or cymbal, the audio track is silenced or muted, or, in some embodiments, the sound is attenuated so it is not played at full volume. Also, in some embodiments, a sample of an incorrectly played sound, or "muff" sound is heard. When the player begins hitting the pads correctly again, the drum part of the music is played again at normal volume.

In prior art games, only gems such as 220a or 220c, i.e., gems that did not distinguish between cymbals or pads, were presented to the player, even if the player had cymbals attached to the drum peripheral. Although the cymbals gave the player flexibility—he could satisfy the cue timing by striking the pad or the cymbal—that was the extent of the addition. In the present drumming invention, cymbal gems 220b and 220d are added to force the player to choose which surface to strike, thereby giving the player a more realistic drumming experience.

Before gameplay starts, the game prompts the player to input the configuration of cymbals that the player has connected to the drum peripheral and which colors the cymbals should be assigned to. For example, because cymbals are sold in varying amounts, i.e., individually, in two packs, or in three packs, a player may only have one, two, or three cymbals plugged in. If the player does not have three cymbals, some players may associate the cymbals they do have with certain color combinations, e.g., green and blue, or blue and yellow, etc. In some embodiments, the game automatically determines which cymbals are plugged in and which colors the cymbals are associated with.

Figure 3:
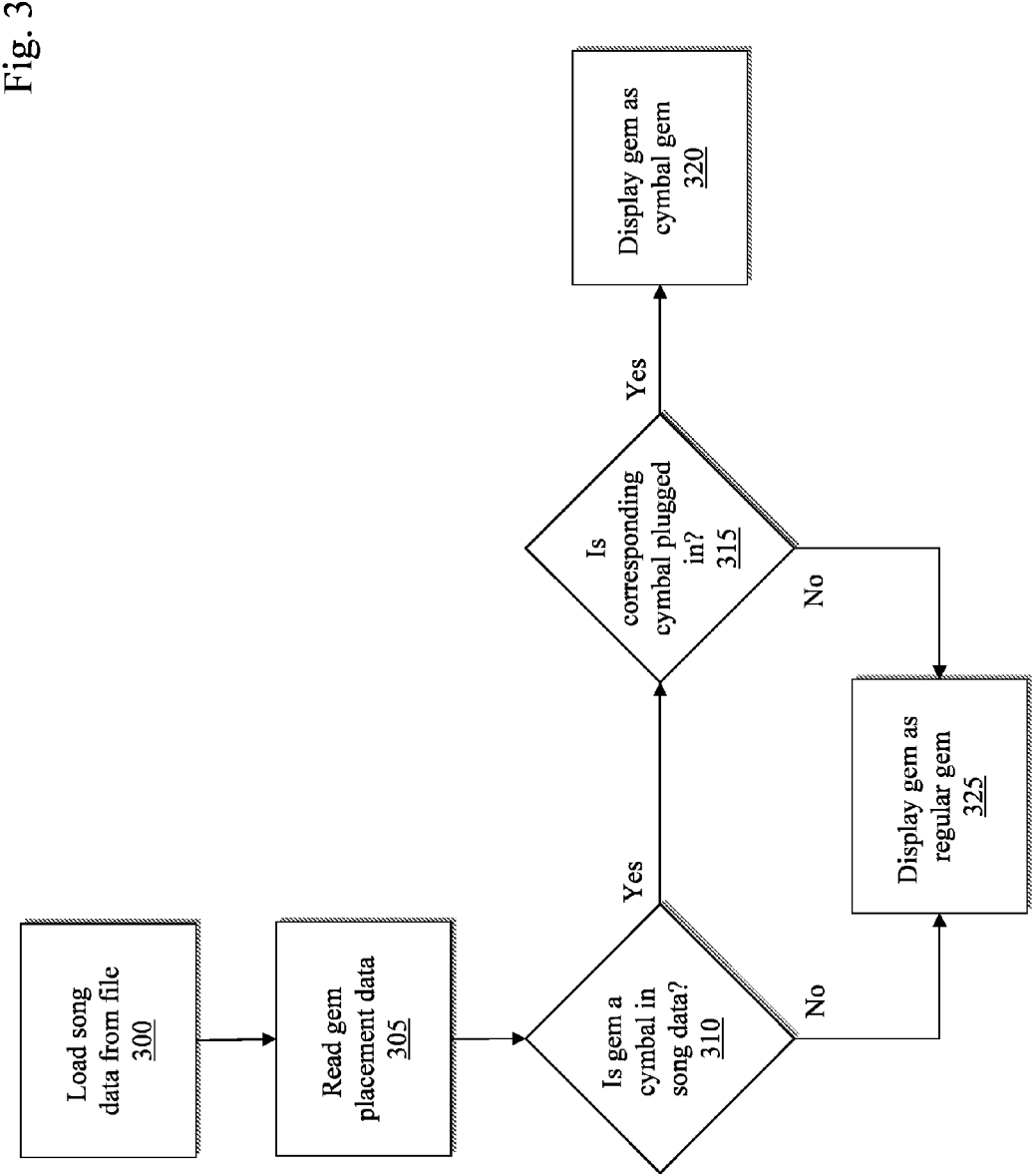
FIG. 3 depicts an exemplary method used for displaying the gems in FIG. 2.

FIG. 3 depicts the algorithm used to determine which gems are displayed as cymbal gems. When the song is loaded 300, the processor 120 of the game platform 100 reads the gem placement data 305 from the file representing the song. Alternatively, the data can be read real-time and the processor is continually determining during the song if gems should be cymbal gems or regular gems. The processor 120 then determines 310, 315 both that the gem is designated in the song file as a cymbal gem and that cymbal that is plugged in.

Determining if a gem is designated as a cymbal gem in the file is typically accomplished one of two ways. In one, note numbers that correspond to yellow, blue, and green inputs (e.g., MIDI note numbers 62, 63, 64 on easy, 73, 74, 75, on medium, etc.), are by default cymbal gems. Only when a NOTE_ON event is present in a different MIDI note, e.g., 110, 111, or 112, is a yellow gem, blue gem, or green gem rendered as a regular gem (i.e., corresponding to a tom tom). Another way is the opposite approach—by default the inputs are tom tom inputs and only when a NOTE_ON event is present for another note are the gems rendered as cymbal gems. In either case, the information as to whether a gem is designated as a cymbal gem is in the song data file.

If the gem is designated as a cymbal gem in the song file, and that cymbal is plugged in, the gem is rendered 320 by the graphics processor 165 on the display 105 as a cymbal gem. If the gem is designated for that sub-lane but is not designated as a cymbal gem, the gem is rendered 325 as a regular tom tom gem. If the gem is designated as a cymbal gem, but that cymbal is not plugged in, the gem is rendered 325 as a regular gem. Although the determination 310, 315 is depicted as being two separate steps, one skilled in the art would understand that the steps can be reversed or combined into one determination step, e.g., using a logical AND operator.

Referring back to FIG. 2, when some gems are designated and drawn as cymbal gems 220b, 220d, the type of gem that the gem is may affect gameplay depending on which "surface" the player strikes. A surface refers to the physical surface the player hits, regardless of color. This allows the processor, when receiving player input, to determine the color of the input as well as determine if the input was from a cymbal or a drum pad. This is useful for "Pro" mode where the player is expected to provide input that corresponds exactly to the gems onscreen, e.g., hitting the yellow pad and blue cymbal when gems 220c and 220b cross the Now Bar 225 and hitting the yellow cymbal and blue pad when gems 220d and 220a cross the Now Bar.

In some embodiments, when a gem of a given color and type is drawn, hitting a surface of the same color but the wrong type (e.g., hitting a blue cymbal when a normal blue gem is drawn, or a blue pad when a blue cymbal gem is drawn) is considered a miss. In these cases, the player receives no points or is penalized as if they had struck a different pad or had not struck any surface at all.

In other embodiments, the color a player strikes is accorded more weight and the surface is ignored. For example, when a gem of a given color and type is drawn, hitting a surface of the same color is considered a hit, regardless of which surface of that color is struck.

In still other embodiments, satisfying the color requirement is important, and satisfying the surface requirement gives a bonus. For example, when a gem of a given color and type is drawn, hitting a surface of the same color but the wrong type is considered a hit, but hitting a surface of the same color and the correct type (e.g., hitting a blue cymbal when a blue cymbal gem is drawn, or a blue pad when a normal blue gem is drawn) is considered a hit that yields a bonus, e.g., an additional 10% point award.

In some embodiments, all hits in sub-lanes which have associated cymbals are given a bonus, i.e. 10% more points. This gives the player an incentive to plug in the cymbal corresponding to that color.

Other alternatives are also contemplated. For example, in some embodiments, a bonus is given only for striking the right color and the right surface i.e., hitting a pad when the gem is a non-cymbal gem and for hitting a cymbal when the gem is a cymbal gem. Also considered is penalizing the player for striking the correct color, but the wrong surface, i.e., striking the cymbal when the pad is specified and vice versa.

Also contemplated are implementations that impact other parts of the game that are not strictly point-oriented. For example, hitting the right color but hitting the wrong surface will not break a streak of consecutive correct notes, but the player earns no score or a reduced score for that hit. Alternatively, the normal score is awarded, but the striking the wrong surface breaks the player's consecutive streak. In some embodiments the player is penalized in both manners for hitting the right color but the wrong surface, i.e., a reduced or zero score and the streak is broken.

Adjusting Timing Allowed for Player Input

Prior art games have approached determining the success of a player's input in various ways. Because it is virtually impossible for a player to provide the correct input at exactly the correct time (e.g., at the exact millisecond), some prior art games have provided a "slop window" where if a player strikes the correct input at the correct time+/− a value, e.g., 50 milliseconds, that strike is considered a correct input with no regard to where in the +/− window the strike was. Other prior art games grade a player on how close to the correct time the player has provided the input, e.g., the correct time+/−10 milliseconds is a PERFECT, the correct time+/−30 milliseconds is GOOD, +/−50 milliseconds is FAIR, and so on. But often these games are frustrating to a player where multiple inputs are presented with overlapping timing windows, for example in a drum game where there is a rapid succession of note, e.g., a drum roll. Additionally, it is difficult to determine, for two gems in the same sub-lane that are close together, if the player is providing input for the gem that has just passed the Now Bar 225 or the one that is about to cross it.

The present invention provides a solution to this problem. The process begins by the processor 120 reading the song data from the song file. When the processor 120 reads the song data from the file, it reads the gem placement data and determines if certain section of the song are designated as "roll" or "trill" sections. Rolls are usually associated with drum or percussion parts, whereas trills are usually associated with note producing instruments, e.g., guitars, woodwinds, horns, etc. In both cases, the player is presented with multiple gems in quick succession. With rolls, the gems are typically in the same sub-lane, although in some embodiments, gems can be in two sub-lanes and are presented in parallel. Trills are typically multiple sets of alternating gems in different sub-lanes, but may also be a series of gems that follow a fixed pattern. Many of the rules and functionality that govern the display and scoring of rolls also apply to trills. Rolls will be discussed first and any differences with respect to trills will follow.

In one embodiment, whether a series of notes is a roll or trill section is based on indicators in the song data. Where MIDI files or MIDI-like files are used to store song information, a roll or trill is indicated by a particular nonzero MIDI note number that is designated as "on" for as long as the roll or trill is supposed to last. For example, a roll is indicated by MIDI note 126 being on, and a trill is indicated by MIDI note 127 being on. Thus, for PART DRUMS, if there are NOTE_ON and NOTE_OFF events for notes 61, 61, 60, 60, 60, 60, 61, and there is a NOTE_ON event for note 126 that coincides with the first note 60 and has a NOTE_OFF event coinciding with the NOTE_OFF the last note 60 (or thereabouts), the gems associated with 60, i.e., the left-most sub-lane, on easy difficulty, would be in a roll section.

A roll is presented to the player by coloring the sub-lane underneath gems—cymbal gems or regular gems—to indicate the boundaries of the roll section. Referring to FIG. 4A, and ignoring sub-lane 415 for a moment, a roll is indicated by applying red highlighting or a red roll section indicator (shown in FIG. 4A as vertical shading) to a portion (400a extending through 400b collectively 400) of sub-lane 410 under the gems 405a, 405b, 405c, 405d, and 405e. Accordingly, logic for scoring roll gems is applied to any gem 405 within the roll section 400. Any gems after the roll section 400, e.g., any gems than are placed in sub-lane 410 but are not in roll section 400, e.g., area 420, are not treated as roll gems.

Special scoring and timing rules apply to roll gems. Specifically, the timing window for each individual gem in the roll section is effectively disabled. Instead, the timing of the player's input is judged against a roll interval. As long as a player provides input for that surface before the roll interval expires, the roll is considered ongoing and the individual gems' timing windows are ignored. Beneficially, during a roll, or if a player successfully completes a roll, a bonus or multiplier can be applied to the player's score, or special events or animations occur in the game. Additionally, game events can be driven by other aspects of the player's performance of a roll. For example, animations may be driven based on the player's roll speeds increasing or decreasing, or if the player's drumming exceeds the roll interval, or if the roll breaks or resumes.

Roll logic, such as the roll interval or if a particular surface of a color needs to be struck, can also be altered or designated on a per-difficulty, per-song, or even per-roll section level, or combinations of these, e.g., a roll can be set differently for a given song for each of its difficulty levels. Because rolls can also be used by different instruments, e.g., as explained below with respect to a guitar simulation, the roll interval (and trill interval) can be specified on a per-instrument basis as well.

In the screenshot depicted in FIG. 4A, and still ignoring sub-lane 415, assume the gems in sub-lane 410 are placed 100 milliseconds apart. Because the section is designated a roll section, the player must provide input before the predetermined roll interval expires, e.g., least every 165 milliseconds, for the roll to continue. For example, the player could hit the red drum pad every 50 milliseconds and the roll would continue. Or, the player could continue the roll by hitting a pad at 25 milliseconds, and then 68 milliseconds after that and then 22 milliseconds after that, and then 12 milliseconds after that. In both scenarios, the timer that measures if the player has input the required input resets each time the player hits the designated pad or cymbal.

Beneficially, a roll can be shared between sub-lanes—a multi-sub-lane roll—where the player is supplying input to two different pads or cymbals (or a combination of both). The roll interval for multi-sub-lane rolls can be determined automatically from a single sub-lane roll interval, or can be looked up based on the number of sub-lanes sharing the roll, or can be set manually on a per-difficulty, per-song, or per-roll section level. In some embodiments, for each sub-lane in a multi-sub-lane roll, there is an independent timer that must be satisfied to maintain the roll. In other embodiments, a multi-sub-lane roll has a single timer that must be satisfied among all the sub-lanes designated as roll sections. In some implementations, the number of hits in each sub-lane must be generally equivalent to prevent cheating (e.g., providing input for only one of the sub-lanes).

In FIG. 4A, and now considering sub-lane 415, the player must supply input to both the red pad and the yellow cymbal as a roll. The player can either alternate striking the red pad then yellow cymbal, or he can strike both simultaneously. Because the roll is indicated for two sub-lanes, the player will likely dedicate one drumstick to each input. Compared to a single sub-lane roll, where the player is striking the same pad with two drumsticks, a two-sub-lane roll is typically slower since the player is splitting the striking between the two surfaces. To compensate for this, the time required to continue the roll for each surface is increased to give the player more time to strike the indicated surface. For example, the player may have to provide input for the each of the two sub-lanes 410 and 415 every 225 milliseconds, striking both the red pad and the yellow cymbal at least once. The strikes can be generally at the same time, or they can be alternating; they just need to occur on both pads within the roll interval. Where the trill is based on a predetermined pattern, each sub-lane participating in the pattern has a timer and the player has to satisfy each sub-lane for the trill to succeed. Alternatively, there could be one timer for the trill and the player must simply provide the required inputs in the patterned order.

Figure 4B:
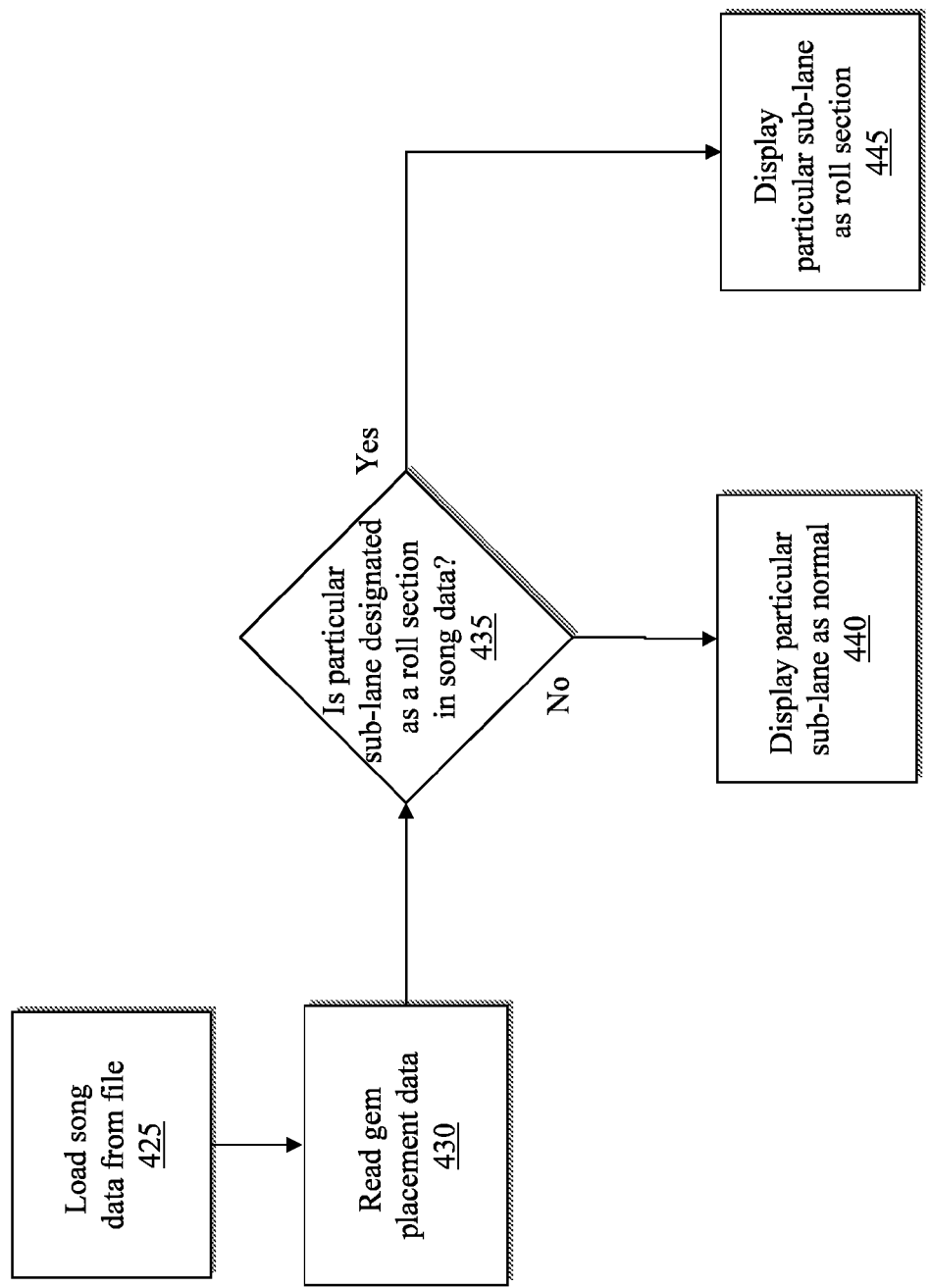
FIG. 4B depicts the logic used to display a section as a roll section.

FIG. 4B depicts the logic used to display a sub-lane as a roll section. The processor 120 loads 425 song data from the song file. The processor 120 reads 430 the gem placement data and determines 435 if a sub-lane is designated as a roll section. As discussed above, in some embodiments, this is done by determining if a MIDI NOTE_ON event exists for MIDI note 126. As long as MIDI note 126 is designated as on, the designated sub-lanes are displayed 445 as roll sections. Alternatively, in some embodiments, only gems that start at the same time as the roll section have their sub-lanes as a roll sections. In other embodiments, any gems that coincide with a roll section indicator, across all sub-lanes, have their sub-lane designated as a roll section. Regardless, if a sub-lane is not designated as a roll section, the sub-lanes are displayed 440 as normal sub-lanes.

Alternatively, in some implementations, the roll-sections are designated on a per-sub-lane basis, which allows for non-roll input in other sub-lanes while a roll is being performed in participating sub-lanes. In these implementations, each sub-lane is designated in the song data file by a corresponding MIDI note as being a roll section or the sub-lanes which have a gem starting simultaneously with the roll marker can be designated as participating in the roll.

For both single sub-lane and multi-sub-lane rolls, if the player does not provide the needed input before the roll interval expires, the roll breaks, the roll section indicator 400 underneath the gems sub-lane dims or disappears altogether and normal beat matching game play resumes, i.e., the player must hit each gem within its timing window. A roll can be restarted though (if the section is still designated in the song file as a roll section) if the player begins providing input that satisfies the roll interval. In that case, the roll reactivates, the roll section indicator 400 reappears (if it disappeared) or becomes bright (if it dimmed) and the gems and sub-lane(s) are depicted as roll sections.

In some embodiments, a roll that is active for two sub-lanes can be broken or maintained for each sub-lane individually. For example, if the player is satisfying the roll interval for the red sub-lane, but not the yellow sub-lane, the red sub-lane will stay in roll mode but the yellow sub-lane gems will become regular beatmatch gems.

Beneficially, in some embodiments, as long as the timers are satisfied, the roll is maintained, even if other notes are hit during the roll. This provides a gameplay experience where the user is playing a roll, but other drum or cymbal hits can be presented as well, such as occasional crash cymbals.

Trills operate similar to rolls in that they ignore gem timing windows and have an interval in which the player must provide the required input. As described above, trills are designated by a MIDI NOTE_ON event for MIDI note 127, and run until the corresponding NOTE_OFF event. Alternatively, in some implementations, trills can be detected from the song data file by finding a series of repeated alternating gems or gem patterns. In still other implementations, trills can be set manually by an author of the song data file by using a gem and one or more informational or "ghost" gems, (i.e., a gem with a different channel setting than gems used for gameplay) in which case the trill alternates in an arbitrary order, starting from the real gem.

Trills, however, require the player to alternate inputs among two or more designated notes. For example, in a regular five or ten button guitar controller for use with ROCK BAND®, a trill would be displayed using two sub-lanes, e.g., left most (green) and second-left-most (red), and the player must alternate providing green and red inputs. The player successfully performs the trill by holding down the "lower" or left-most button (green) and use a repeated hammer-on for the "higher" input (red) before the trill interval expires. The player then performs a pull-off of the higher input (red) back to provide a lower input (green) before the trill interval expires. Although hammer-ons/pull offs are given as an example, trills are not limited to these techniques. Players can also trill using a traditional strum and finger technique to trill. Regardless, the player performs the alternating input and the process is repeated until the trill section is over. Trills could also follow a pattern of inputs, e.g., they could have a pattern of red, yellow, green, red, yellow, green.

In a real guitar controlled implementation, e.g., as depicted in FIG. 10, a single sub-lane is used, but the player must provide inputs on the same "string" for two different frets, e.g., 9 and 12. In both cases, a trill is similar to a roll in that each input must be performed within a roll/trill interval or the trill breaks.

Although two notes are discussed, it should be noted that trills do not mandate just two notes in any of the embodiments—they can be almost any pattern. For example, in embodiments with a keyboard instrument (described below), a trill could be any combination of repeated inputs, e.g., the player's thumb and third finger alternating with second and fourth finger. Alternatively, for guitar simulations, trills can also be used to indicate tremolo picking, which does not alternate between two notes—rather it stays on one—but the picking is very quick. In a sense, tremolo picking is like a drum roll on one string.

Although similar to rolls, the trill interval is distinct from the roll interval, and is typically set lower, e.g., 160 milliseconds for trills versus 165 milliseconds for rolls. Like rolls, trills can also be set or altered on a per-difficulty, per-song, or even per-trill section level, or combinations of these, e.g., trills can be set differently for a given song for each of its difficulty levels.

Like rolls, in some embodiments trills allow for additional inputs during the trill. But in other embodiments, trills do not allow additional inputs during the trill and alternating the trill inputs or following the trill pattern is a requirement.

Real Guitar

Prior art rhythm-action games allowed the players to provide input via game controllers that simulated musical instruments, mainly in shape only. One of the inventions herein allows the player to provide input via a controller that simulates playing an actual guitar. Various controllers may be used with the game, as the controller itself is not important. For example, one controller usable with the invention has a plucking section and a simulated fingerboard. The fingerboard has buttons disposed on it arranged in rows (frets) and columns (strings). Each button simulates the space on the neck above (closer to the headstock) the intersection of a particular string and a particular fret on an actual guitar. The plucking section has metal or nylon "strings" approximately six inches long, all of the same gauge, which the player strums or plucks. The "strings" do not make musical sounds, rather they indicate a player's strumming action using a binary plucked state, i.e., string_plucked, or string_not_plucked. Alternatively, a guitar with actual strings and means for determining which strings are plucked may be used, where the strings are electrically conductive and contact with a metal fret closes a circuit to indicate the player has pressed the string against a particular fret. Strumming a string only provides a binary state similar to that of the button-based guitar controller. Regardless of the controller used, the invention provides a more realistic guitar experience.

The guitar simulation invention receives input from the guitar controller specifying which frets the player is pressing and what string the player is strumming. For simplification, it is understood that the "displaying" and "rendering" steps described herein are performed by the processor 120, with the help of the graphics processor 165 where necessary. Where reference is made to determining what input the player provided and if it was correct, those steps are performed by the instrument analysis processor 155, or the processor 120, or a combination of both. Also, for simplification, the examples provided will assume a controller with six columns and seventeen rows of buttons on the neck.

An example of the interface of the game invention is depicted in FIG. 5A. The player is presented with six "strings" on the interface simulating that of E, A, D, G, B, and E. References made herein to the "E" string refer to the low E or the left-most E string unless otherwise stated. Similar to prior art rhythm action games, the notes or gems move toward the player and the player is expected to provide the required input as the note or gem cross the Now Bar, here indicated by 500. In the guitar simulation invention, gems can take many forms to indicate what the player is supposed to input. In FIG. 5A, based on the "tombstone" gem 505 on the D string with "4" on it, the player is supposed to push down the 4th row button on the controller for the column that corresponds to D and strum the D string when the tombstone crosses the Now Bar 510. After that, the player strums the A string with no buttons pressed down because the next tombstone gem 510 has a "0" on it, indicating an open strum.

FIG. 5B shows an additional way of displaying tombstone gems. Tombstone gems 505 and 510 are centered on the D and A strings respectively. When two or more tombstone gems are on the same string in relatively close proximity, however, displaying both gems centered on the string makes them difficult to read. In the present invention, when two or more tombstone gems are presented on the same string, the tombstones can be offset in order to make them more readable. In some embodiments, the offsets of the tombstones are related to the fret number. For example, the lowest of the gems, i.e., the one representing frets closer to the head stock of the guitar, are offset to the left. Then the tombstones on the gems are progressively displayed shifted to the right on the string as the represented fret is higher, i.e., closer to the strumming area and back to the left if subsequent notes are lower on the string. In FIG. 5B, gem 515, which indicates the player is supposed to finger the 5th fret, is shifted to the left. Gem 520, indicating the player is supposed to finger the 7th fret, which is closer to the strumming area, is shifted to the right. This way, when multiple gems are stacked close together, they are still individually readable. FIGS. 9 and 10 show additional examples.

Beyond tombstone gems, to offer players a robust guitar simulation, a song data file with numerous configurations (similar to the one described above with respect to the drums) is used to drive the real guitar presentation and gameplay. In one embodiment of the song data file, each string, for each difficulty, is represented by a different MIDI pitch. The fret that the player is expected to play (and what is rendered on the screen) for each string is represented by the MIDI note velocity, whose value is 100 plus the fret number. For example, to indicate an open string, i.e., a 0th fret, the velocity of the pitch for that string would be one hundred. To indicate the 5th fret should be fingered, the velocity of the pitch associated with that string would be 105, and so on. Beneficially, because MIDI provides 128 velocity values, this system provides at least 27 fret values for each string, which exceeds the number of frets on a normal guitar.

In some implementations, each MIDI note can be given a modifier to affect how the note is displayed or played by the player. Examples of modifiers are ghost, bend, muted, tap, palm mute, natural harmonic, pinch harmonic, slide, pick slide, whammy up, whammy down, bass pop, bass slap, and others. To apply a modifier, a particular MIDI note channel is specified, e.g., a MIDI note channel of 1 is used for no modifier (or "normal", the default), a MIDI note channel of 2 is used for ghosted notes, a MIDI note channel of 3 is used for bends, and so on through bass slap having a MIDI note channel of 14. Additional modifiers are discussed later.

In a preferred embodiment, the guitar simulation invention indicates to the player what frets he is fingering input by means of a wave-like chord shape displayed on screen. FIG. 6 shows a wave-like chord shape 600, indicating that the player is pressing down the second button on the G string. The magnitude, e.g., slope and height, of the shape informs the player how high on the neck the button is. For example, if the player is not pressing any buttons down, the wave is flat, or has no height. If the player is pressing down the first button, the arch is slightly higher. If the player is pressing down the second button, the arch is slightly higher than if he were pressing down the first button. This continues for five buttons with the fifth button having the highest arch.

Several algorithms for drawing the chord shape are available. Although only some are described herein, the description herein does not limit the possible implementations. In one embodiment, each string has five magnitudes, e.g., heights 0 through 4 Optionally, there could be seven magnitudes, e.g., heights 0 through 6, but the specific number is variable and one of skill in the art can implement any number of magnitudes or heights. A magnitude reflected by height will be used herein, but a magnitude of width, or slope, or other dimension is also possible.

The baseline for building the chord shape wave is the fret number for each string, with zero being used for open strings. For each string, if that string is an open string, i.e., the player is not fingering any fret, the processor 120 assigns that string a height of zero and the chord shape does not display anything for that string. Then the processor 120 determines the minimum fret number for all non-open strings, i.e., the strings that the player is fretting. The strings with the minimum fret number are assigned height 1. For the other strings (with higher fretting), the minimum fret number is subtracted from the current fret number and 1 is added to get that string's height. Finally, the string's height is clamped to be at or below the maximum height (4 or 6, in our example). This prevents the chord shape from becoming unwieldy and difficult to read.

Another implementation begins similarly, by assigning height 0 to each open string. Then, the processor determines the maximum fret number for all non-open strings. If the maximum fret number is less than the number of possible heights, e.g., five (for heights 0-4), then the height for each string is the fret number for that string, with height 0 being invisible. If the maximum fret number is not less than the number of possible heights, strings with the maximum fret number use the maximum height. For other frets, the height is the maximum fret number minus the maximum fret number, plus the actual fret number. Finally, the string's height is clamped to be at or above the minimum height, 0. Then, the chord shape is drawn relative to the 0th height.

Although the example just given is with respect to the first five buttons from the top of the neck, the five button limitation is actually based, in some implementations, on the lowest note that is to be fretted (as explained below with respect to FIG. 7). As the gems move toward the Now Bar, the player is expected to form the correct fingering such that the notes will pass through the chord shape and match it. This is most useful for chord gems (discussed below) because tombstone gems are all a uniform height. Regardless, in FIG. 6, the player can tell he is fingering at least the correct string because the tombstone gem 605 is passing through the chord shape the player has created.

In the song data file, chord gems are represented in much the same way as single notes are. The only real difference is that multiple notes are authored to be played at the same time. Beneficially, there is only a single note per string, which corresponds to the way an actual guitar is fingered. And like chords played on an actual guitar, all notes in the chord are to be played by the player—that is to begin and end—at the same time. Although multiple simultaneous notes are typically rendered as a single chord gem in a real guitar implementation, in some embodiments, there is a MIDI note where, when a NOTE_ON event is marked, any notes at the beginning of or during the NOTE_ON event, are rendered as separate gems and not as a chord gem.

A gem builder routine is executed by the processor 120 to display each chord gem. Several implementations are possible. In one implementation, the gem builder routine is similar to that of the chord shape wave builder routine described above (since the gem has to pass through the chord shape). One difference though is that for chord gems, height 0 is displayed visibly at a height lower than 1, to indicate open strings that must be strummed. For any string that should not be strummed, the corresponding portion of the gem shape is omitted.

In other implementations, for each string played in the chord, the height of the gem is determined for that string based on the fret value used and the highest value used in the chord. A chord typically has up to four height values, excluding open strings. Alternatively, in other implementations, the height values of the gem are based on where the player's index finger is supposed to be. This allows the player to use his index finger as a consistent reference.

In some embodiments, the highest fretted note in the chord produces the highest height in the chord gem. The remaining fret values proceed linearly with the fret values from the highest fretted value in the chord. As an example, a C major chord requires the player to put a finger on the 3rd fret of the A string, the 2nd fret of the D string, and the 1st fret of the B string. Thus, using the highest fretted value (3rd fret, A string) as the highest height, the gem slopes linearly from left to right, as shown in FIG. 18.

Figure 18:
FIG. 18 depicts a gem that indicates fret values in a chord.

Although in FIG. 18, the gem slopes linearly, other interpolations are possible in any of the embodiments described herein, e.g., quadratic, exponential, logarithmic, or splines.

In this example, the gem builder uses the 4th (highest) height value for the 3rd fret on the A string, the 3rd height value for the 2nd fret on the D string, and the 2nd height value for the 1st fret of the B string. The 1st height value is not used. The two open strings played in this chord are represented by the open string graphic, or are not rendered as part of the gem.

FIG. 7 shows more advanced chord gems. The number "5" in gem 700 indicates to the player that the base of the expected chord shape starts from the 5th button on the A string. Several algorithms have been devised to label the chord, e.g., to indicate "5" on gem 700. In one implementation, the first string going from low E to high E that has the minimal fret value is used as a baseline, excluding open strings. This approach can be used to indicate where on the neck of the guitar the index finger is placed. For example, for an E chord, a "2" may be attached to a gem starting on the A string. Another implementation is for the processor 120 to determine, going from low E to high E, what should was strummed, for example, an E chord would have a "0" on the low E string because the E string is the first string strummed, but it is open. Another implementation is to determine what the first string, going from low E to high E, that should be both fretted and strummed. For example, again, the E chord would have a "2" on the A string because the A string is the first string that is fretted and strummed (the E is strummed, but not fretted).

In the embodiment depicted in FIG. 7, the leftmost part of gem 700 is on the A string. Starting with the 5th button, the shape indicates that the player is supposed to press down the 5th button on the A string and the 7th button on the D string. Again, the fingering is indicated by the arch of the chord shape 705. To assist players that are already familiar with guitar chords, an indicator of the chord is also provided. Because the gem 700 indicates a 5th fret on the A string and 7th fret D on the D string, this is a D chord. The D chord is indicated by the D (710) to the left of the gem. Gem 715 indicates that, starting from the 7th fret of the A string, the player will push the 7th button and 9th button. This is the same fingering shape as gem 700, but two frets closer to the strumming area on the guitar controller. Also, this is known as an E chord, so E (720) is indicated to the left of gem 715.

In FIG. 8A, gem 800 indicates the player is supposed to finger the 17th frets on the B and E string. Additionally, the player is supposed to hold, or "sustain," the note, which is indicated by the horizontal markings 805, 810 (blue highlighting) on the strings. The 17th frets on those strings are E and A, which in part make up a Cmaj6 chord. As seen in FIG. 8A, the player is currently fingering fret 19 on the G string and fret 18 on the B string. The fingering is based on the shape of the wave, as it relates to the gem 800. The shape of the wave 815 on the G string is approximately two steps higher than that of the gem 800, which is represents input starting at fret 17. Since the B string fingering 820 is only slightly higher than that of the gem 800, the wave indicates the player is fingering the 18th fret.

FIG. 8B shows an additional example of a sustain. Gem 825 indicates that, starting on the low E string, the player is supposed to finger the "0th" fret, i.e., leave the E string un-fretted, and finger the 2nd fret on both the A and D strings, thereby playing the notes B and E. Together, open E, B, and E form an E chord. The player is then supposed to hold the chord as long as indicated by the sustain trails 830, 835, and 840.

While the player is fingering the 2nd fret on A and D properly (based on the chord shape wave), the player is also fingering the 2nd fret on the G string, i.e., fretting an A. This is not the indicated E chord though. In some embodiments, strumming an incorrect string, here the G string, while pressing down on a fret, results in a miss. In other embodiments, if the player is fingering an additional fret, but does not strike the string that is fretted, the result is not considered in determining if the player successfully played the cue as directed. In still other embodiments, credit is given for successfully playing part of the chord or playing additional strings as long as the user played some or all of the required strings. The threshold for the partial chord can be if the player played a majority of the notes correctly, e.g., 3 out of 5, or it can be related to the difficulty of the chord shape, e.g., if the shape is complex with different fingers all on different frets, e.g., 2nd fret, 4th fret, and 5th fret, the player may be given credit for fingering two of the three. Alternatively, if the fingering is 0, 2nd fret, 2nd fret, the player may have to finger all three correctly because 0-2-2 is easier to finger then 2-4-5. Or, the method for determining a partial chord hit can be similar to that described below in "Determining Successful Guitar Input."

FIG. 9 shows a repeated pattern of pull-offs that are repeated on various strings. The initial fret the player is supposed to hold down is the 4th fret on the G string. The player is supposed to strike the G string with the 4th fret held down (indicated by the light border around the 4 tombstone in group 900. The player is then supposed to pull off to the 2nd fret, and then pull off to an open string position (the "0th" fret) (pull offs are indicated by the darker borders around the "2" and "0" tombstones). The placement of the tombstone gems on the string reiterates the earlier-discussed relationship between the left of the string indicating a fret closer to the headstock of the guitar and the right of the string indicating a fret closer to the strumming area. The pattern is repeated in group 905 on the D string, and then again in group 910 on the A string. As with the discussion above with respect to trills, the notes in FIG. 9 do not have to be played as pull-offs—they can also be individually strummed.

FIG. 10 depicts a screenshot showing a trill on the guitar simulation. The trill has the same sub-lane indicator 1000a through 1000b as described above, but the player is expected to perform the trill on the same string. Here, the player is expected to trill between frets 9 and 12 on the B string. The trill rules described above apply, i.e., the player must alternate between 9 and 12 before the trill interval expires (e.g., 160 milliseconds) or the trill will break and normal beatmatch game play will resume.

FIG. 11 depicts a screen shot showing arpeggiated chord. An arpeggiated chord is a chord that is played across the notes of the chord, but the notes are not played at exactly the same time. In FIG. 11, an arpeggiated chord is indicated by the highlighting 1100a, 1100b on the sides of the sub-lane. The shape of the chord will come down the track and "click in," remaining on the screen. Moving the arpeggio shape down the track and clicking it in for the duration of the arpeggio serves the same function as a chord gems—the player is expected to match his fingering input (also show onscreen as a chord shape, but not shown here) to the arpeggiated chord shape. Because the arpeggio chord shape stays in place, this tells the player to keep his left hand in place for the next series of notes. In the song data file, notes that are modified as "ghost notes", i.e., MIDI note channel of 2, are used by the processor 120 to build the chord shape for the arpeggio that is moved down the screen. Beneficially, ghost notes also are used to analyze the chord for its proper name and quality when not all the notes of the intended chord are played right away. For example if the arpeggiated section is a D chord, but the player is to play only the D on the A string and the D on the B string on the downbeat (and not other notes), the notes in the D chord that are not D are designated in the song data file as ghost notes so they are not indicated on the screen.

In FIG. 11, the player is fingering a D chord. Specifically, a finger is on the 5th fret of the A string, a finger is on the 4th fret of the D string (indicated by the slight dip 1105 in the chord shape wave after the left-most 5th fret indication), a finger is on the 2nd fret of the A string (another dip 1110, greater than that of 5th fret to 4th fret), and a finger is on the 3rd fret of the B string (indicated by the slight rise 1115 in the chord shape wave from 2nd fret to 3rd fret). The arpeggiated chord notes 1120 and 1125 are strummed individually and the player does not have to move his hand.

Figure 12:
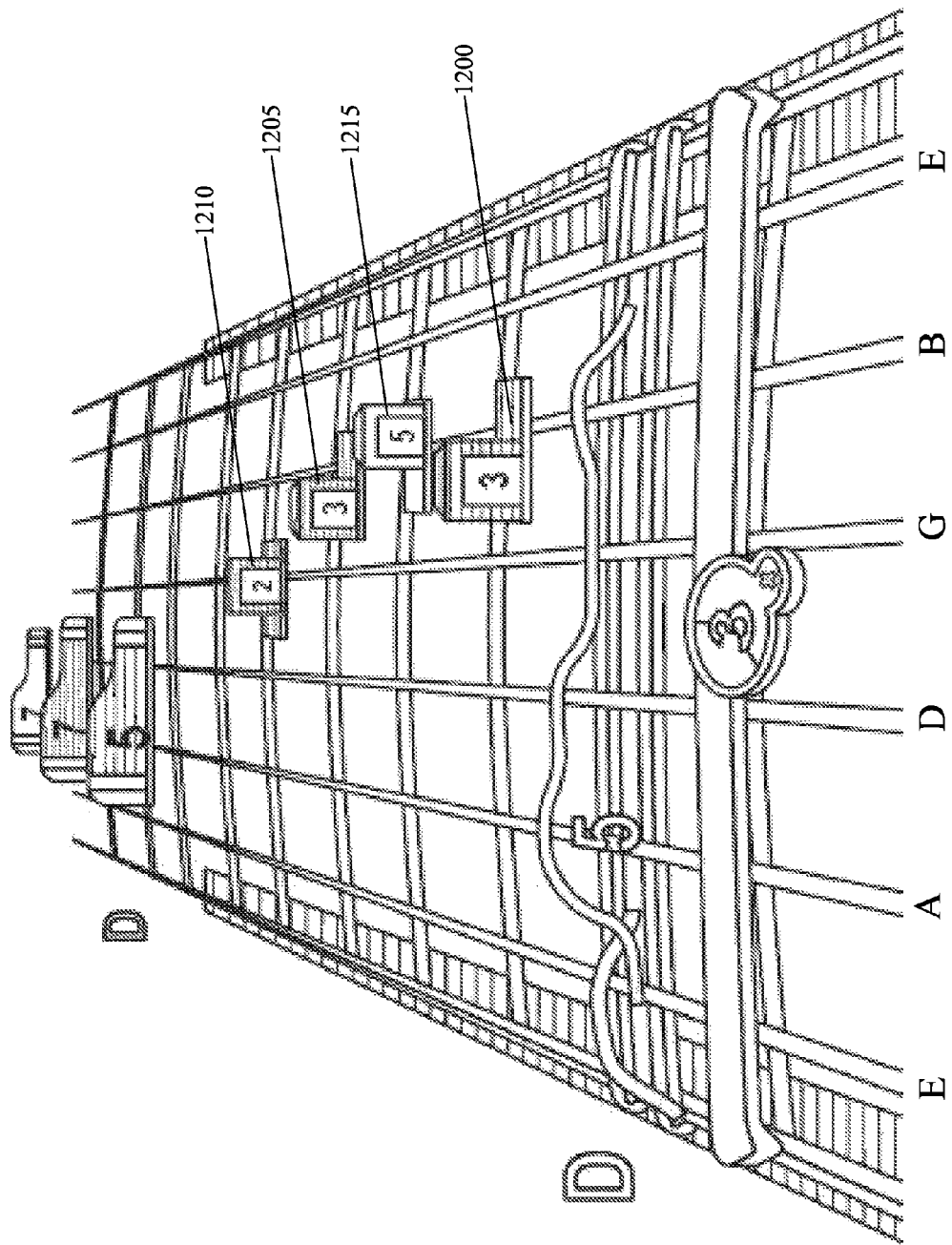
FIG. 12 shows an arpeggiated section with augments.

In some embodiments, the player is rewarded with a bonus if the player keeps the chord shape for the arpeggiated chord throughout the arpeggiated section. In other embodiments, highlighting a chord as arpeggiated is simply a useful indicator to those that already know how to play a guitar of how a series of notes can be played. FIG. 12 shows an arpeggiated section with augments. The arpeggiated notes 1200, 1205, 1210 of the chord are all colored the same color, here indicated by horizontal lines (blue coloring). The augment 1215 to the D chord, i.e., the 5th fret on the B string, i.e., an E, is indicated in a different color, here, without coloring (yellow, or horizontal lines such as those on the "2" and "3" tombstone gems). Differing the color indicates to the player that the note is not part of the arpeggiated chord and that the player must move a finger to satisfy the note.

In the song data file, some the modifiers allow for different playing techniques. For example, tapping—performed with the right hand instead of using the right hand to strum—is a hammer on/pull off technique that can start a string of notes. Tapping is specified by a MIDI note channel of 5. Other modifiers for playing techniques are also contemplated. For example, a modifier of "force hopos on" causes all notes displayed to indicate that the player should play them as hammer ons/pull offs. A modifier of "force hopos off" causes all notes displayed to not be hammer ons/pull offs.

Some modifiers change how information of on the screen is displayed. For example, a "slash chords on" indicator in the song data file causes the processor 120 to show a slash in the chord name to indicate a chord with an inversion. A slash chord has an inversion, or non-chord tone in the bass, e.g., a C major chord with an E in the bass would display as C/E to the left of the sub-lane. A "chord naming off" modifier can be used to turn off chords names so they are not displayed.

Also contemplated is a "loose strumming" modifier. This allows the player to strum in the guitar in a style similar to that of Bob Dylan. This modifier is authored using modifier midi notes over the top of chords. It allows plays to player looser and just hit higher, lower, or all strings of chords and also loosens the timing window in which the player must provide the expected input.

Figure 13:
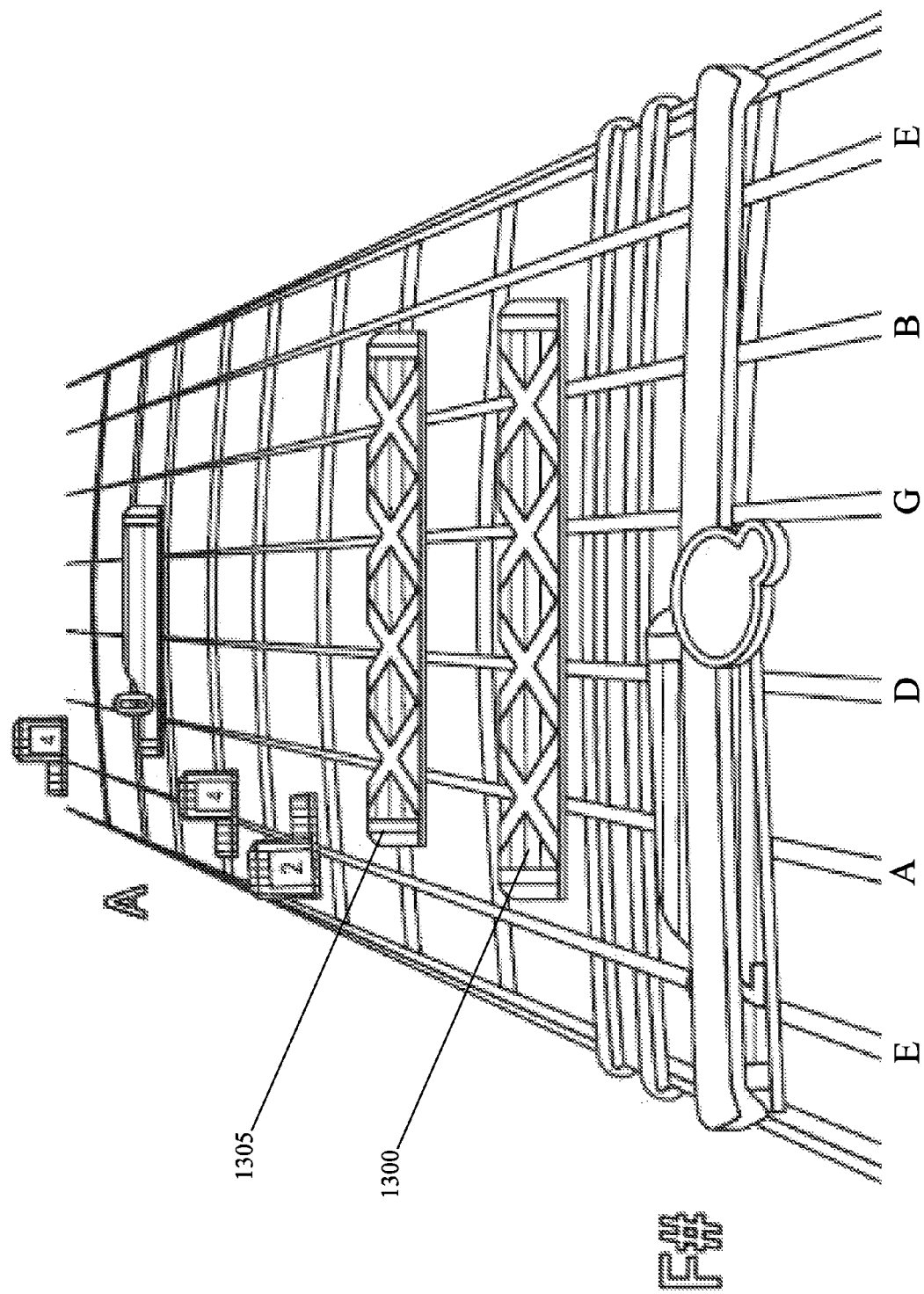
FIG. 13 shows gems indicating palm muting may be used.

FIG. 13 shows gems indicating left hand (fret hand) muting may be used. The gems 1300, 1305 indicate that the player can strum the strings, but he does not have to. Any strumming will not be counted as a miss. Additionally, in some implementations, any fret is accepted for a muted strum. For left hand mutes, the strings that must be played are specified in the song data file, but the player can play the strings with his fingers on any fret, including no fretting, i.e., open strings. The determination of whether the player hit enough of the designated strings, or too many non-designated strings, can be the same as for regular chords, or it can have its own thresholds, which can be predetermined for the game, or designated on a per-song, per-difficulty, per-song-per-difficulty, or per-event basis.

In some implementations, the game may also specify that the user perform a slide action starting from a left hand mute or a regular gem. The slide specifies whether the player's hand should go up the neck or down the neck of the guitar, but the player must be providing input during the duration of the slide; if not, and the user picks up his finger, the slide is considered a miss. For a regular note slide, the initial note must be played and at least one note after the initial note—in the specified direction—should be hit. For example, for a regular note upward slide starting on a G on the low E string, the player must play the G and then slide up the neck (away from the headstock, towards the bridge) to at least one note above G on the low E string, e.g., A, A#, etc.

For a left hand mute slide, the initial note is unimportant, but similar to regular note slides, at least one note after the initial note—in the specified direction—should be hit. Beneficially, if an the author of the data file wants to require a specific end gem for the left hand mute slide, the author can assign regular gems just beyond the end of the slide.

To designate a section as a slide section, typically there is a MIDI NOTE ON event for a particular MIDI note in the data file, e.g., MIDI note 31. In some embodiments, a different MIDI note is used for each difficulty when indicating a slide, e.g., 31 for easy, 65 for medium, 89 for hard, and 113 for expert.

In some embodiments, rather than specify a direction of a slide, the game determines it programmatically. Specifically, if the starting gem of the slide is on the 7th fret or below, the slide will rendered as a slide going up the neck towards the bridge. If the slide starts on a fret above the 7th fret, e.g., the 8th fret, the slide will go down the neck towards the headstock. In some implementations, if the slide MIDI note has a flag set in a flip channel, e.g., channel 11, the slide will go in the opposite direction than the programmatically determined direction described above.

In some embodiments, success is measured by determining if successive inputs are received within a timing threshold. There is no scoring of what notes the player is inputting or what sequence he is providing them in. In some implementations though, the notes must all be hit in sequence for each fret running up or down on the guitar neck. In some embodiments, the notes must all be hit in a monotonic order, i.e., not every note has to be hit, but each note hit must be higher than the one hit before it (for monotonically increasing) or lower (for monotonically decreasing).

In some embodiments, palm mutes are also an option. Palm mutes are performed with the strumming hand, and modify the timbre of the notes being played.

With the myriad of fingering and plucking techniques, and with the numerous gem shape possibilities, the guitar simulation includes a method for determining if the user has successfully played the expected part correctly, or at least close enough to correctly to give him credit.

Determining Successful Guitar Input

In one embodiment, the method for determining if the player has provided the correct input is as follows. For this example, the term "chord note" is used to mean a combination of a string value indicating the string to be struck and a fret value indicating the fret on that string to be held down. A fret value of zero indicates no fret is to be held down, but the string should still be struck, i.e., an "open strum." A first chord note is considered to match a second chord note if the string value of the first chord note matches the string value of the second chord note and the fret value of the first chord note matches the fret value of the second chord note.

If the data in the song data file specifies only one chord note to be played at a particular time, the player's input is correct if the player plays a matching chord note within a timing threshold of that particular time and plays no more than one non-matching chord note within the timing threshold.

If the data in the song data file specifies two chord notes to be played at the same time, the player's input is correct if the player matches one chord note within a timing threshold of that particular time and either 1) matches the other chord note in the song data file within the timing threshold or 2) plays no more than one non-matching chord note within the timing threshold.

If the song data file specifies two or more notes to be played at a particular time, and all notes are open strings (or 0th fret fingerings), the player's input is correct if the player matches more than a fraction, e.g., ¾ths, of the notes correctly and the player plays—that is strikes—no more than a multiple of the number of strings called for, e.g., 2×. In some embodiments, fractions are rounded down to make the requirements easier. For example, if the player is supposed to match two chord notes, and he matches one note of the two and strikes no other strings, that would normally be a miss because it is only half the number he is supposed to play correctly, when he is supposed to in fact hit ¾ths of them. But in some embodiments, the ¾ths requirement is rounded down to the nearest sensible fraction, e.g., one-half for two notes, and matching only one of the two notes is still considered a success. In some embodiments, even if the player satisfies one criterion, but fails the other, it is still a miss. For example, if the player is supposed to match two chord notes and he matches one chord note correctly but strikes five strings, that is a miss because he is allowed to strike at most four strings (i.e., no more than 2×2).

Additional examples are illustrative. Where two chord notes are specified, and the player hits one of the notes, it is considered a hit if the player does hit not the second note but strums a total of four or fewer strings. In the scenarios of three, four, five, or six notes being specified in the data file, the player can strum all six strings and that is considered a hit as along as the player plays two, three, three, or four notes correctly respectively, within the timing threshold.

If the song data specifies three chord notes with two or three of the chord notes fretted, for example, as a power chord, the play's input will be considered correct if the player matches two or three correct notes or the player plays a fraction, e.g., one-half, of the fretted strings correctly, within the timing threshold.

If the song data file specifies three or more notes, some of which are fretted, the player's playing will be considered correct if the player plays three or more correct notes or plays a fraction, e.g., one-half, of the fretted strings correctly.

Variations are allowed, e.g., constraints that call for "no more than one" can instead be "no more than two" or "no more than three" and so on, and any values given are understood to be examples only. Actual values are variable and one of skill in the art would understand that the values given herein are not constraints.

In some embodiments, the data in the song file is used as a key into a lookup table or the basis for program logic that determines the minimum number of correct notes that must be played or strings that must be hit, the maximum number of incorrect strings that can be hit, and/or the maximum number of correct notes that may be hit outside of the timing window (or combinations of these). These constraints can be used in conjunction with the player's performance data to determine whether a streak is broken, whether the corresponding audio is played, whether and by how much the crowd indicator is modified, and/or how much the score is modified. For example, if a maximum of two incorrect strings can be hit based on the lookup table for a particular chord in the song file, and the player plays three incorrect strings, the player's streak may be broken, the audio muted, the crowd indicator lowered, and/or their score not increased, or any combination of these.

Alternatively, there can be separate entries in the table—or separate tables—(or program logic) that independently control whether a streak is broken, whether the corresponding audio is played, whether and by how much the crowd indicator is modified, and how much the score is modified, based on the player's performance. For example, if a maximum of two incorrect strings can be hit based on the lookup table for a particular chord in the song file, and the player plays three incorrect strings, their streak may be left unbroken, the audio may not be muted, but the crowd indicator may be lowered, and their score not increased.

In one embodiment, the following algorithm is used to determine if the input received from the controller is considered correct. First it is determined if any strings that are designated as important were missed. If so, the input is considered incorrect. If the data in the song data file specifies only one chord note to be played at a particular time, the player must match the target chord note within the timing window and hit no more than one other string within the timing window. If the song data file indicates two chord notes are expected, the player must match at least one chord note, have fretted both correctly (but possibly not have strummed one of them), and fret and strum no more than one other string.

If the chord notes in the song data file indicate that an open power chord is expected, i.e., three or more strummed strings, none of which are fretted, the input must match at least ¾ths of the target strings. If the number of target strings is not evenly divisible by ¾ths, the next lower whole number is used as the threshold. If the number of correctly input target strings is at or above this threshold, the input is considered correct.

If the chord notes in the song data file indicate that a standard power chord is expected, i.e., three strummed strings, with two or three strings fretted, the input must match at least two of the target strings. Otherwise, if the chord notes in the song data file indicate that a non-power chord is expected, i.e., three or more strummed strings, with one or more strings fretted, the input must match at least three strings, including at least half of the fretted strings. In some embodiments the power chord evaluation takes precedence over the non-power chord evaluation. In other embodiments, the non-power chord evaluation takes precedence.

In some embodiments, the program logic dictates, or the key to the lookup table is based on, a number of notes that must be struck substantially simultaneously by the player to execute the specified performance. For example, if the data in the song data file specifies that three notes must be struck substantially simultaneously, the table might indicate that a minimum of one string must be correct, a maximum of one string may be incorrect, and a maximum of one string may be correct, but played slightly outside of the timing window.

In some embodiments, the key to the lookup table is based on, or the program logic dictates, the chord shape that must be played by the player. For simpler chords such as E major, more notes must be played. For more difficult chords such as C major, fewer notes may be played. Alternatively, where three notes (C, E, G) are displayed to the player, only two in particular may be really important, e.g., the root (C) and the 5th (G). The song data file indicates that player is to be given credit for playing the C and G correctly (only two notes), but not if he plays only the C and E (still two notes, but not all of the important notes). Which notes must be hit for a given chord can be stored in the lookup table or specified programmatically and compared the player's input to the important notes stored in the lookup table for that chord at that time.

Figure 14:
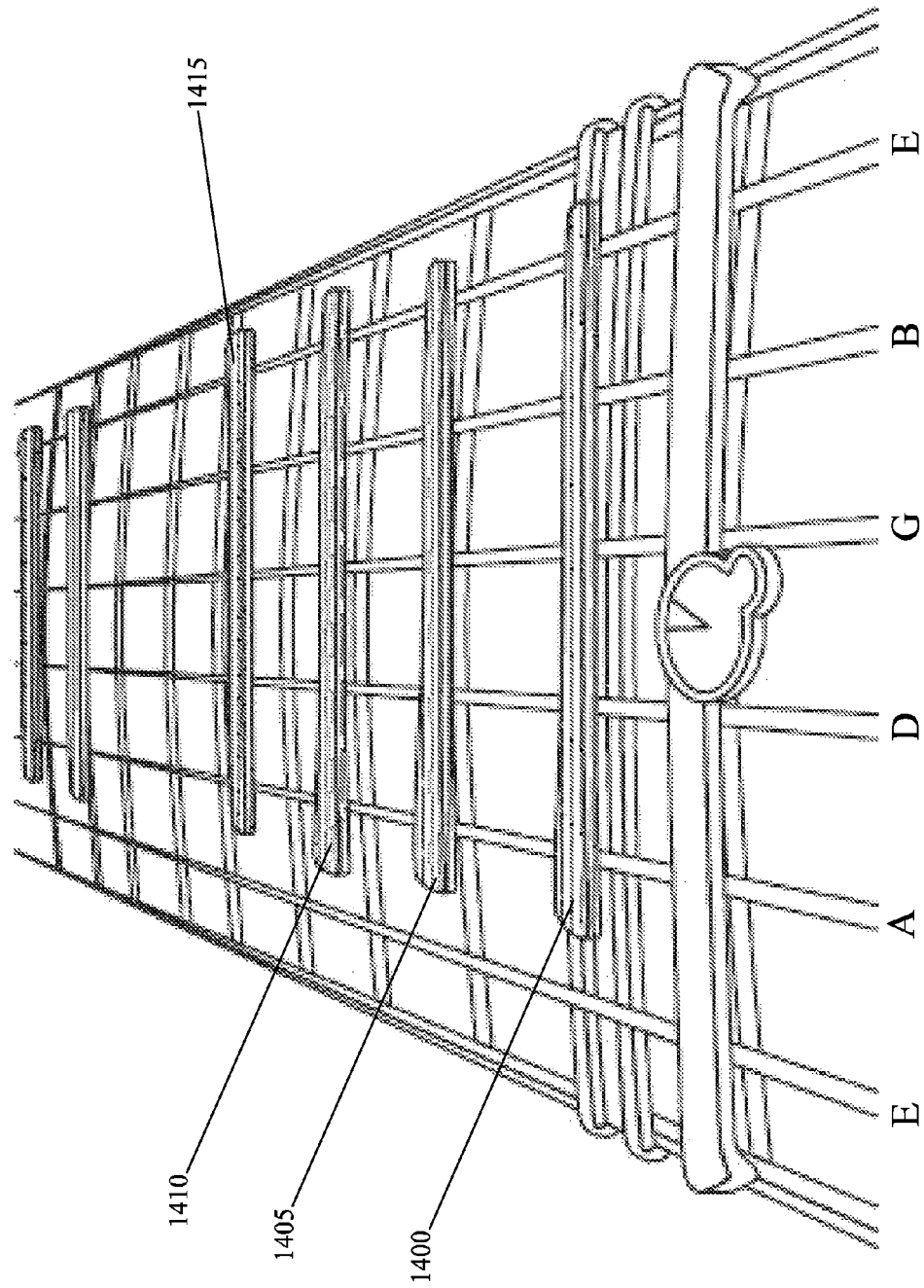
FIG. 14 depicts gems indicating an area strum.

FIG. 14 depicts gems indicating an area strum. The player is directed to strum strings of a chord that he is already holding down, and the flares—or thicker parts of the gem—indicate the direction the player is supposed to strum. For example, gems 1400, 1405, and 1410 have flares on the left. Looking at a guitar from the left (or down), the flares indicate that the player is supposed to provide a downward strum. Gem 1415, however, has a flare on the right side, which means the player is supposed to strum up.

Area strums use one of three MIDI note markers, i.e., high, medium, and low in the song data file (although more gradations are possible). For any chord played during the area strum NOTE_ON, only the specified strings are considered when the processor 120 or instrument analyzer 125 determines if the chord was hit. The following are examples of how the markers can be assigned, but the invention is not limited to these values: high is the high pitched notes (G, B, E), low is the low pitched notes (E, A, D), and medium is A, D, G, B. These subsets of strings filter the data in the song data file, and alter the number when determining if the song data file specifies X number of notes in the algorithm described above. For example, if the song data file specifies a full 6-note E chord, but the low area strum marker is set to NOTE_ON, only 3 notes are "specified" by the song data file, i.e., E, A, D for the purposes of the algorithm.

Keyboard Gameplay

Figure 15:
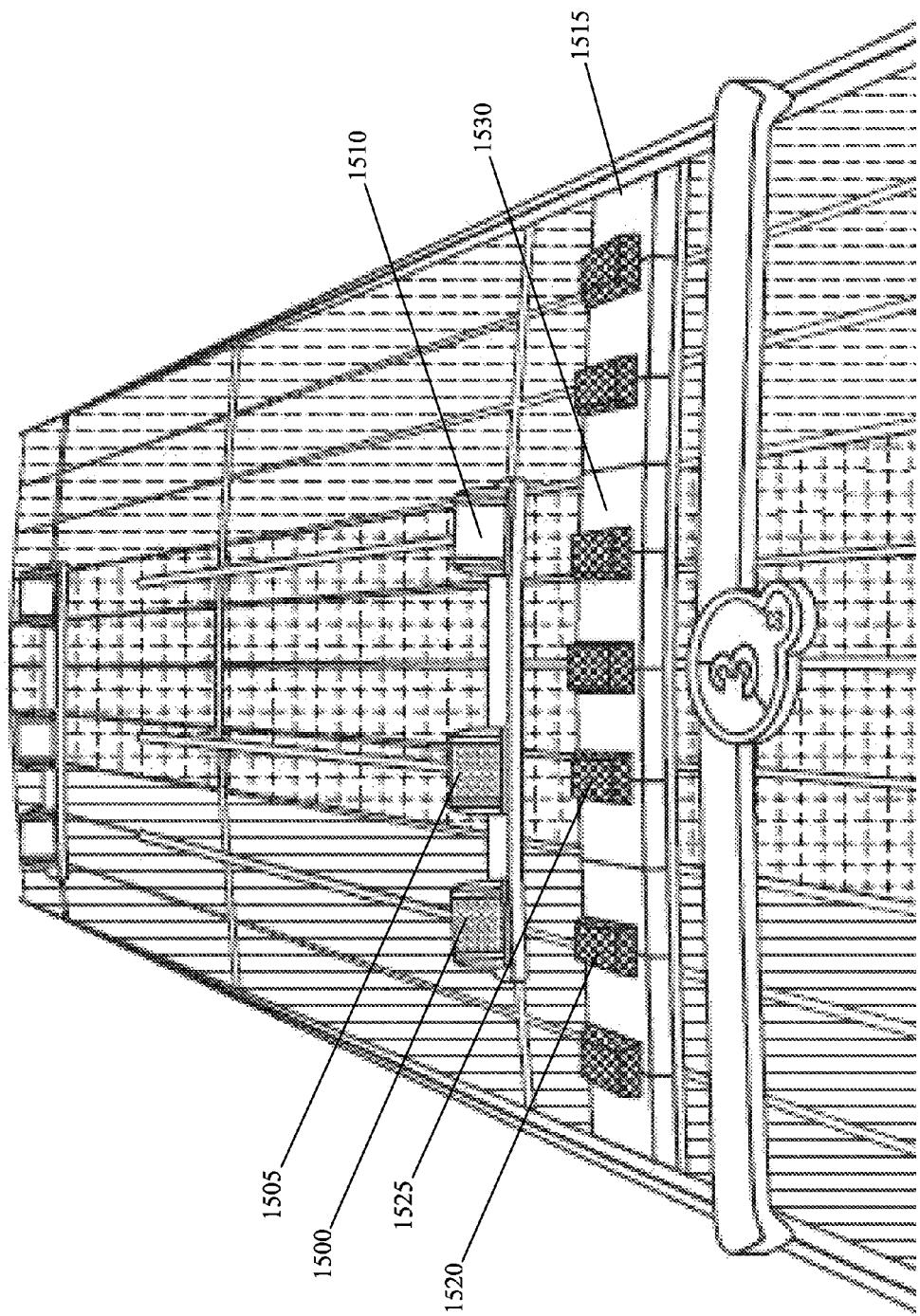
FIG. 15 depicts a keyboard implementation of the game that allows for partial chord hits on a musical keyboard.

FIG. 15 depicts a keyboard implementation of the game that allows for partial chord hits on a musical keyboard. In FIG. 15, gems 1500, 1505, 1510 approach a simulated keyboard 1515, which serves the Now Bar described above. The gems 1500, 1505, 1510 indicate which keys on the keyboard the player is supposed to press (1520, 1525, 1530, respectively) as the gems cross the simulated keyboard. But a player that is just learning keyboard may have difficulty hitting all three or more notes in a chord, especially when the chord involves a mix of black keys 1520, 1525 and white keys 1530. To prevent the player from becoming discouraged, credit is sometimes given for partial chord hits. As described above with respect to the guitar simulation, in some implementations, if the player presses a certain number of the keys on the keyboard at the correct time—but not necessarily all of them—the player is given credit as if he had pressed all of the required keys. For example, as explained above with respect to the guitar, a player is allowed for a small amount of time after the chord's timing window to fret the correct note and still receive some credit for the chord. Similarly, for a simulated keyboard, a player is allowed to correct a missed keypress shortly after the timing window of the chord on the keyboard and still receive credit. Advantageously, this threshold is alterable on a per-difficulty, per-song, or per-chord basis.

Partial chord hits—in both keyboard and guitar simulation described herein—are a departure from prior art games' handling of not-completely-accurate gameplay. In prior art games, if a player was expected to provide input for more than one button, e.g., two gems were presented as crossing the Now Bar at the same time, the player would get zero points if he missed even one of the notes. Additionally, missing notes would break the player's consecutive note streak and impact the player's "crowd meter," causing the simulated crowd to adopt a negative attitude towards the player's onscreen avatar, such as booing the player if he performed poorly enough.

In the present inventions—again both keyboard and guitar simulation—each gem is scored individually so the player receives partial points for partial chord hits, based on how many gems the player hits. For example, if the player hits two of four notes (assuming 25 points per note), the player receives 50 points. If the player hits three of the four notes, the player receives 75 points. Additionally, the contribution to the crowd meter is proportional to the ratio of the number of notes the player successfully played versus the number of notes that were specified in the song data file for the chord. For example, if the player successfully plays 3 out of 3 notes in a chord, the crowd meter is incremented 1 unit. If the player only plays two of the three notes in the chord, the crowd meter is still incremented, but only by 0.67 units.

To balance the credit given for providing partial input, in these implementations, the player is often penalized for missing one of the expected notes. If the player misses any notes in a keyboard chord, the consecutive played notes counter is reset, i.e., the player's streak is broken. Alternatively, partial chord hits may not count against the player's streak, for example, on easier difficulty settings.

In some embodiments, the audio produced by the game is also altered if the player makes a partial chord hit. For example, in prior art games, any miss would mute the audio of the instrument's track. With partial chord hits that is not necessarily the case in this embodiment. Instead, the audio is muted only if the player misses miss all of the notes.

Sustains for keyboards are also different than in prior art games. In those, letting go of one note muted the track and the sustain for the entire chord was lost. In the present invention, the sustain is lost or held for each note independently. In some embodiments, the player can also re-attack the dropped note if the sustain is still held for the other notes.

In some embodiments, when the player presses a key that would normally be considered a wrong note, the incorrect keypress is forgiven in certain situations. Specifically, if the key that is pressed is associated with a sub-lane that is within a certain number of nearby sub-lanes ("neighboring sub-lanes," which could be one or two or any number of sub-lanes near the current sub-lane) to a sub-lane with an gem in it, and the keypress is within a certain threshold time before or after the authored gem and then if the player actually presses the key corresponding to the sub-lane with the authored gem, then the errant keypress is ignored. Beneficially, this allows a player to occasionally strike an errant key and not have it affect his score or his streak of consecutive correct inputs (although on certain difficulties streak or score or both could be affected).

To provide this functionality, several conditions must be met. First, the processor determines, for a key that if struck would normally be considered a miss, if there are one or more gems in a neighboring sub-lane. The processor also determines if the errant press occurs within a threshold amount of time, e.g., 100 milliseconds, of the gem from a neighboring sub-lane crossing the Now Bar. If not, the processor counts the keypress as a miss. If the key is still down after another threshold amount of time, e.g., also 100 milliseconds, the keypress is considered a miss (this prevents a player from just holding down the wrong note because he knows he will not be penalized for it). It should be noted that although the example thresholds are the same amount of time, in some implementations they can be different. If the key press was released before the second threshold amount of time, that keypress is a candidate for forgiveness. But it is not ignored unless the player then presses the right key.

If the player hits the correct key in a neighboring sub-lane, the errant press is forgiven and ignored as input. Optionally, a correctly hit adjacent key only allows a single forgiveness candidate to go through. For example, the player cannot errantly press both a C and an E and have the C and E both be forgiven by hitting the correct key, i.e., D.

Each sub-lane has a fixed set of sub-lanes that are considered neighboring sub-lanes. In some implementations, a neighboring sub-lane could be the neighbors on a chromatic scale, that is, notes within a half-step or whole-step of the note in either direction. In other implementations, a neighboring sub-lane could be the spatial neighbor, that is, for white notes, the neighboring white notes, and for black notes, the neighboring black notes. And in some implementations, a combination of half-step neighbors and spatial neighbors is used. In those implementations, the neighbors of an F# are F, G, and G#. The neighbors of C are B, C#, and D. The neighbors of G# are F#, G, A, and A#. And so forth.

Figure 16:
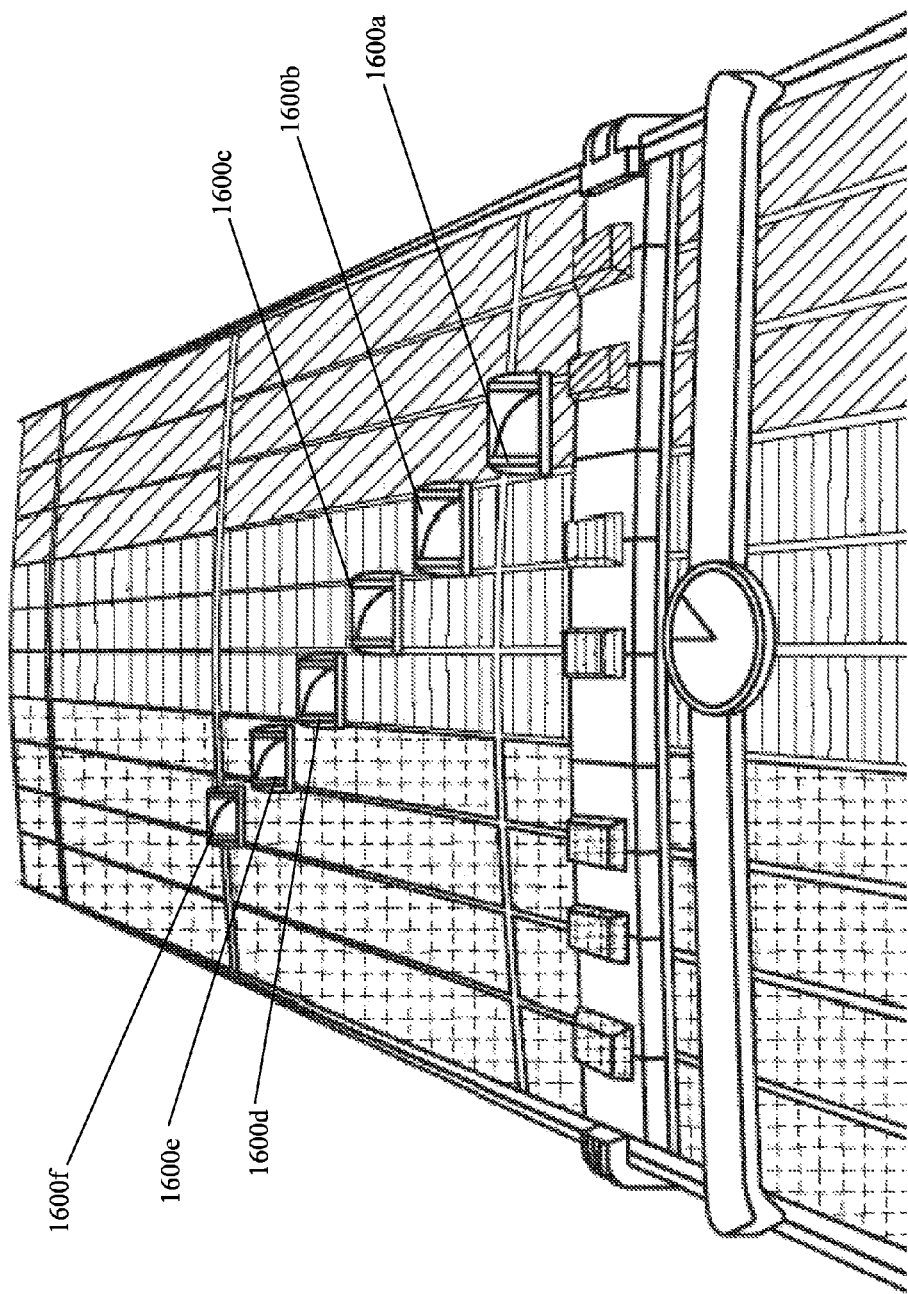
FIG. 16 depicts a series of cues indicating a glissando on a keyboard.

FIG. 16 depicts a series of cues indicating a glissando on a keyboard. A glissando is when the player plays a series of notes up or down the keyboard in rapid succession. Usually this is performed by dragging a finger up or down the keys (popularized by piano players such as Jerry Lee Lewis). Glissando gems 1600a through 1600f (collectively 1600) typically have no tail, as they are intended to be played very quickly, but they are typically rendered with a graphical effect, e.g., a sheen represented by the diagonal line on 1600, and absent from, e.g., 1500, 1505, and 1510 in FIG. 15, to indicate that they are glissando gems.

Because a player may slip or miss keys, the player is not required to hit any particular key during a glissando. When a MIDI NOTE_ON event occurs for the glissando, e.g., for MIDI_NOTE 126, the user can provide any input at a rate equal to or faster than a threshold rate. To achieve this, a timer is used that expires in a fixed amount of time and is reset with each input (much like the roll or trill functionality described herein). In some versions, a glissando is authored as a single MIDI note for the duration of the glissando and the gems that are displayed to the player are authored as non-glissando gems usually are. Beneficially, if an the author of the data file wants to require a specific start gem or an end gem to the glissando, the author can assign regular gems just outside one end or the other of the glissando.

During the glissando, success is measured by determining if successive inputs are received within a timing threshold. There is no scoring of what notes the player is inputting or what sequence he is providing them in. In some implementations though, the notes must all be hit in the correct order, i.e., note for note up or note for note down the keyboard. Gems participating in a glissandi section are typically surrounded by an indicator, e.g., similar to the indicator for rolls and trills, or the gems are connected together, but neither of these is required for all embodiments. In other embodiments, the notes must all be hit in a monotonic order, i.e., not every note has to be hit, but each note hit must be higher than the one hit before it (for monotonically increasing) or lower (for monotonically decreasing).

Figure 17:
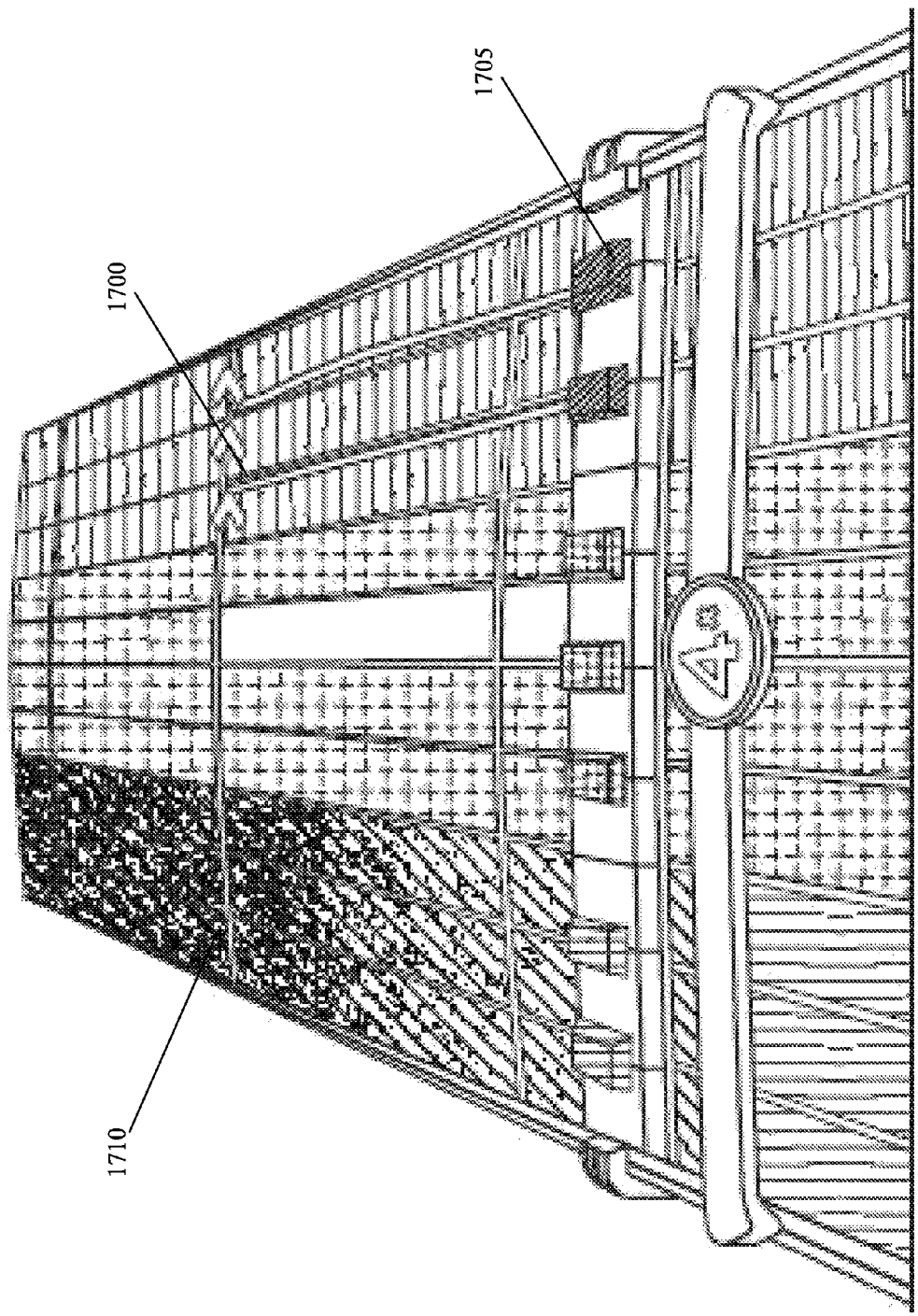
FIG. 17 shows an indicator that the set of keys the user is playing will shift soon.

FIG. 17 shows an indicator 1700 that the set of keys the user is playing will shift soon. This is helpful so that the player can adjust his hand before the keys shift to a lower or higher set of keys or lower or higher octave. In some implementations, the indicators 1700 are on the opposite side of the track from the sub-lanes which will shift out of view. In other implementations, the indicators 1700 are on the same side of the track as the sub-lanes shifting out of view (with the arrows indicating the direction the lane will shift). Typically, the final shift indicator in the sequence corresponds with a fadeout of the sub-lanes that will be shifting out of view and once the final shift indicator hits the Now Bar 1705, the shift happens over a fixed amount of time or a fixed number of beats, e.g., four beats.

To generate the shift indicators, the shift initiation data—and the range or number of sub-lanes that will be shifted—is written in the MIDI data file. The processor reads the shift data from the MIDI file and determines where to render the indicators based on that data. In some implementations, the arrows are rendered much like the gems on the track. In other implementations, the arrows are rendered underneath the track and gems. In some implementations, the arrows are a mask layer, separate from the layer rendering the gems or the track, which is overlaid on the displayed track. The arrows are typically rendered on the beat lines, every beat for three beats before the shift (and then once on the shift) so that the player can see the shift coming. When the mask is overlaid on the track, the display shows both the gems and the arrows together.

In some implementations, there is also a black track mask 1710 that extends from the point of the lane shift up the track (later in time). Its width is determined by how much of a shift is occurring and it covers all the sub-lanes which will be shifted off the track, in effect dimming the sub-lanes that will no longer be viewable.

The above-described techniques can be implemented in digital electronic circuitry, or in computer hardware, firmware, software, or in combinations of them. The implementation can be as a computerized method or process, or a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as a game platform such as a dedicated game console, e.g., PLAYSTATION® 2, PLAYSTATION® 3, or PSP® manufactured by Sony Corporation; WII™, NINTENDO DS®, NINTENDO DSi™, NINTENDO DSi XL™ or NINTENDO DS LITE™ manufactured by Nintendo Corp.; or XBOX® or XBOX 360® manufactured by Microsoft Corp.; or special purpose logic circuitry, e.g., an FPGA (field programmable gate array) or an ASIC (application-specific integrated circuit) or other specialized circuit. Modules can refer to portions of the computer or game program or gamer console and/or the processor/special circuitry that implements that functionality.

Processors suitable for the execution of a computer program include, by way of example, both general and special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer also includes, or is operatively coupled, to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a player, the above described techniques can be implemented on a computer or game console having a display device, e.g., a CRT (cathode ray tube) or LCD (liquid crystal display) monitor, a television, or an integrated display, e.g., the display of a PSP® or Nintendo DS. The display can in some instances also be an input device such as a touch screen. Other typical inputs include simulated instruments, microphones, or game controllers. Alternatively input can be provided by a keyboard and a pointing device, e.g., a mouse or a trackball, by which the player can provide input to the computer or game console. Other kinds of devices can be used to provide for interaction with a player as well; for example, feedback provided to the player can be any form of sensory feedback, e.g., visual feedback, auditory feedback, or tactile feedback; and input from the player can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical player interface through which a player can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Some aspects of the inventions described herein are reflected in the following claims, but the inventions are not limited to these. Specifically there are apparatuses configured to carry out the steps of the following methods, apparatuses whose components embody the claim elements below and there are computer program products, tangible embodied in a computer-readable storage medium, which includes instructions operable to cause a data processing apparatus to perform the following methods.

What is claimed is:

1. A method of providing a realistic drum experience in a video game, the method executed on a video game platform comprising a processor and a memory in communication with the processor in communication with a display and a drum controller comprising at least one cymbal and at least one drum pad both associated with a first sub-lane, the memory storing instructions that cause the processor to execute the method comprising:
   determining, using the video game platform, if a cue to be displayed on the display in the first sub-lane is a cue corresponding to one of a cymbal input and a pad input;
   causing, by the video game platform, the display of the cue on the display;
   receiving, by the video game platform, an input from a player via the drum controller; and
   scoring, by the video game platform, the input with a first score when the input is a cymbal input associated with the first sub-lane, scoring the input with a second score when the input is a pad input associated with the first sub-lane, and scoring the input with a third score when the input is neither a cymbal input associated with the first sub-lane nor a pad input associated with the first sub-lane.

2. The method of claim 1, wherein the drum controller further comprises at least one cymbal and at least one drum pad associated with a second sub-lane.

3. The method of claim 1, wherein the second score is less than the first score when the cue displayed on the display corresponds to a cymbal input.

4. The method of claim 1, wherein the first score is less than the second score if the cue displayed on the display indicates a pad input.

5. The method of claim 1 wherein the third score is less than the first score and the second score.

6. A non-transitory computer readable storage medium storing instructions for execution on a video game platform in communication with a display and a drum controller comprising at least one cymbal and at least one drum pad associated with a first sub-lane, the instructions configured to cause the video game platform to:

determine if a cue to be displayed on the display in the first sub-lane corresponds to one of the cymbal input and the pad input;

cause the display of the cue on the display;

receive an input from a player via the drum controller; and score the input with a first score when the input is a cymbal input associated with the first sub-lane, score the input with a second score when the input is a pad input associated with the first sub-lane, and score the input with a third score when the input is neither a cymbal input associated with the first sub-lane nor a pad input associated with the first sub-lane.

7. The non-transitory computer readable storage medium of claim 6, wherein the drum controller further comprises at least one cymbal and at least one drum pad associated with a second sub-lane.

8. The non-transitory computer readable storage medium of claim 6, wherein the second score is less than the first score when the cue displayed on the display indicates a cymbal input.

9. The non-transitory computer readable storage medium of claim 6, wherein the first score is less than the second score when the cue displayed on the display indicates a pad input.

10. The non-transitory computer readable storage medium of claim 6, wherein the third score is less than the first score and the second score.

\* \* \* \* \*